US012801259B2

(12) United States Patent
Ding et al.

(10) Patent No.: US 12,801,259 B2
(45) Date of Patent: Nov. 17, 2026

(54) FLOATING BALL PROCESSING METHOD IN MULTITASKING SCENARIO AND ELECTRONIC DEVICE

(71) Applicant: HONOR DEVICE CO., LTD., Shenzhen (CN)

(72) Inventors: Yiyan Ding, Shenzhen (CN); Liwei Huang, Shenzhen (CN); Junting Jiao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 558 days.

(21) Appl. No.: 18/268,530

(22) PCT Filed: Dec. 20, 2022

(86) PCT No.: PCT/CN2022/140359
§ 371 (c)(1),
(2) Date: Jun. 20, 2023

(87) PCT Pub. No.: WO2023/165225
PCT Pub. Date: Sep. 7, 2023

(65) Prior Publication Data
US 2024/0220077 A1 Jul. 4, 2024

(30) Foreign Application Priority Data
Mar. 3, 2022 (CN) ......................... 202210209969.4

(51) Int. Cl.
*G06F 3/0482* (2013.01)
*G06F 3/04817* (2022.01)

(52) U.S. Cl.
CPC ........ *G06F 3/0482* (2013.01); *G06F 3/04817* (2013.01)

(58) Field of Classification Search
CPC .. G06F 3/0482; G06F 3/04817; G06F 3/0485; G06F 3/0486; G06F 3/04883;
(Continued)

(56) References Cited

U.S. PATENT DOCUMENTS 8,260,373 B2 * 9/2012 Lee ....................... G06F 1/3265 455/574
10,691,285 B2 6/2020 Liu et al.
(Continued)

FOREIGN PATENT DOCUMENTS

CN 104091125 B 11/2017
CN 109213402 A 1/2019
(Continued)

*Primary Examiner* — Irete F Ehichioya
*Assistant Examiner* — Phoebe X Pan
(74) *Attorney, Agent, or Firm* — WOMBLE BOND DICKINSON (US) LLP

(57) ABSTRACT

This application provides a floating ball processing method in a multitasking scenario and an electronic device. The method may be applied to electronic devices such as mobile phones and tablet computers. When a preset condition is met, the electronic device can display a floating ball matching the preset condition. The electronic device can display a plurality of floating balls meeting preset conditions, to avoid a case that floating balls generated later crowd floating balls generated earlier, consequently affecting the user experience. In addition, the electronic device can set personalized floating ball display rules according to the time validity characteristics of different floating ball services. For a plurality of floating balls displayed simultaneously, the electronic device can also set a combination display rule for combined display of floating balls, to avoid blocking to the foreground application due to an excessively large quantity of floating balls.

18 Claims, 53 Drawing Sheets

FIG. 3A

(58) Field of Classification Search
CPC .............. G06Q 10/02; H04M 1/72451; H04M 1/72457; H04M 2250/22; H04M 1/72454; H04M 1/72469
See application file for complete search history.

(56) References Cited

U.S. PATENT DOCUMENTS 11,036,518 B1 * 6/2021 Marudi ................. G06F 9/4887
11,543,928 B2 * 1/2023 Jing ....................... G06F 3/0481
11,620,048 B2 * 4/2023 Cinek ................. H04W 68/005 715/863
11,698,706 B2 * 7/2023 Kim .................... G06F 3/04842 715/768
11,842,028 B2 * 12/2023 Karunamuni ....... G06F 3/04886
12,314,738 B2 * 5/2025 Liu ......................... G06F 9/451
2004/0098462 A1 * 5/2004 Horvitz .................. G06Q 10/10 709/207
2010/0122194 A1 * 5/2010 Rogers .................. G06F 3/0488 715/769
2011/0175930 A1 * 7/2011 Hwang ................. G06F 3/0482 345/660
2011/0244924 A1 * 10/2011 Jung ..................... G06F 3/0354 455/566
2012/0210273 A1 * 8/2012 Seong ................... G06F 3/0482 715/781
2014/0282174 A1 * 9/2014 Dempski ............... G06F 3/0482 715/771
2015/0185980 A1 * 7/2015 An ........................ G06F 3/0484 715/803
2015/0346939 A1 * 12/2015 Kwak ................. G06F 3/04842 715/771
2016/0253089 A1 * 9/2016 Lee ....................... H04M 19/04 345/173
2016/0313877 A1 * 10/2016 Ha ...................... G06F 3/04842
2016/0360382 A1 * 12/2016 Gross ....................... H04W 4/40
2017/0357435 A1 * 12/2017 Taslimi ............... G06F 3/04883
2018/0150208 A1 * 5/2018 Song ................... G06F 3/04845
2018/0341923 A1 * 11/2018 Nalliah ................ G06Q 10/107
2019/0025988 A1 * 1/2019 Liu ...................... G06F 3/04886
2019/0230215 A1 * 7/2019 Zhu ................. H04M 1/724634
2020/0285377 A1 * 9/2020 Hoefs .................... G04G 21/06
2021/0109644 A1 * 4/2021 Chen ........................ G06F 9/451
2021/0397309 A1 12/2021 Meng et al.
2021/0397909 A1 12/2021 Sasaki et al.
2022/0050582 A1 * 2/2022 Zhou ..................... G06F 3/0485
2022/0050975 A1 * 2/2022 Peng ................... G06F 3/04883
2022/0121348 A1 * 4/2022 Jeon ......................... H04L 51/52
2022/0179665 A1 * 6/2022 Rathod ................... G06F 9/451
2022/0318036 A1 10/2022 Zhang et al.
2022/0334694 A1 * 10/2022 Wei ..................... G06F 3/04886
2022/0334855 A1 10/2022 Meng
2023/0038036 A1 * 2/2023 Choi ........................ G06F 9/452
2023/0046708 A1 2/2023 Xu
2024/0004727 A1 * 1/2024 Guerra .................... G06F 9/451
2024/0028175 A1 * 1/2024 Li ........................ G06F 3/04847
2024/0103888 A1 3/2024 Ding et al.
2024/0134491 A1 4/2024 Yang et al.

FOREIGN PATENT DOCUMENTS

CN 110881082 A 3/2020
CN 111176506 A 5/2020
CN 107436784 B 6/2020
CN 111680521 A 9/2020
CN 113722027 A 11/2021
CN 113722028 A 11/2021
CN 113741781 A 12/2021
CN 113791850 A 12/2021
CN 113805747 A 12/2021
CN 114047867 A 2/2022
CN 114153406 B * 6/2024 ......... G06F 3/04883
EP 4071591 A1 10/2022
EP 4141637 A1 3/2023
WO WO-2021042881 A1 * 3/2021 ............. G06F 9/542
WO 2021082716 A1 5/2021
WO 2021184954 A1 9/2021
WO 2021213164 A1 10/2021

* cited by examiner

FIG. 4K
5G 5G
8:00
413
52K
boarding
View the
boarding
412
0:11
2:30

FLOATING BALL PROCESSING METHOD IN MULTITASKING SCENARIO AND ELECTRONIC DEVICE

CROSS-REFERENCE TO RELATED APPLICATIONS

This application is a national stage of International Application No. PCT/CN2022/140359 filed on Dec. 20, 2022, which claims priority to Chinese Patent Application No. 202210209969.4 filed on Mar. 3, 2022. The disclosures of both of the aforementioned application are hereby incorporated by reference in their entireties.

TECHNICAL FIELD

This application relates to the field of terminals, and in particular, to a floating ball processing method in a multitasking scenario and an electronic device.

BACKGROUND

After exiting a certain page or application, terminal electronic devices such as mobile phones may display a floating ball, or referred to as a floating capsule, in the window after exiting. The floating ball may always be displayed on the top layer of the window and will not be covered. In this way, the user can quickly and conveniently open the foregoing closed page or application through the floating ball.

SUMMARY

This application provides a floating ball processing method in a multitasking scenario. The method may be applied to terminal electronic devices such as mobile phones and tablet computers. By implementing the method, the electronic device can display a plurality of floating balls. Further, the electronic device can set personalized floating ball display rules according to the time validity characteristics of different floating ball services. In this way, the electronic device can provide a plurality of types of information to a user through a plurality of floating balls, and avoid blocking to the foreground application due to an excessively large quantity of floating balls.

According to a first aspect, this application provides a multitasking interaction method, the method being applicable to an electronic device, and including: detecting that the electronic device meets a first preset condition, and displaying a first floating ball, where an identifier of a first application and first information are displayed in the first floating ball; and detecting that the electronic device meets a second preset condition in a case that the first floating ball is displayed on an interface of the electronic device, and displaying a second floating ball while displaying the first floating ball on the interface of the electronic device, where an identifier of a second application and second information are displayed in the second floating ball.

By implementing the method provided in the first aspect, when it is detected that display conditions of a plurality of floating balls are met, the electronic device may simultaneously display the plurality of floating balls. An identifier of an associated application and prompt information are displayed in the floating ball, so that the user can quickly and conveniently obtain the prompt information and the application that provides the foregoing information.

With reference to the method provided in the first aspect, in some embodiments, the second floating ball is displayed above the first floating ball.

In this way, the electronic device can display the latest generated floating ball above the existing floating ball. In a scenario in which a plurality of floating balls are displayed, the user can determine the display time of each floating ball according to a display position of each floating ball, and then determine a priority of prompt information in each floating ball, so as to arrange time and tasks properly.

With reference to the method provided in the first aspect, in some embodiments, the method further includes: determining that no user operation on the first floating ball is detected within a first duration after the first floating ball is displayed, and displaying the first floating ball in a thumbnail state, where the first floating ball in the thumbnail state includes the identifier of the first application, and does not include the first information.

By implementing the method provided in the foregoing embodiments, after the electronic device displays a floating ball in an unfolded state (including an application icon and a prompt information) for a period of time, and no operation, for example, a click operation, of the user on the floating ball is detected, the floating ball can be adjusted from the unfolded state to a thumbnail state (including the application icon), to reduce the display area of the floating ball and reduce the blocking to the foreground application, thereby improving the user experience.

With reference to the method provided in the first aspect, in some embodiments, the method further includes: determining that no user operation on the second floating ball is detected within a second duration after the second floating ball is displayed, and displaying the second floating ball in a thumbnail state, where the second floating ball in the thumbnail state includes the identifier of the second application, and does not include the second information.

By implementing the method provided in the foregoing embodiments, in a scenario in which a plurality of floating balls are displayed, the electronic device can simultaneously adjust a plurality of floating balls from an unfolded state to a thumbnail state, thereby further reducing the display areas of the floating balls, and reducing the blocking to the foreground application.

With reference to the method provided in the first aspect, in some embodiments, the first duration is equal to the second duration.

By implementing the method provided in the foregoing embodiments, the electronic device can set the time for displaying floating balls in an unfolded state according to the characteristics of services corresponding to different floating balls, thereby improving the user experience. For example, the electronic device may set a display time of an unfolded state of a subway floating ball to 30 s; and set a display time of an unfolded state of a flight floating ball to 10 s.

With reference to the method provided in the first aspect, in some embodiments, the displaying the second floating ball in a thumbnail state includes: determining that another floating ball in a thumbnail state is displayed on the interface of the electronic device, and aggregating the second floating ball in the thumbnail state and the another floating ball in the thumbnail state into a third floating ball, where the identifier of the second application is displayed in the third floating ball.

By implementing the method provided in the foregoing embodiments, in a scenario in which a plurality of floating balls are displayed, when adjusting a plurality of floating balls from an unfolded state to a thumbnail state, the electronic device may also aggregate the plurality of floating balls in the thumbnail state into one floating ball, so as to further reduce the display area of the floating ball, reduce the blocking to the foreground application, and improve the user experience.

An application icon in the latest generated floating ball may be displayed at the application icon part in the one floating ball (the third floating ball) after aggregation. For example, the electronic device displays the second floating ball after displaying the first floating ball, so that the second floating ball may be referred to as the latest generated floating ball. Therefore, the application icon in the second floating ball, that is, the identifier of the second application, may be displayed at the application icon part in the third floating ball. In this way, the user can determine, according to the application icon in the floating ball after aggregation, the application to which the latest generated floating ball belongs, and then determine the priority of the prompt information in each floating ball, so as to arrange time properly.

With reference to the method provided in the first aspect, in some embodiments, the third floating ball includes indication information, where the indication information is used for indicating that the third floating ball is an aggregated floating ball including a plurality of floating balls.

By implementing the method provided in the foregoing embodiments, the user can determine, through an application icon of a floating ball in a thumbnail state, whether the floating ball is obtained by abbreviating one floating ball in an unfolded state, or by aggregating a plurality of floating balls in an unfolded state, and then determine whether the floating ball in the thumbnail state can correspond to the plurality of floating balls.

With reference to the method provided in the first aspect, in some embodiments, the method further includes: detecting a first user operation on the third floating ball; and displaying the plurality of floating balls in response to the first user operation.

By implementing the method provided in the foregoing embodiments, when the electronic device detects a user operation on the floating ball after aggregation, the electronic device can re-split the one floating ball after aggregation into the plurality of floating balls before aggregation, and display the plurality of floating balls. Therefore, the user can conveniently obtain the currently needed floating ball at any time, and use the floating ball to acquire more information or complete some necessary operations.

With reference to the method provided in the first aspect, in some embodiments, the first information is a check-in prompt for a flight booked by a user, and the first preset condition includes that: a notification of the flight is acquired, and a current time of the electronic device is within a check-in time range of the flight; or the first information is a boarding prompt for a flight booked by a user, and the first preset condition includes that: a notification of the flight is acquired, a current time of the electronic device is within a waiting time range of the flight, and a current location of the electronic device is within a geographic range of a departure airport of the flight; or the first information is a subway boarding prompt, and the first preset condition includes that: a current location of the electronic device is within a geographic range of a subway station; or the first information is a translation prompt, and the first preset condition includes that: a copy operation is detected, and a language used for copied content is a language uncommonly used by a system.

By implementing the method provided in the foregoing embodiments: when a notification of a flight is acquired, and a current time of the electronic device is within a check-in time range of the flight, the electronic device may display a flight floating ball. Alternatively, when a notification of a flight is acquired, a current time of the electronic device is within a waiting time range of the flight, and a current location of the electronic device is within a geographic range of a departure airport of the flight, the electronic device may display a flight floating ball. The relevant information, such as a check-in prompt and a boarding prompt, of the flight booked by the user may be displayed in the flight floating ball. When a current location of the electronic device is within a geographic range of a subway station, the electronic device may display a subway floating ball. The subway floating ball may display a subway boarding prompt, such as a subway boarding code or a health code. When a copy operation is detected, and a language used for the copied content is a language uncommonly used by a system, the electronic device may display a translation floating ball.

With reference to the method provided in the first aspect, in some embodiments, the method further includes: determining that no user operation on the first floating ball is detected within a third duration after the first floating ball is displayed, and ending displaying of the first floating ball.

By implementing the method provided in the foregoing embodiments, in a scenario in which the floating ball is a transient floating ball, such as a navigation floating ball or a dialing floating ball, after the floating ball is displayed for a period of time, and no operation of the user on the floating ball is detected, the electronic device may confirm that the user does not need the shortcut provided by the floating ball, and then the electronic device may end the displaying of the floating ball, so as to reduce blocking to the foreground application and avoid interference to the user.

With reference to the method provided in the first aspect, in some embodiments, the determining that no user operation on the first floating ball is detected within a third duration after the first floating ball is displayed, and ending displaying of the first floating ball includes: determining that no user operation on the first floating ball is detected within a fourth duration after the first floating ball is displayed, and displaying the first floating ball in a thumbnail state, where the first floating ball in the thumbnail state includes the identifier of the first application, and does not include the first information: the first floating ball in the thumbnail state further includes a countdown identifier, where the countdown identifier is used for indicating a remaining display time of the first floating ball in the thumbnail state; and the third duration is equal to a sum of the fourth duration and a countdown duration indicated by the countdown identifier; and ending displaying of the first floating ball in a case that the countdown identifier indicates that timing is over.

By implementing the method provided in the foregoing embodiments, in a scenario in which the floating ball is a transient floating ball, such as a navigation floating ball or a dialing floating ball, after the floating ball is displayed for a period of time, and no operation of the user on the floating ball is detected, the electronic device may adjust the floating ball from an unfolded state to a thumbnail state, and display a countdown identifier on the floating ball in the thumbnail state, to prompt the user that the floating ball is about to disappear. If the electronic device has still not detected any operation of the user on the floating ball when the countdown identifier indicates that the countdown is over, the electronic device may confirm that the user does not need the shortcut provided by the floating ball, and then the electronic device may end the displaying of the floating ball, to reduce the blocking to the foreground application, and avoid interference to the user.

With reference to the method provided in the first aspect, in some embodiments, the first information is a navigation prompt, and the first preset condition includes that: a copy operation is detected, and copied content indicates a first location on a map; or the first information is a dialing prompt, and the first preset condition includes that: a copy operation is detected, and copied content includes a first phone number.

By implementing the method provided in the foregoing embodiments: when a copy operation is detected and the copied content indicates a specific location on a map, the electronic device may display a navigation floating ball. The navigation floating ball can provide the user with a fast itinerary planning service. When a copy operation is detected and the copied content indicates a phone number, the electronic device may display a dialing floating ball. The dialing floating ball can provide the user with a fast dialing service, save user operations, and improve the user experience.

With reference to the method provided in the first aspect, in some embodiments, the method further includes: detecting a second user operation on the first floating ball; and displaying a first page in response to the second user operation, where third information is displayed on the first page, and the third information includes the first information, or the third information is associated with the first information.

By implementing the method provided in the foregoing embodiments, when detecting a user operation on a floating ball, the electronic device may run an application associated with the floating ball, or display a page of more information associated with the floating ball including the prompt information in the floating ball, so that the user can obtain more relevant information conveniently and quickly.

With reference to the method provided in the first aspect, in some embodiments, the first page further includes the second floating ball, or further includes the second floating ball in a thumbnail state, where the second floating ball in the thumbnail state includes the identifier of the second application, and does not include the second information.

By implementing the method provided in the foregoing embodiments, after displaying a page associated with the first floating ball, the electronic device may further display remaining floating balls, for example, the second floating ball, on the page. In this way, the user can directly click the second floating ball based on the foregoing page, to acquire more information provided by the second floating ball.

With reference to the method provided in the first aspect, in some embodiments, in a case that a graphic code is displayed on the first page, the graphic code does not overlap with the second floating ball; and the image code includes a two-dimensional code and a bar code.

By implementing the method provided in the foregoing embodiments, if the page displayed through the floating ball includes a graphic code, for example, the page displayed through the subway floating ball includes a subway boarding code, in this case, the electronic device may display the remaining floating balls that need to be displayed at regions other than a region occupied by the subway boarding code, to avoid blocking to the subway boarding code and hindering users from using the subway boarding code, thereby improving the user experience.

With reference to the method provided in the first aspect, in some embodiments, a fourth floating ball and a fifth floating ball are further displayed on the interface of the electronic device, the fourth floating ball covers the fifth floating ball, and the method further includes: detecting a third user operation on the interface of the electronic device; and displaying the fourth floating ball and the fifth floating ball in response to the third user operation, where the fifth floating ball is not covered by the fourth floating ball.

By implementing the method provided in the foregoing embodiments, when displaying a plurality of floating balls, the electronic device can fold floating balls of which the quantity exceeds a quantity for display. Subsequently, the user can control the electronic device to display the folded floating ball through a sliding up/sliding down operation, and then acquire a shortcut service provided by the floating ball.

With reference to the method provided in the first aspect, in some embodiments, the method further includes: detecting a fourth user operation on the first floating ball or the second floating ball; and displaying the first floating ball and the second floating ball at a first position on the interface of the electronic device in response to the fourth user operation, where the first position is a position at which the fourth user operation ends.

By implementing the method provided in the foregoing embodiments, the electronic device can recognize the user's operation of moving a floating ball, and then move one or more floating balls displayed on the screen to a position specified by the user. In this way, the user can adjust the display position of the floating ball at will, so as to reduce the poor experience caused by the blocking of the floating ball to the foreground application.

According to a second aspect, this application provides an electronic device. The electronic device includes one or more processors and one or more memories; where the one or more memories are coupled to the one or more processors, the one or more memories are configured to store computer program code, the computer program code includes computer instructions, and when the one or more processors execute the computer instructions, the electronic device performs the method described according to the first aspect and any possible implementation in the first aspect.

According to a third aspect, this application provides a computer-readable storage medium, including instructions, the instructions, when run on an electronic device, causing the electronic device to perform the method described according to the first aspect and any possible implementation in the first aspect.

According to a fourth aspect, this application provides a computer program product including instructions, the computer program product, when run on an electronic device, causing the electronic device to perform the method described according to the first aspect and any possible implementation in the first aspect.

It may be understood that the electronic device provided in the second aspect, the computer storage medium provided in the third aspect, and the computer program product provided in the fourth aspect are all configured to perform the method provided in this application. Therefore, for beneficial effects that can be achieved, reference may be made to the beneficial effects in the corresponding method, and details are not described herein again.

DESCRIPTION OF EMBODIMENTS

Terms used in the following embodiments of this application are only intended to describe particular embodiments, and are not intended to limit this application.

In a solution provided in the embodiments of this application: terminal electronic devices such as mobile phones may display a floating ball, or referred to as a floating capsule, in a window after exiting. The floating ball may always be displayed on the top layer of the window (the topmost layer of the display layer) and will not be covered. In this way, the user can quickly and conveniently open the previously closed page or application by clicking the floating ball anytime and anywhere.

Figure 1A:
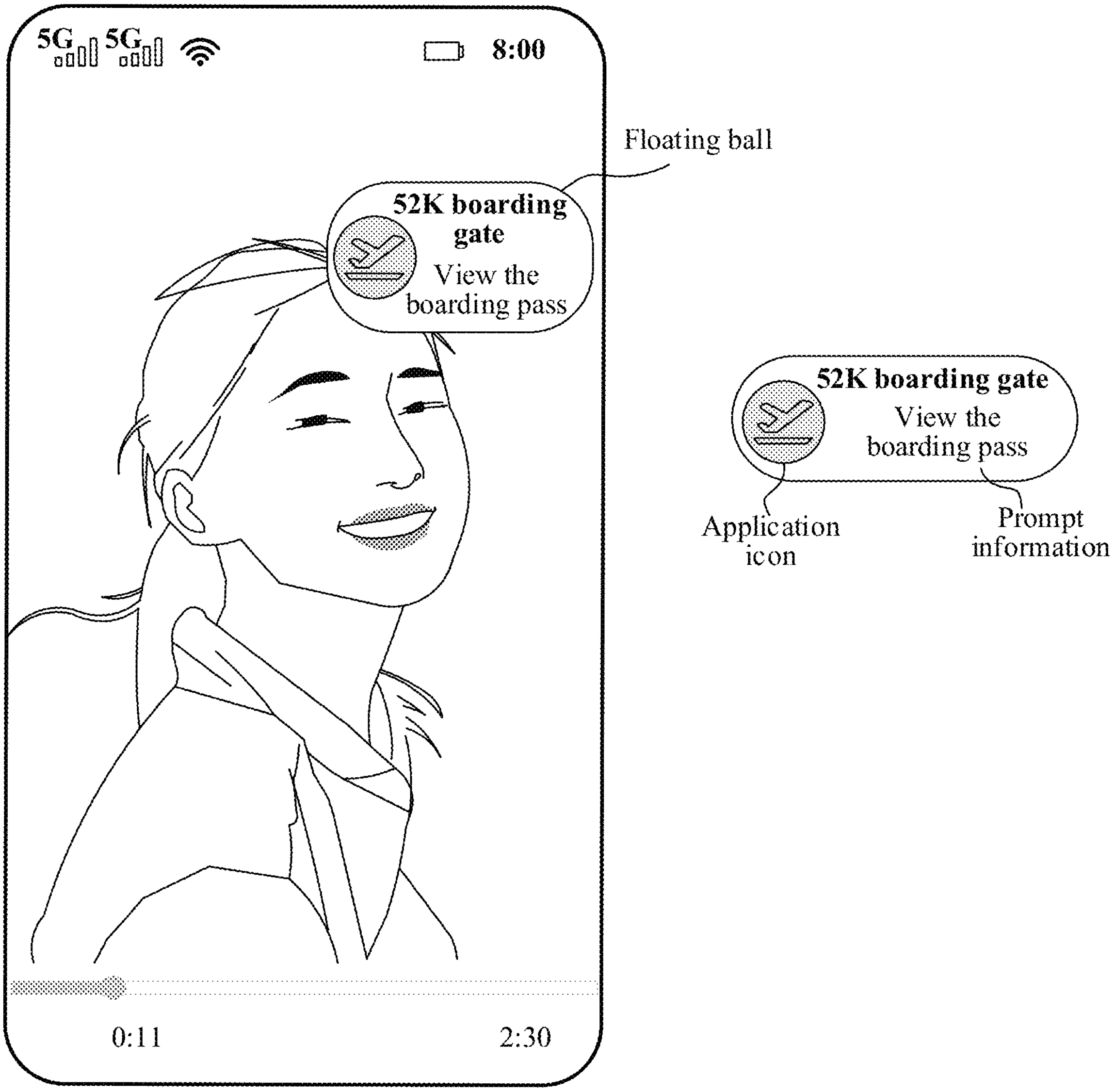
FIG. 1A to FIG. 1C show a group of user interfaces on which an electronic device displays a floating ball according to an embodiment of this application.

First, FIG. 1A shows an example of a user interface on which a first electronic device displays a floating ball. The foregoing mobile phone may be referred to as a first electronic device.

As shown in FIG. 1A, the user interface may represent a user interface for playing a video by the first electronic device. In this case, the user may browse the video. The first electronic device may display, above the window layer for playing the video, a floating ball that reminds the user of flight information of a booked flight, which is denoted as a flight floating ball, for example, the floating ball in FIG. 1A. The flight information of the flight booked by the user may come from an application that provides a flight booking service for the user, which is denoted as a flight application. Therefore, the flight floating ball may also be referred to as a floating ball corresponding to the flight application.

A floating ball may include an application icon and prompt information. The application icon may indicate an application associated with the floating ball. Generally, the information displayed in the floating ball comes from the associated application. In addition, the floating ball may also provide the user with the service of quickly opening the foregoing associated application. For example, the electronic device may directly open an interface of the application in response to the user's operation of clicking the floating ball, and display an interface associated with the prompt information. The specific content displayed in the prompt information is important information to which the user pays attention. In this way, the user can acquire the important information more conveniently without entering the foregoing associated application.

For example, in FIG. 1A, the foregoing application icon may be an application icon of a flight application installed on the first electronic device. The flight floating ball is associated with the flight application. In this way, the user can know; through the application icon, the application that the first electronic device relies on to provide the floating ball notification service. In this way, after seeing the application icon, the user may also open the foregoing application installed on the first electronic device, to acquire more services provided by the application.

Figure 1B:

Specifically, the foregoing flight floating ball is associated with a boarding pass page of a booked flight provided by the foregoing flight application. The flight information of the booked flight may be displayed on the page, such as a departure time, an arrival time, a boarding gate, and a seat number, referring to FIG. 1B. The prompt information in the flight floating ball: "52K boarding gate" can remind the user of the boarding gate of the booked flight in real time when the page shown in FIG. 1B is closed; and "View the boarding pass" can remind the user to click the foregoing floating ball to acquire the boarding pass page, so as to acquire more flight information provided by the boarding pass page.

In some cases, the prompt information displayed in the floating ball is sufficient to meet the user's needs. In some cases, the prompt information displayed in the floating ball may not meet the user's needs. In this case, the user may click the foregoing floating ball to acquire more information including the prompt information.

The foregoing flight floating ball is used as an example. The user can acquire the boarding gate of the booked flight through "52K boarding gate" displayed in the floating ball. In some cases, the user knows the boarding gate information and can confirm which boarding gate to go to board the plane. In this case, the prompt information displayed in the floating ball is sufficient to meet the user's needs.

Figure 1C:
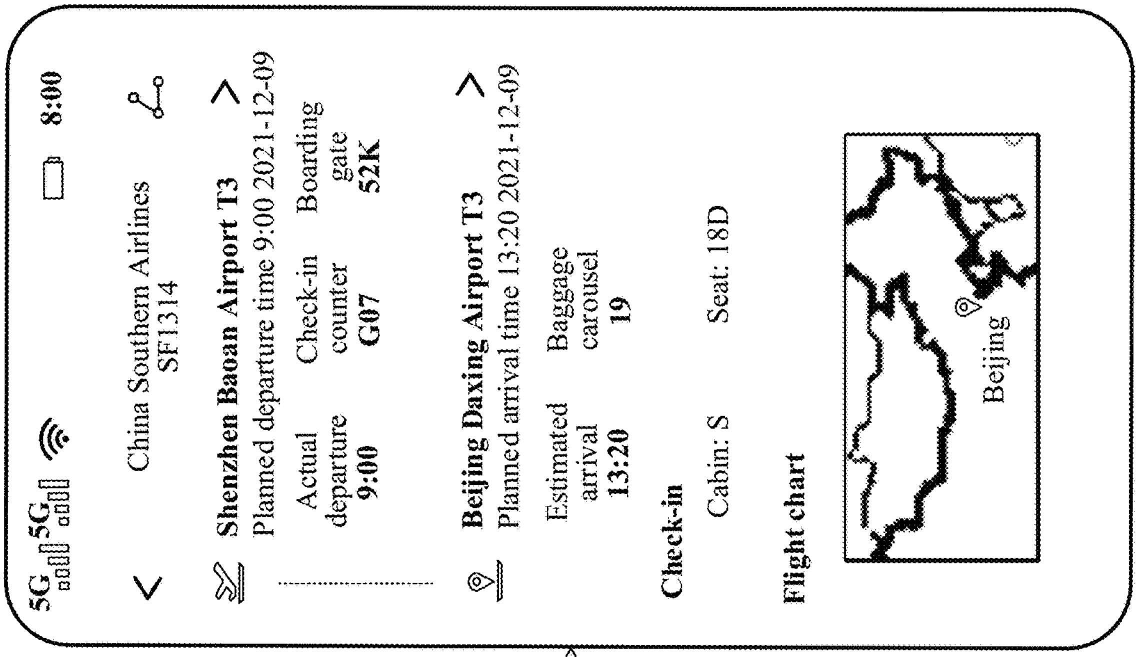

However, in some cases, the user may further need to know information such as the seat number. In this case, the prompt information displayed in the floating ball is insufficient to meet the user's needs. In this case, the user may click the floating ball to acquire more flight information not displayed in the prompt information. As shown in FIG. 1B, the first electronic device may detect a user operation on the flight floating ball, and in response to the user operation, the first electronic device may display a user interface on which a boarding pass is displayed shown in FIG. 1C. In this way, the user can quickly acquire the flight information of the booked flight through the flight floating ball.

However, in a multitasking scenario, when a new floating ball is generated, the previously generated floating ball will be replaced by the new floating ball. For example, the first electronic device may detect a translation scenario after displaying the flight floating ball. In response to detecting the translation scenario, the first electronic device may display a translation floating ball to provide the user with a fast translation service. In this case, in a scenario in which the floating ball does not support multitasking, after the translation floating ball is generated, the flight floating ball will be crowded out by the translation floating ball. That is, the flight floating ball will be ended. Therefore, the user can no longer enter the flight application and acquire the flight information through the shortcut provided by the flight floating ball.

Therefore, an embodiment of this application provides a floating ball processing method in a multitasking scenario.

By implementing the method, in a multitasking scenario, the first electronic device can display a plurality of floating balls. In this way, the user can simultaneously acquire prompt information of a plurality of floating balls. Further, the first electronic device can further adjust display states of the plurality of floating balls according to different scenarios, so as to avoid blocking of the screen caused by an excessively large quantity of floating balls and affecting the user experience.

Specifically, the first electronic device may be provided with a plurality of floating balls, and conditions (display conditions) that need to be met for displaying the floating balls. Subsequently, the first electronic device may acquire data (state data) indicating the current operating state in real time, and detect whether the state data meets the display condition of one or more of the plurality of floating balls. When the display condition of one or more floating balls is met, the first electronic device may display the corresponding one or more floating balls.

For example, when it is detected that the current state data of the first electronic device meets the display condition of the flight floating ball, the first electronic device may generate and display the flight floating ball; and when it is detected that the current state data of the first electronic device meets the display condition of the translation floating ball, the first electronic device may generate and display the translation floating ball. That is, in a possible implementation, the flight floating ball and the translation floating ball are simultaneously displayed on the display interface of the first electronic device. The first electronic device can manage the two floating balls separately, so as to prevent the translation floating ball generated later from crowding the flight floating ball generated earlier.

Further, the first electronic device can set floating ball display rules according to the time validity characteristics of different floating ball services. For a plurality of floating balls displayed simultaneously, the first electronic device can also set a combination display rule for combined display of floating balls, to avoid blocking to the foreground application interface due to an excessively large quantity of floating balls. The foreground application refers to a running application that is visible on the desktop. Referring to FIG. 1A, a video player may be installed on the first electronic device, and the video player is invoking a display screen to play a video. The video player may be referred to as a foreground application running on the first electronic device.

For example, after displaying a floating ball, the first electronic device may detect whether there is a user operation on the floating ball within a preset time. When no user operation on the floating ball is detected within the preset time, the first electronic device may hide the floating ball, so as to reduce the display region of the floating ball and reduce the blocking of the floating ball to the foreground application interface. A length of the preset time is, for example, 5 seconds. This is not limited in this embodiment of this application.

When there are a plurality of hidden floating balls on the screen, the first electronic device may aggregate the plurality of hidden floating balls, and display one aggregated floating ball, thereby further reducing the display region of the floating ball and reducing the blocking of the floating ball to the foreground application interface.

Figure 2A:
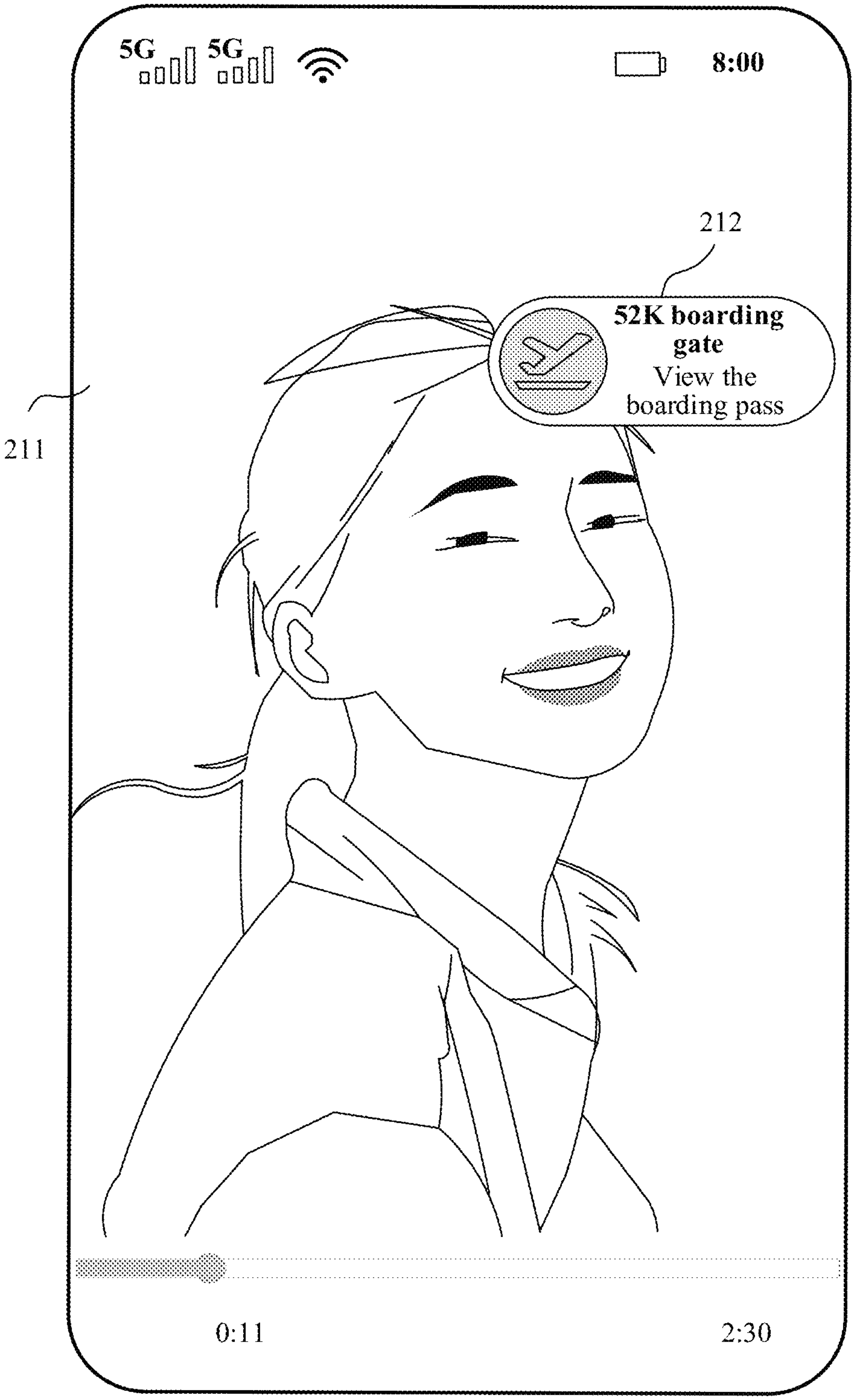
FIG. 2A and FIG. 2B show a group of user interfaces on which an electronic device changes a floating ball from an unfolded state to a thumbnail state according to an embodiment of this application.
Figure 2B:

Specifically, FIG. 2A and FIG. 2B show examples of a user interface on which the first electronic device hides a floating ball.

Referring to the user interface shown in FIG. 2A, the interface includes a window 211 and a floating ball 212. The window 211 may display a home page (home page) of the first electronic device and a user interface provided by an application. The application refers to an application installed on the first electronic device other than an application associated with the floating ball 212. In this case, the content displayed in window 211 may indicate that the first electronic device is executing a video playback application.

When it is detected that the current state data of the first electronic device meets display conditions of the flight floating ball, the first electronic device may generate and display the flight floating ball. The floating ball 212 may represent the flight floating ball. The foregoing display conditions are, for example: 1. The first electronic device is currently positioned within the geographic range of the departure airport of the flight booked by the user. 2. The current system time of the first electronic device is within the waiting time range of the flight booked by the user. The foregoing waiting specifically refers to the process in which the user completes the security check and waits for boarding at the boarding gate. The foregoing display conditions are extracted based on the characteristics of flight services.

The flight floating ball may be associated with a flight application on the first electronic device. The application icon in the floating ball 212 may indicate the flight application associated with the flight floating ball. The prompt information in the floating ball 212 can facilitate the user to quickly acquire important flight information in the current scenario.

The current environment may be a scenario in which the user is about to board a plane. In this case, through the floating ball 212, the user can quickly acquire the boarding gate information of the boarding process to be performed. That is, the flight information can be acquired without entering the foregoing flight application. The entering the flight application means that the first electronic device runs the flight application and displays a user interface provided by the flight application.

In this case, the display state of the floating ball 212 in which an application icon and prompt information are displayed in FIG. 2A may be referred to as an unfolded state of the floating ball. In this case, the display region occupied by the floating ball 212 is relatively large, which may degrade the experience of the user for using other applications. In particular, when a plurality of floating balls in an unfolded state are displayed, the plurality of unfolded floating balls in the unfolded state occupy a larger display area in the entire display window; and the blocking to the foreground application interface (the application that is using the window 211 for playing a video) is more serious, which greatly affects the user experience.

Therefore, after the floating ball 212 is displayed, the first electronic device detects whether there is a user operation on the floating ball 212 within 5 seconds after the floating ball 212 is displayed. The foregoing 5 seconds is an exemplary preset time.

If the first electronic device does not detect any user operation on the floating ball 212 in the unfolded state within the preset time, the first electronic device may push the floating ball 212 to the right side of the screen, and only display the application icon part of the floating ball 212, referring to FIG. 2B. In this case, the display region occupied by the floating ball 212 in FIG. 2B is significantly reduced, thereby reducing the blocking to the application currently running in the foreground and improving the user experience. The display state of the floating ball 212 in FIG. 2B may be referred to as a thumbnail state of the floating ball.

The process in which the first electronic device changes the floating ball from the unfolded state to the thumbnail state to reduce the display area of the floating ball shown in FIG. 2A to FIG. 2B may be referred to as hiding the floating ball by the first electronic device.

Figure 2C:
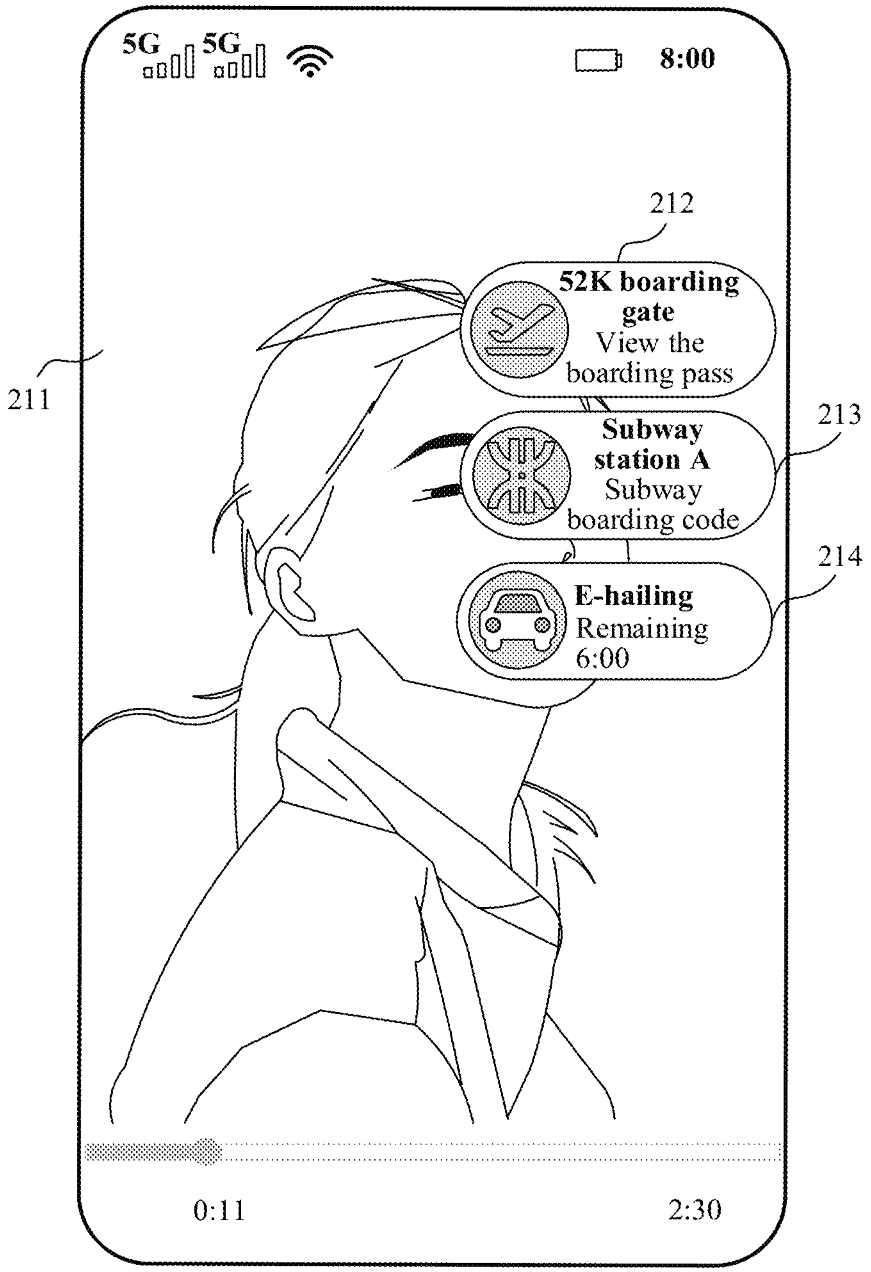
FIG. 2C to FIG. 2E show a group of user interfaces on which an electronic device aggregates a plurality of floating balls into one floating ball according to an embodiment of this application.
Figure 2D:
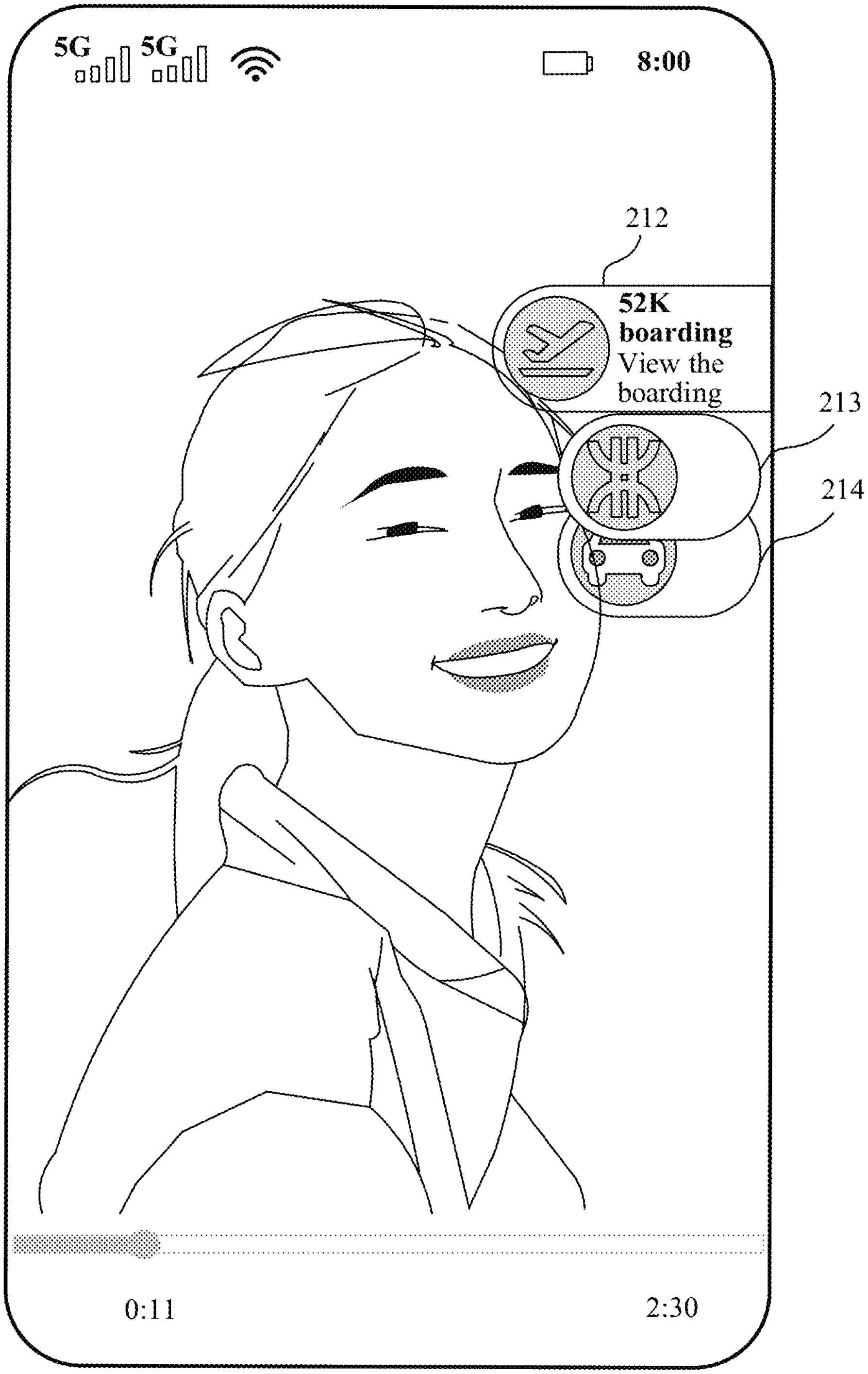
Figure 2E:

FIG. 2C to FIG. 2E show examples of a user interface on which the first electronic device aggregates a plurality of floating balls in a thumbnail state.

First, in the user interface shown in FIG. 2C, the first electronic device may display a plurality of floating balls in an unfolded state, such as a flight floating ball 212, a subway floating ball 213, and a travel floating ball 214. For the flight floating ball 212, reference may be made to the foregoing introduction, and details are not described herein again. The subway floating ball 213 can be configured to display a subway boarding code. The travel floating ball 214 can be configured to display information such as the arrival time or the time to reach the specified destination of an e-hailing car booked by the user. Different types of floating balls will be introduced below in detail.

For any one of the foregoing floating balls, within 5 seconds (preset time) after the floating ball is displayed, if the first electronic device does not detect any user operation on the floating ball, the first electronic device may change the floating ball from an unfolded state to a thumbnail state. When there are a plurality of floating balls that need to be changed to the thumbnail state, the first electronic device may aggregate the plurality of floating balls into one floating ball, referred to as a floating ball in an aggregated state, in the process of changing the plurality of floating balls to the thumbnail state.

Referring to FIG. 2D, after the floating ball has been displayed for 5 seconds, the flight floating ball 212, the subway floating ball 213, and the travel floating ball 214 can all enter the thumbnail state. In this case, when a plurality of floating balls in a thumbnail state are detected, the first electronic device may aggregate the flight floating ball 212, the subway floating ball 213, and the travel floating ball 214 that enter the thumbnail state into one floating ball, and then display the one floating ball, referring to the floating ball 215 in FIG. 2E. The one floating ball may be referred to as a floating ball in an aggregated state.

Not limited to a mobile phone, the first electronic device may alternatively be a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, an in-vehicle device, a smart home device, and/or a smart city device. A specific type of the electronic device is not particularly limited in this embodiment of this application.

Figure 3A:
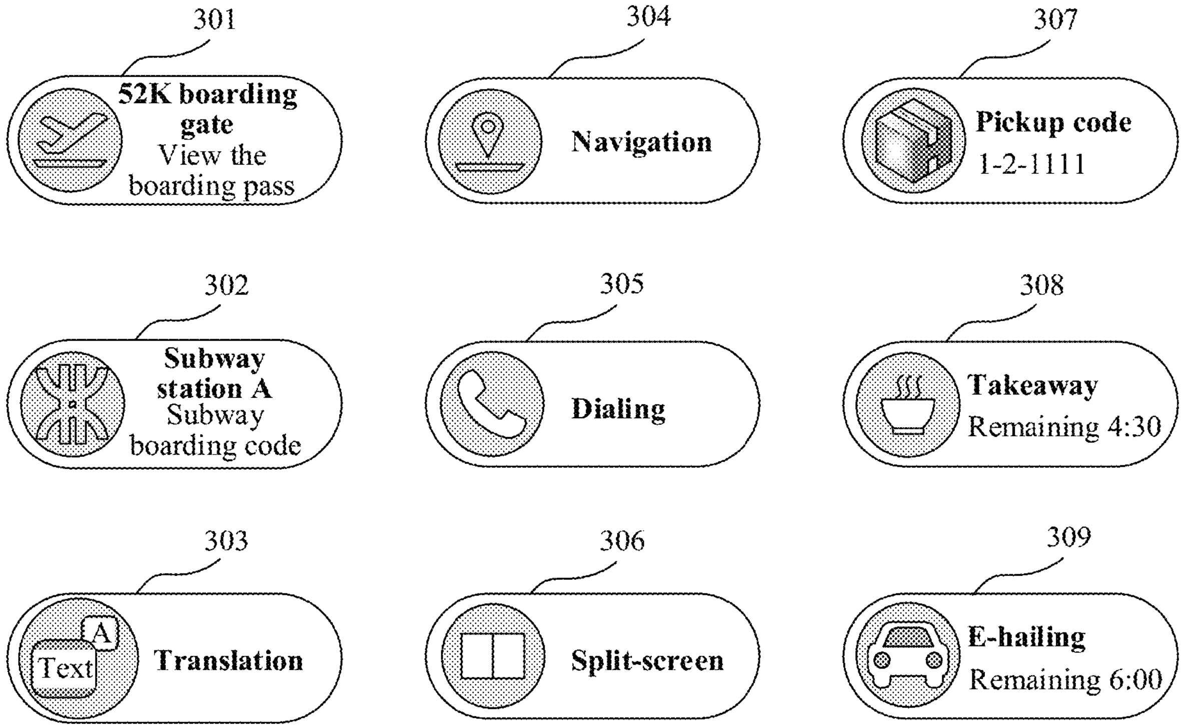
FIG. 3A is a schematic diagram of different types of floating balls according to an embodiment of this application.

FIG. 3A shows an example of floating balls corresponding to different service scenarios that may be displayed on the first electronic device below.

As shown in FIG. 3A, a floating ball 301 (the flight floating ball 212 in FIG. 2C) may represent a flight floating ball that provides flight service notifications. The flight floating ball may be associated with a flight application installed on the first electronic device and providing services such as flight inquiry and flight booking. The information displayed in the flight floating ball may come from the flight application. When a user operation on the floating ball 301 is detected, the first electronic device may display all flight information of the booked flight, which will be described in detail in subsequent embodiments, and details are not described herein.

A floating ball 302 (that is, the subway floating ball 213 in FIG. 2C) may represent a subway floating ball that provides a service of quickly displaying a subway boarding code. The subway floating ball may be associated with a subway application installed on the first electronic device and providing services such as subway inquiry and displaying of subway boarding codes. The information displayed in the subway floating ball may come from the subway application. When a user operation on the floating ball 302 is detected, the first electronic device may display the subway boarding code, thereby providing the user with a fast code-scanning boarding service.

A floating ball 303 may represent a translation floating ball that provides translation services. The translation floating ball can translate the copied content recorded in a clipboard of the first electronic device into a text expressed in a commonly used system language of the first electronic device. When a user operation on the floating ball 303 is detected, the first electronic device may display a translation page. The foregoing copied content and the text of the foregoing copied content expressed in the commonly used system language may be displayed on the translation page.

A floating ball 304 may represent a navigation floating ball that provides map navigation services. The first electronic device may recognize a copied location in a clipboard, and then generate a navigation floating ball. The navigation floating ball may be associated with an application installed on the first electronic device and providing map display and navigation services, and uses the application to determine the route from the current location of the first electronic device to the foregoing copied location. When a user operation on the floating ball 304 is detected, the first electronic device may display a navigation page. The route from the current location of the first electronic device to the foregoing location may be displayed on the navigation page. Therefore, the user can acquire a fast navigation service through the navigation page.

A floating ball 305 may represent a calling floating ball that provides a speed dial service. The first electronic device may recognize a copied phone number in the clipboard, and then generate a calling floating ball. The calling floating ball may be associated with a calling application installed on the first electronic device. When a user operation on the floating ball 305 is detected, the first electronic device may call the foregoing copied phone number, thereby providing a quick dial service for the user.

A floating ball 306 may represent a split-screen floating ball that provides a split-screen service. The foregoing split-screen refers to simultaneously running two applications on one mobile phone screen and displaying window views provided by the two applications. In some embodiments, the first electronic device further supports adjusting relative window sizes of the two applications. Not limited to two applications, there may be three or even more applications. This is not limited in this embodiment of this application.

The first electronic device may detect a user operation of frequently switching between two or more applications by the user, for example, an operation of switching from an application A to an application B and then switching to the application A, which frequently changes the foreground application. In this case, the first electronic device may generate a split-screen floating ball, that is, the floating ball 306. When a user operation on the floating ball 306 is detected, the first electronic device may divide the mobile phone screen into a plurality of windows. A view provided by one application is displayed in one window. In this case, the split-screen floating ball may prompt the user to display the application A and the application B in a split-screen manner. The application A and the application B both support split-screen display.

A floating ball 307 may represent an express floating ball that provides an express query service. The express floating ball may be associated with an express application installed on the first electronic device and providing an express query service. The user's express code may be displayed in the express floating ball. The express information displayed in the express floating ball may come from the express application. When a user operation on the floating ball 307 is detected, the first electronic device may display more information of the foregoing express order, such as a content type, a content picture, a sender, and a mailing address.

A floating ball 308 may represent a takeaway floating ball that provides notifications for takeaway orders. The express floating ball may be associated with a takeaway application installed on the first electronic device and providing a takeaway service. The remaining delivery time of the takeaway ordered by the user may be displayed in the takeaway floating ball. The delivery time information displayed in the takeaway floating ball may come from the takeaway application. When a user operation on the floating ball 308 is detected, the first electronic device may display more information about the takeaway order, such as a product list, an order number, merchant contact information, and a receiving address.

A floating ball 309 (that is, the floating ball 214 in FIG. 2C) may represent a travel floating ball that provides e-hailing notifications. The travel floating ball may be associated with a travel application installed on the first electronic device and providing a taxi-hailing service. Information such as the arrival time or the time to reach the specified destination of an e-hailing car booked by the user may be displayed in the travel floating ball. The arrival time of the e-hailing car displayed in the travel floating ball may come from the travel application. When a user operation on the floating ball 309 is detected, the first electronic device may display more information about the travel order, such as an order number, a vehicle location, a departure place, a destination, driver contact information, and a license plate.

According to the timeliness characteristics of the services provided by different floating balls, the first electronic device may set different ending mechanisms (disappearance mechanisms) for different floating balls, so as to not only satisfy the fast services provided by the floating balls, but also avoid redundant display and influence on user browsing experience.

In some embodiments, after displaying a floating ball in an unfolded state, when no user operation on the floating ball in the unfolded state is detected within a preset time, the first electronic device may change the floating ball from the unfolded state to a thumbnail state, that is, hide the floating ball in the unfolded state. Subsequently, when the service in the application associated with the floating ball ends, the first electronic device may end the displaying of the floating ball. After the ending, the first electronic device no longer displays the floating ball.

In some other embodiments, after displaying a floating ball in an unfolded state, when no user operation on the floating ball in the unfolded state is detected within a preset time, the first electronic device may alternatively directly end the floating ball.

The flight floating ball (floating ball 301) in FIG. 3A is used as an example. After it is detected that the user completes the security check and enters the departure hall, the first electronic device may display the floating ball 301 in an unfolded state. After the floating ball 301 in the unfolded state is displayed for a period of time, for example, 5 seconds, and the first electronic device does not detect any user operation on the floating ball 301 within the period of time, the first electronic device may adjust the floating ball 301 from the unfolded state to a thumbnail state. After detecting that the user has boarded the plane, the first electronic device may end the displaying of the floating ball 301.

The navigation floating ball (floating ball 304) in FIG. 3A is used as an example. After a user operation of copying a location is detected, the first electronic device may display the floating ball 304 in an unfolded state. After the floating ball 304 in the unfolded state is displayed for a period of time, and the first electronic device does not detect any user operation on the floating ball 304 within the period of time, the first electronic device may adjust the floating ball 301 from the unfolded state to a thumbnail state. After the floating ball 304 in the thumbnail state is displayed for a period of time, and the first electronic device does not detect any user operation on the floating ball 304 within the period of time, the first electronic device may end the displaying of the floating ball 304.

The time for entering the thumbnail state or being ended from the unfolded state corresponding to different types of floating balls may be the same or different, and the time from the thumbnail state to being ended may be the same or different, which is not limited in this embodiment of this application.

The foregoing floating ball that will be ended due to no detection of user operations on the floating ball (navigation floating ball) may be referred to as a transient floating ball. The first electronic device can remind the user which floating balls are transient floating balls through a countdown ring, thereby reminding the user to acquire the fast services provided by the transient floating balls in time, so as to avoid a case that the foregoing transient floating balls cannot be acquired again after the transient floating balls are ended, and then the quick services provided by the foregoing transient floating balls cannot be acquired.

FIG. 3A shows an example of transient floating balls that may be displayed on the first electronic device.

Figure 3B:
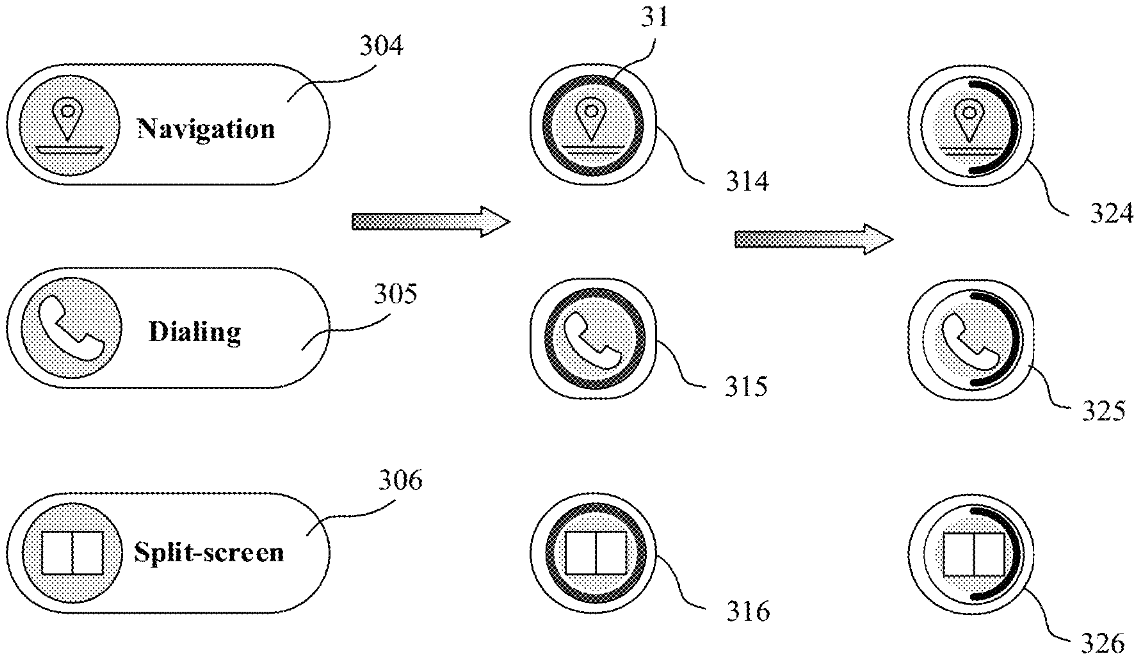
FIG. 3B is a schematic diagram of a transient floating ball according to an embodiment of this application.

In the process of displaying a floating ball in an unfolded state, if no user operation on the floating ball is detected, the first electronic device may change the floating ball from the unfolded state to a thumbnail state. As shown in FIG. 3B, the navigation floating ball may be changed from the state shown by the floating ball 304 to the state shown by the floating ball 314.

When the navigation floating ball in the thumbnail state is displayed, if no user operation on the navigation floating ball (floating ball 304) is detected within a preset time, the first electronic device ends the displaying of the navigation floating ball. That is, the navigation floating ball is a transient floating ball. When the first electronic device displays the navigation floating ball (floating ball 314) in the thumbnail state, a countdown ring may be incidentally displayed on the application icon in the navigation floating ball, for example, a ring 31 in the floating ball 314 in FIG. 3B.

When the floating ball 314 in the thumbnail state starts to be displayed, the countdown ring is a complete ring. As time goes by, the ring may gradually decrease counterclockwise from the 12 o'clock position, referring to the state of the floating ball 324 in FIG. 3B. When the countdown ring disappears, the countdown is over, and the first electronic device may end the displaying of the floating ball 314. The timing duration of the countdown ring is the duration for the first electronic device to display the floating ball 314 in a thumbnail state.

Similarly, when a dialing floating ball is a transient floating ball, the dialing floating ball (floating ball 305) entering a thumbnail state may have an appearance as the floating ball 315, and then change to an appearance as the floating ball 325. When a split-screen floating ball is a transient floating ball, the split-screen floating ball (floating ball 306) entering a thumbnail state may have an appearance as the floating ball 316, and then change to an appearance as the floating ball 326. Not limited to the transient floating balls shown in FIG. 3B, the first electronic device may further set other types of floating balls in FIG. 3A to transient floating balls, which is not limited in this embodiment of this application.

FIG. 4A to FIG. 4H, FIG. 5A to FIG. 5I, and FIG. 6A to FIG. 6I show user interfaces on which the first electronic device implements a floating ball processing method in a multitasking scenario according to an embodiment of this application below.

FIG. 4A to FIG. 4H show an example of a group of user interfaces on which the first electronic device displays a plurality of floating balls in a multitasking scenario.

Figure 4A:
FIG. 4A to FIG. 4N show a group of user interfaces on which an electronic device displays a floating ball according to an embodiment of this application.

First, FIG. 4A shows a user scenario in which a user watches a video by using a video playback application. In this case, the application (video player) that provides the service of playing videos may be referred to as the application currently running in the foreground. Views or controls displayed in a window 411 are provided by the video player.

The first electronic device can acquire the location in which the first electronic device is located in real time, which is denoted as a current location. The specific method for the first electronic device to acquire the current location is not limited in this embodiment of this application. For example, the first electronic device may use a global positioning system (global positioning system, GPS), a global navigation satellite system (global navigation satellite system, GLONASS), or a beidou navigation satellite system (beidou navigation satellite system, BDS) to acquire the current location. In addition, the first electronic device may alternatively acquire the current location by using a positioning method based on a location fingerprint of a base station signal and/or a high-fidelity wireless communication (wireless fidelity, Wi-Fi) signal.

After acquiring the current location, the first electronic device may confirm whether the current location is within the geographic range of the subway station and/or within the geographic range of the airport. The current location of the first electronic device being within the geographic range of the subway station may indicate that the user is currently in the subway station. Similarly, the current location of the first electronic device being within the geographic range of the airport may indicate that the user is currently in the airport. The geographic range of the subway station and the geographic range of the airport may be determined through the foregoing positioning service. Details are not described again in this embodiment of this application.

Figure 4B:
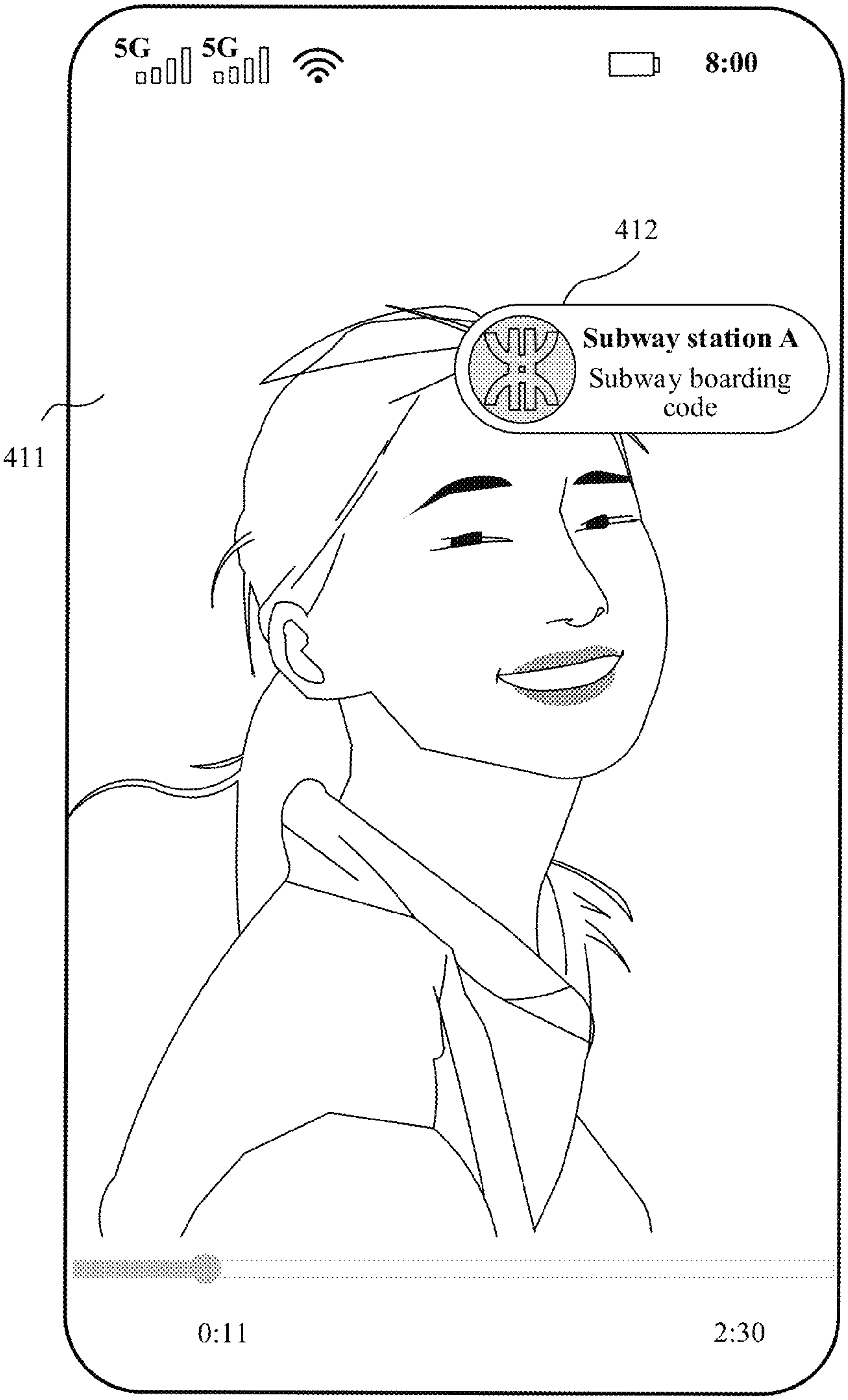

When the current location of the first electronic device is within the geographic range of the subway station, the first electronic device may display the subway floating ball, for example, a floating ball 412 shown in FIG. 4B, in the window 411.

Figure 4C:
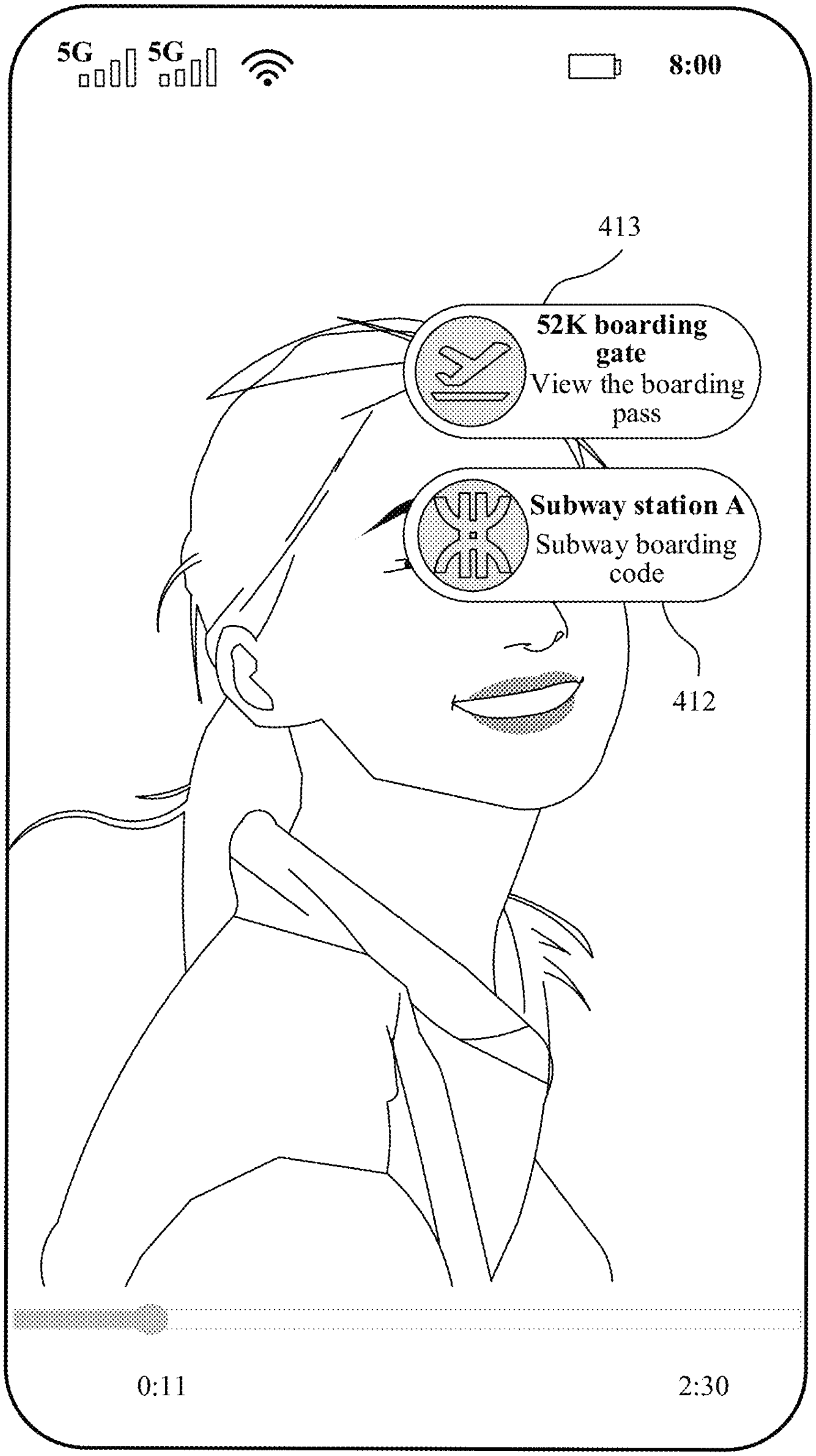

In addition, if the current location is also within the geographic range of the airport, the first electronic device may further display the flight floating ball, for example, a floating ball 413 shown in FIG. 4C, in the window 411.

Optionally, the first electronic device may display the floating ball generated later above the floating ball generated earlier. For example, if the first electronic device first determines that the current location is within the geographic range of the subway station, the first electronic device may first generate a subway floating ball (floating ball 412). Subsequently, the first electronic device may generate a flight floating ball (floating ball 413) within the geographic range of the airport according to the current location. In this case, the subway floating ball is a floating ball that is generated earlier, and the flight floating ball is a floating ball generated later. In the process of displaying the flight floating ball, the first electronic device may move the subway floating ball downward, and then display the flight floating ball at the position at which the subway floating ball was originally displayed.

Referring to FIG. 4B and FIG. 4C, after determining to display the subway floating ball, the first electronic device may display the subway floating ball at a position of the screen with ¼ from top to bottom. After determining to display the flight floating ball, the first electronic device may move the subway floating ball to the bottom of the screen, and display the flight floating ball at the position at which the subway floating ball was originally displayed (a position of the screen with ¼ from top to bottom). The initial display position, that is, the position of the screen with ¼ from top to bottom, is preset. The first electronic device may alternatively set other initial display positions. This is not limited in this embodiment of this application.

In this case, both the subway floating ball (floating ball 412) and the flight floating ball (floating ball 413) are floating balls in the unfolded state. In the display form in the unfolded state, the first electronic device may detect a user operation on the floating ball, for example, a click operation. In response to the user operation, the first electronic device may display more information associated with the currently displayed content of the floating ball.

Figure 4D:
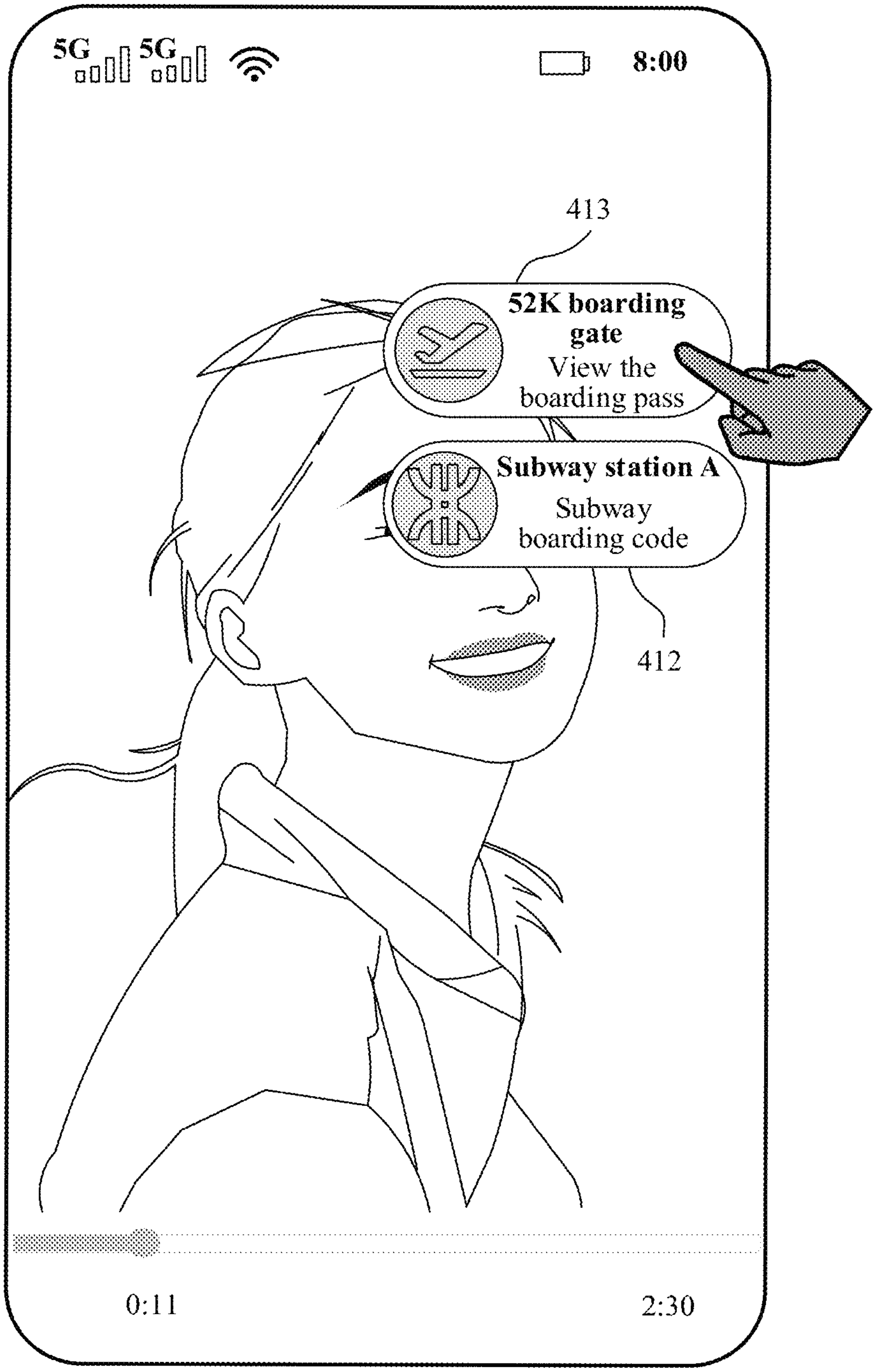
Figure 4E:
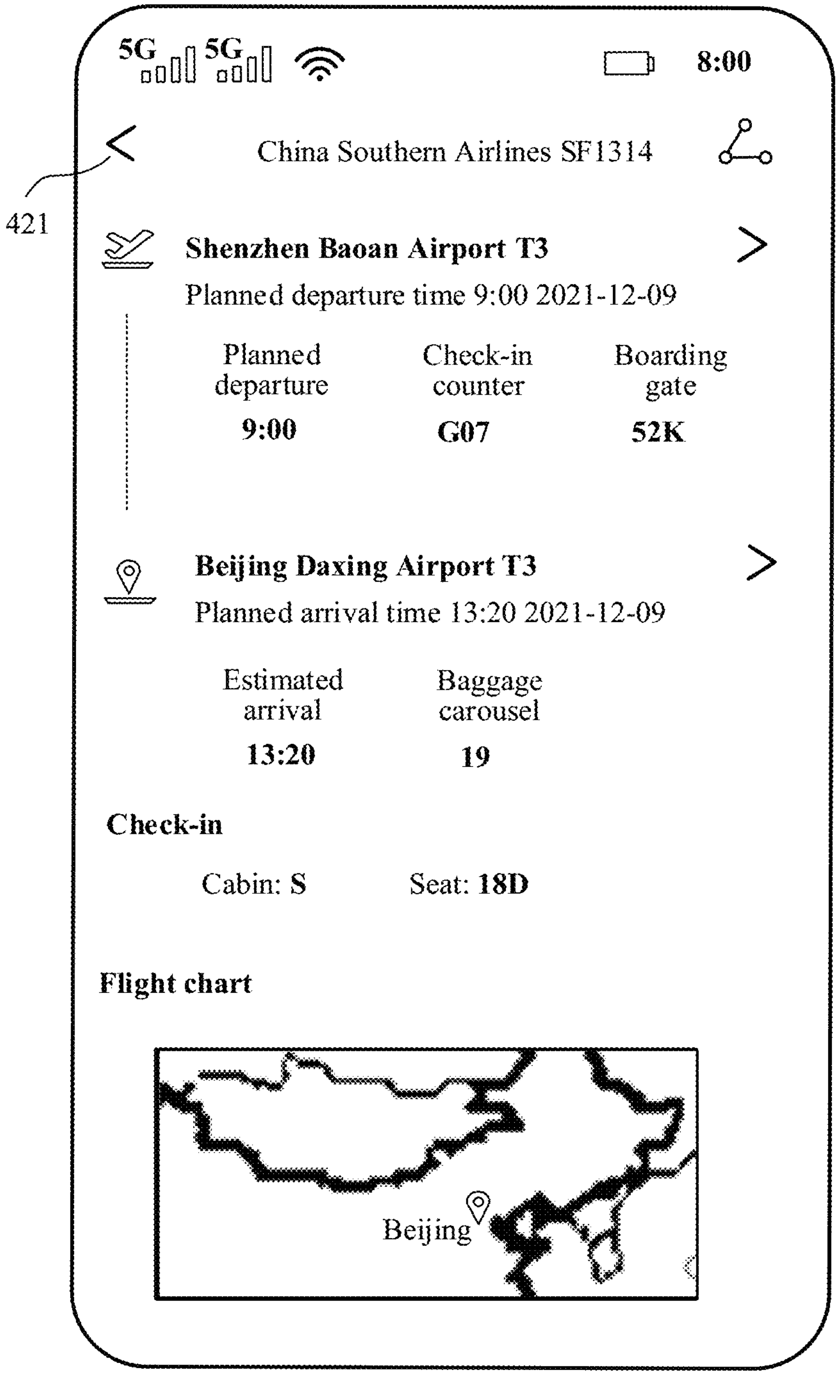

As shown in FIG. 4D, the first electronic device may detect a user operation of clicking the floating ball 413. In response to the user operation, the first electronic device may display a user interface shown in FIG. 4E. FIG. 4E shows an example of a user interface on which the first electronic device displays a boarding pass.

As shown in FIG. 4E, flight information such as a number (SF1314), a departure place (Shenzhen Baoan Airport T3), a destination (Beijing Daxing Airport T3), a departure time (9:00), a landing Time (13:20), a check-in counter (G07), a boarding gate (52K), and a seat number (S-18D) of the flight taken by the user for traveling may be displayed on the interface. In this way, by clicking the flight floating ball, the user can quickly and conveniently acquire detailed flight information of the flight booked by the user.

Figure 4F:
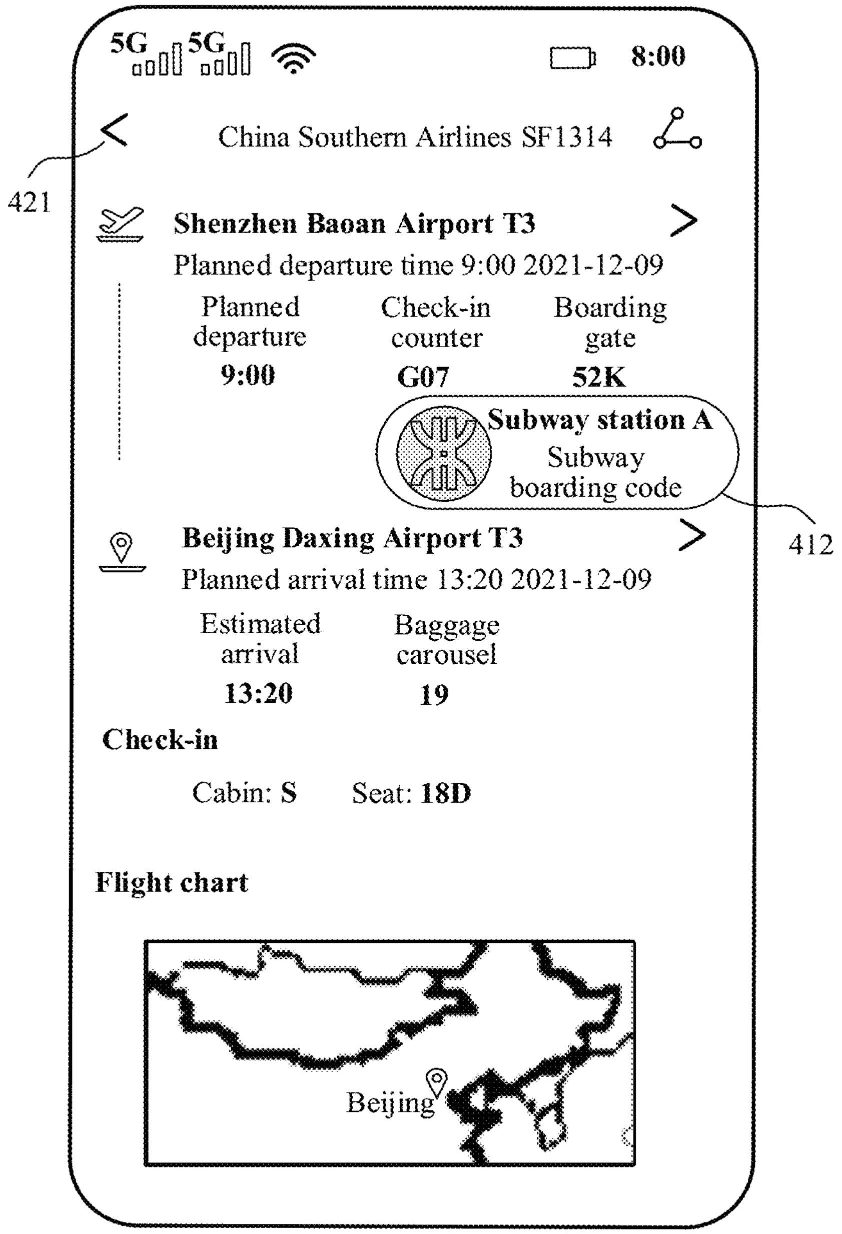

Optionally, referring to FIG. 4F, the first electronic device may also display a subway floating ball (floating ball 412) when displaying the boarding pass. In this way, the user can directly acquire a subway boarding two-dimensional code through the floating ball 412.

The user interface shown in FIG. 4E (or FIG. 4F) further includes a control 421. When a user operation on the control 421 is detected, the first electronic device may display the user interface shown in FIG. 4D. Alternatively, the first electronic device may display another interface provided by the flight application associated with the flight floating ball, for example, an air ticket query interface.

Figure 4G:
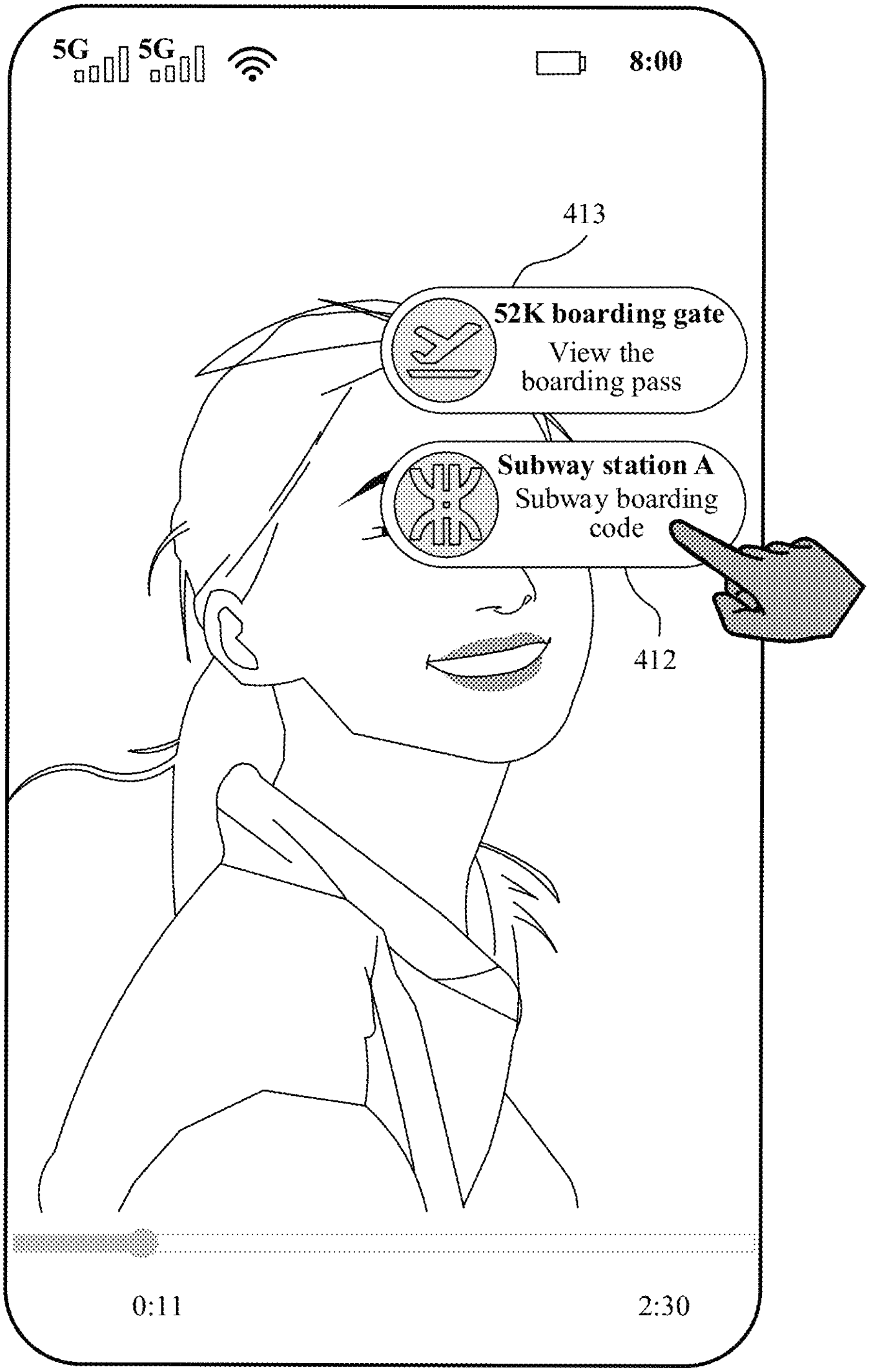
Figure 4H:
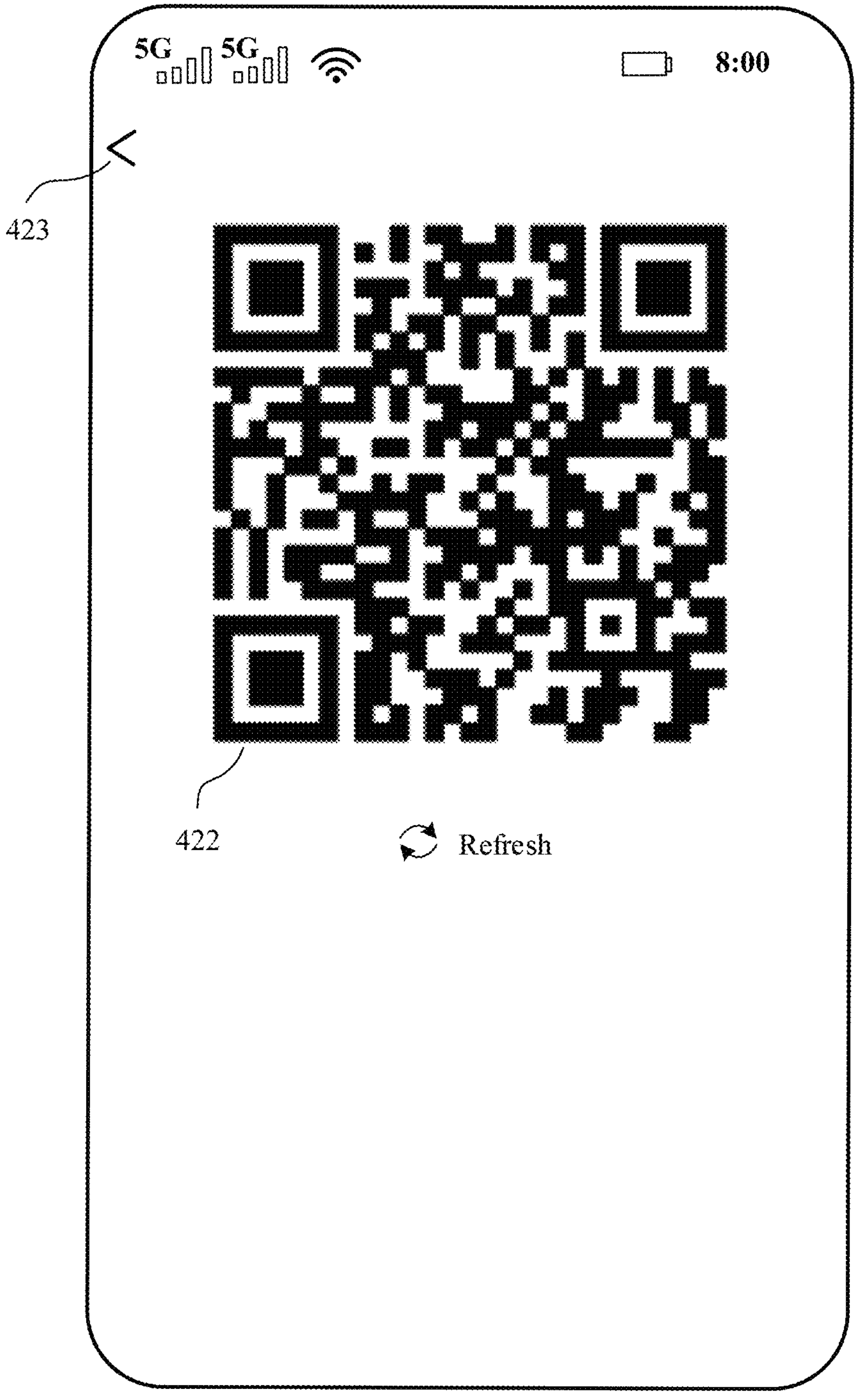

As shown in FIG. 4G, the first electronic device may detect a user operation of clicking the floating ball 412. In response to the user operation, the first electronic device may display a user interface shown in FIG. 4H. As shown in FIG. 4H, the interface may display a two-dimensional code 422. The two-dimensional code may be a subway two-dimensional code. After the user interface shown in FIG. 4H is displayed, the user can use the two-dimensional code 422 for quick code scanning to enter the station (subway station), thereby providing convenience for the user to travel by subway. The two-dimensional code may alternatively be a bus boarding code or the like, which is not limited in this embodiment of this application.

In some embodiments, the floating ball may alternatively be a floating ball corresponding to an application for payment. When detecting a user operation of clicking the floating ball, the first electronic device may display a bar code for payment. Not limited to two-dimensional codes and bar codes, the first electronic device can also be adapted to other service scenarios and display other graphic codes.

Figure 4I:
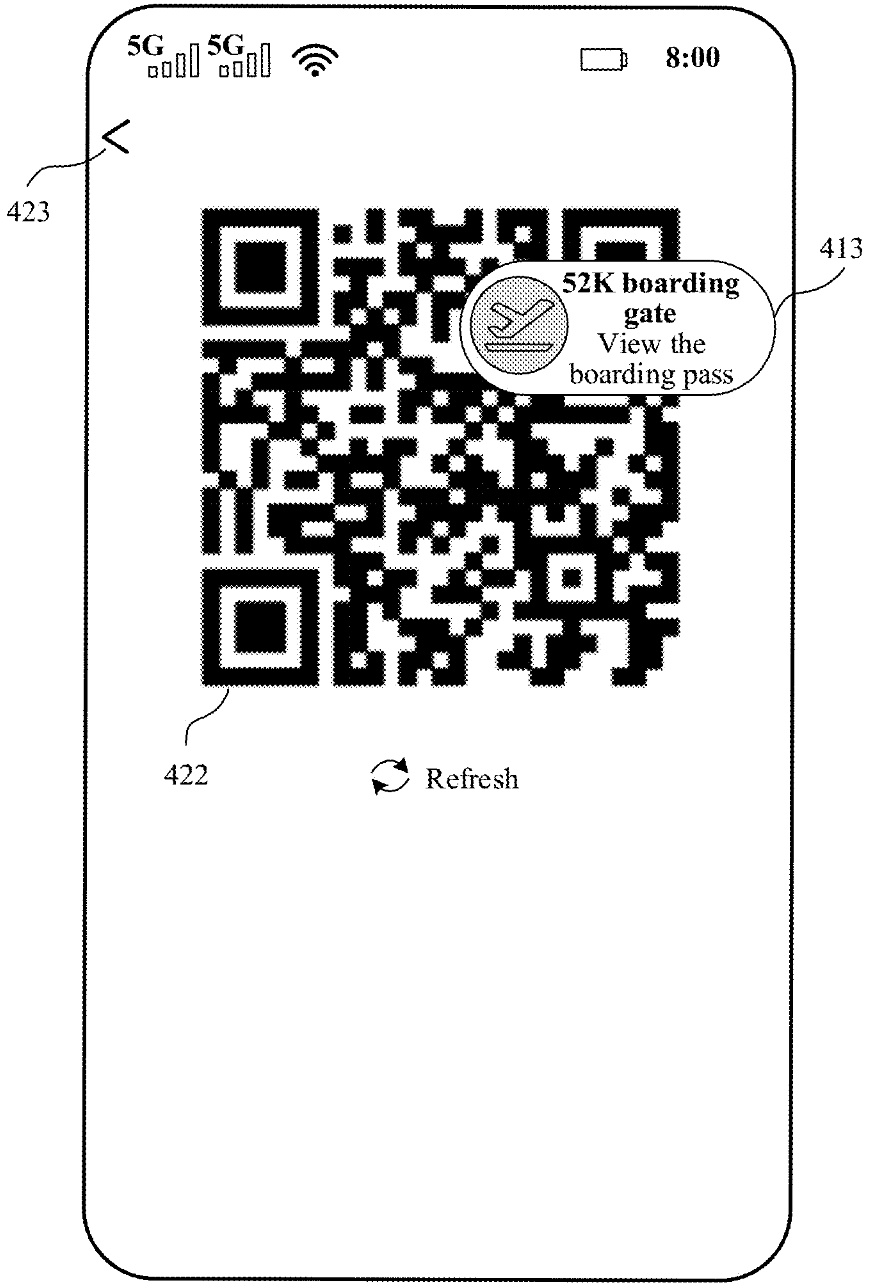
Figure 4J:
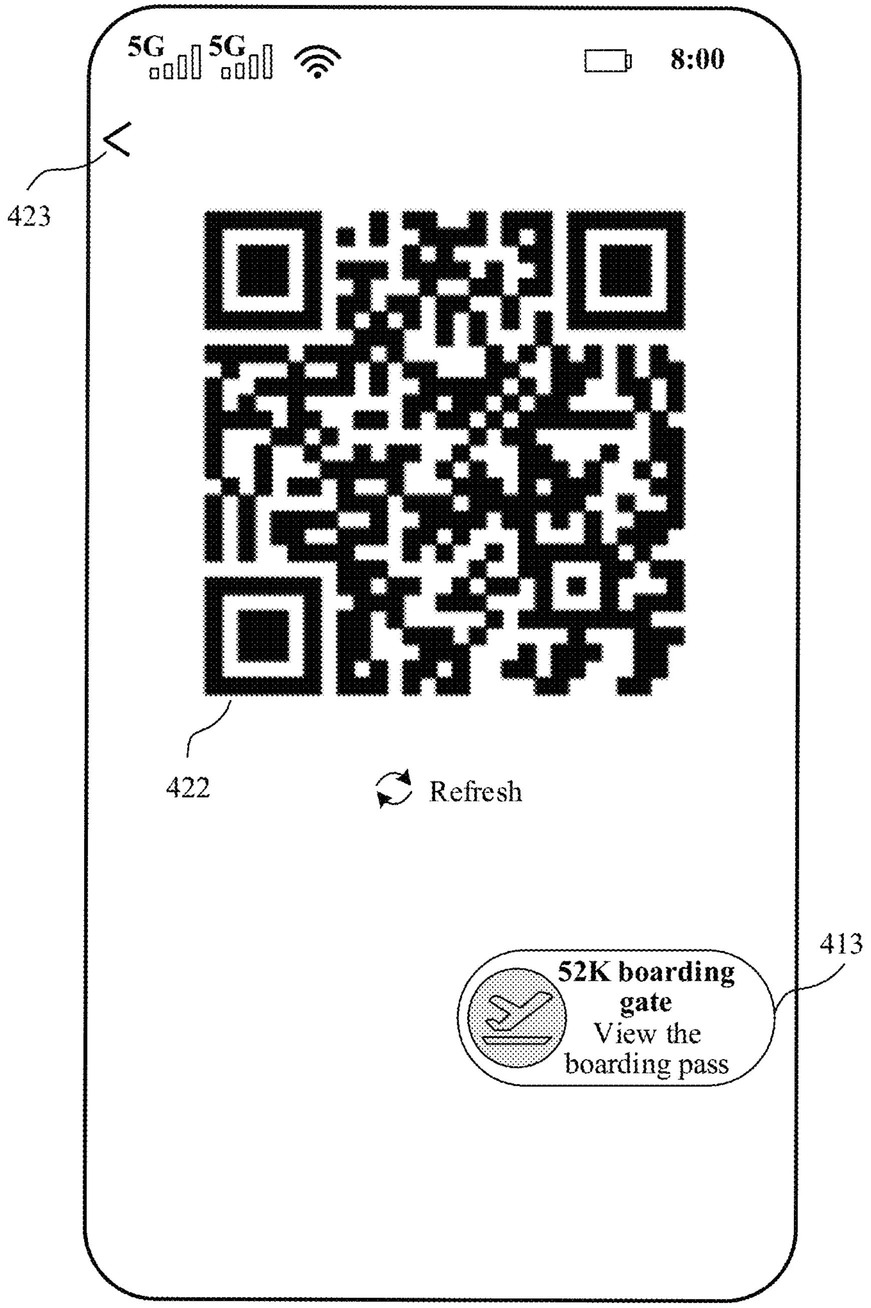

Optionally, referring to FIG. 4I, the first electronic device may also display a flight floating ball (floating ball 413) when displaying a two-dimensional code. In this way, the user can directly acquire a boarding pass through the floating ball 413. Preferably, when it is detected that a two-dimensional code is displayed, the first electronic device may move another floating ball displayed on the screen, for example, the floating ball 413, out of the region in which the two-dimensional code is displayed as shown in FIG. 4J, to avoid blocking the two-dimensional code and then hindering two-dimensional code recognition.

The user interface shown in FIG. 4H (or FIG. 4I or FIG. 4J) further includes a control 423. When a user operation on the control 423 is detected, the first electronic device may display the user interface shown in FIG. 4C. Alternatively, the first electronic device may display another user interface provided by the subway application associated with the subway floating ball.

In the process of displaying a floating ball in an unfolded state, if no user operation on the floating ball in the unfolded state is detected within a preset time, the first electronic device may hide the floating ball in the unfolded state, that is, adjust the floating ball in the unfolded state to a floating ball in a thumbnail state, to reduce the display region, avoid blocking to the foreground application, and improve the user experience.

Referring to FIG. 4C, after displaying the floating ball 412, the first electronic device may monitor whether there is a user operation of clicking the floating ball 412 within a preset time. Referring to the introduction of FIG. 2A and FIG. 2B, the preset time may be 5 seconds. Optionally, the preset time corresponding to different floating balls may be the same or different, and the specific length of the preset time is not limited in this embodiment of this application. For example, in the introduction of all of the subsequent embodiments, the preset time is 5 seconds.

When detecting a user operation of clicking the floating ball 412, the first electronic device may display a boarding pass interface corresponding to the floating ball 412. Conversely, if no user operation of clicking the floating ball 412 is detected within the preset time, the first electronic device may push the floating ball 412 in the unfolded state to the right side of the screen to hide the floating ball 412 as shown in FIG. 4K, that is, change the floating ball 412 to a thumbnail state.

Similarly, after displaying the floating ball 413, the first electronic device may monitor whether there is a user operation of clicking the floating ball 413 within a preset time. If no user operation of clicking the floating ball 413 is detected, the first electronic device may also change the floating ball 413 to a thumbnail state.

In this case, when there are a plurality of floating balls in a thumbnail state, the first electronic device may aggregate the plurality of floating balls in the thumbnail states, and display one aggregated floating ball. Specifically, when adjusting a floating ball from an unfolded state to a thumbnail state, the first electronic device may detect whether a floating ball in a thumbnail state is already displayed on the current screen. When it is detected that a floating ball in a thumbnail state has already been displayed, the first electronic device may aggregate the floating ball that is about to be adjusted to a thumbnail state with the existing floating ball in the thumbnail state, and then display an aggregated floating ball.

Figure 4K:

As shown in FIG. 4K, the floating ball 412 and the floating ball 413 may successively enter the thumbnail state. The first electronic device first displays the floating ball 412, so that the floating ball 412 can first enter the thumbnail state. When the floating ball 413 enters the thumbnail state, the first electronic device may detect that the floating ball 412 in the thumbnail state has already been displayed on the current screen. In this case, the first electronic device may aggregate the floating ball 412 and the floating ball 413 into one floating ball, referring to the floating ball 414 in FIG. 4L, thereby greatly reducing the blocking of the floating ball to the screen.

Optionally, the floating ball 414 after aggregation may display an application icon of the last floating ball that enters the thumbnail state. For example, compared with the floating ball 412, the floating ball 413 is the last floating ball that enters the thumbnail state. Alternatively, the floating ball 414 after aggregation in the thumbnail state may alternatively display an icon specifically indicating the aggregated floating ball. This is not limited in this embodiment of this application.

It may be understood that although there is only one floating ball after aggregation displayed by the first electronic device, the first electronic device still maintains a plurality of floating balls. The user can instruct the first electronic device to re-display the plurality of floating balls by an operation on the floating ball after aggregation, so that the user can select the currently required floating ball and acquire the service provided by the floating ball.

Figure 4L:
Figure 4M:
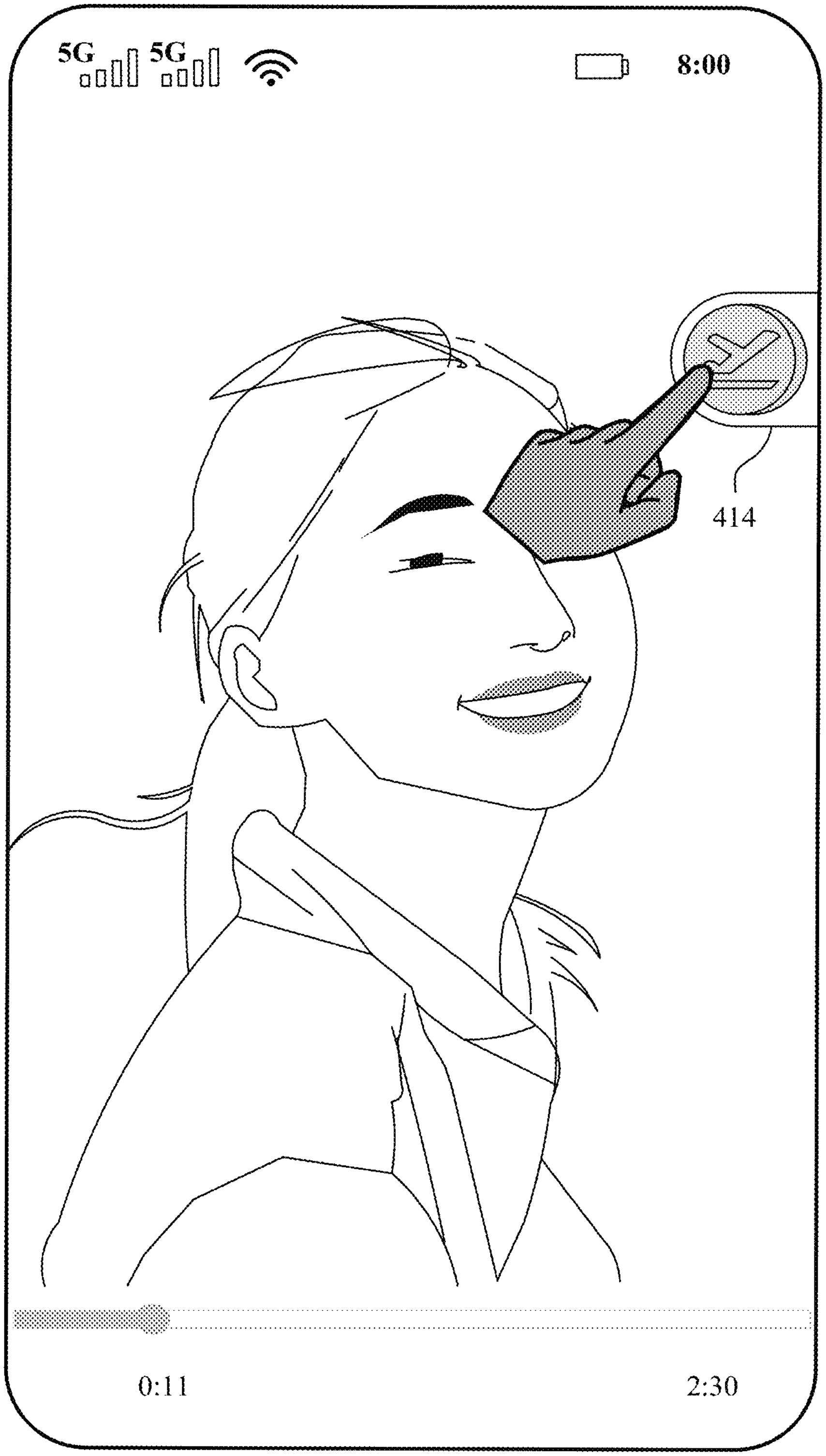
Figure 4N:
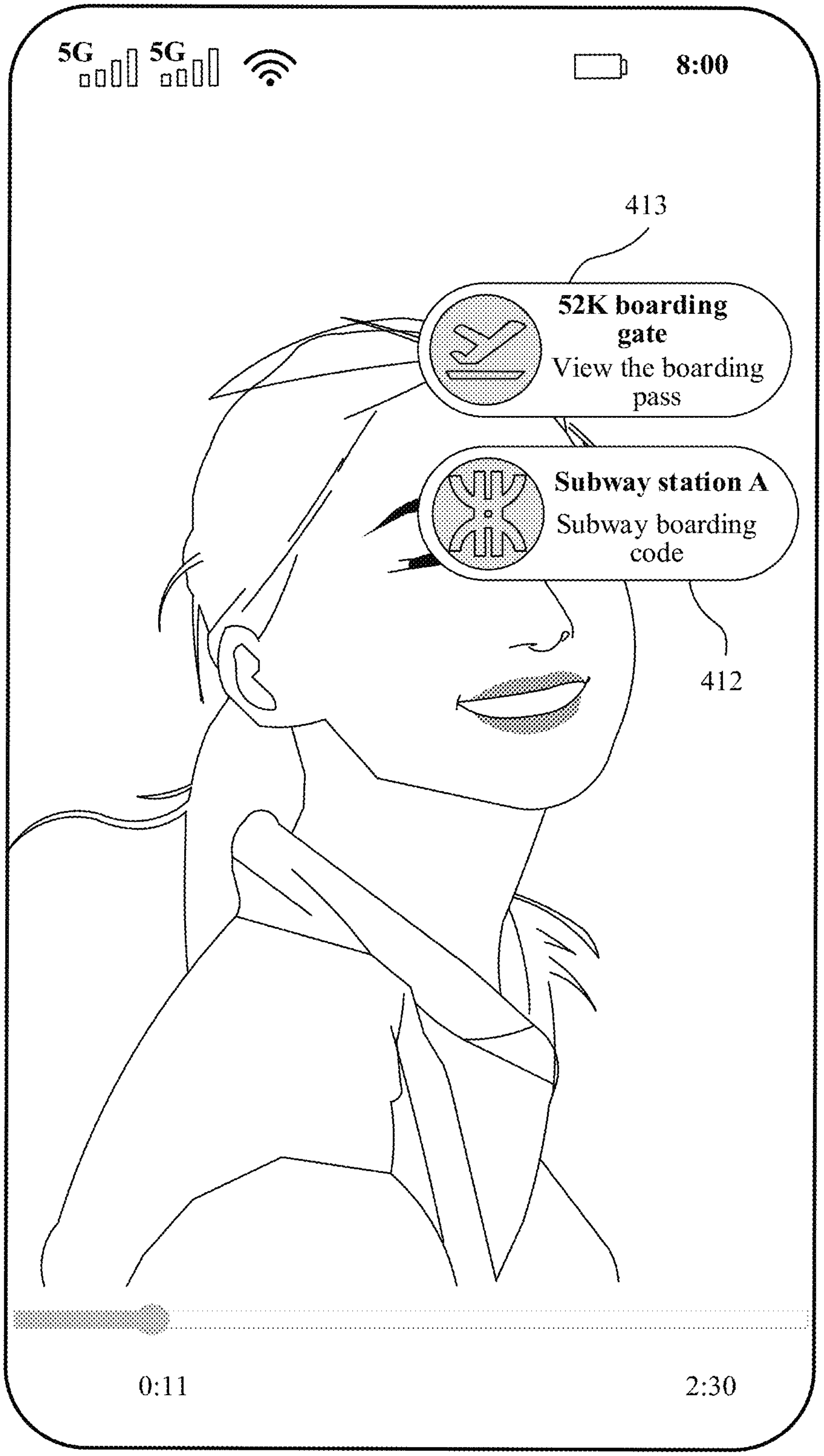

As shown in FIG. 4M, the first electronic device may detect a user operation on the floating ball 414, for example, a click operation. In response to the user operation, the first electronic device may display a user interface shown in FIG. 4N. As shown in FIG. 4N, in this case, the first electronic device may re-display the floating ball 412 and the floating ball 413 before aggregation. In this way; the user may click the floating ball 412 or the floating ball 413 to acquire a subway boarding code or a boarding pass.

The first electronic device may also monitor whether the user performs a preset specific operation. When the specific operation is detected, the first electronic device may display a floating ball matching the specific operation. FIG. 5A to FIG. 5I show examples of a user interface on which the first electronic device displays, according to a preset copy operation, a translation floating ball or a navigation floating ball matching the copy operation below.

Figure 5A:
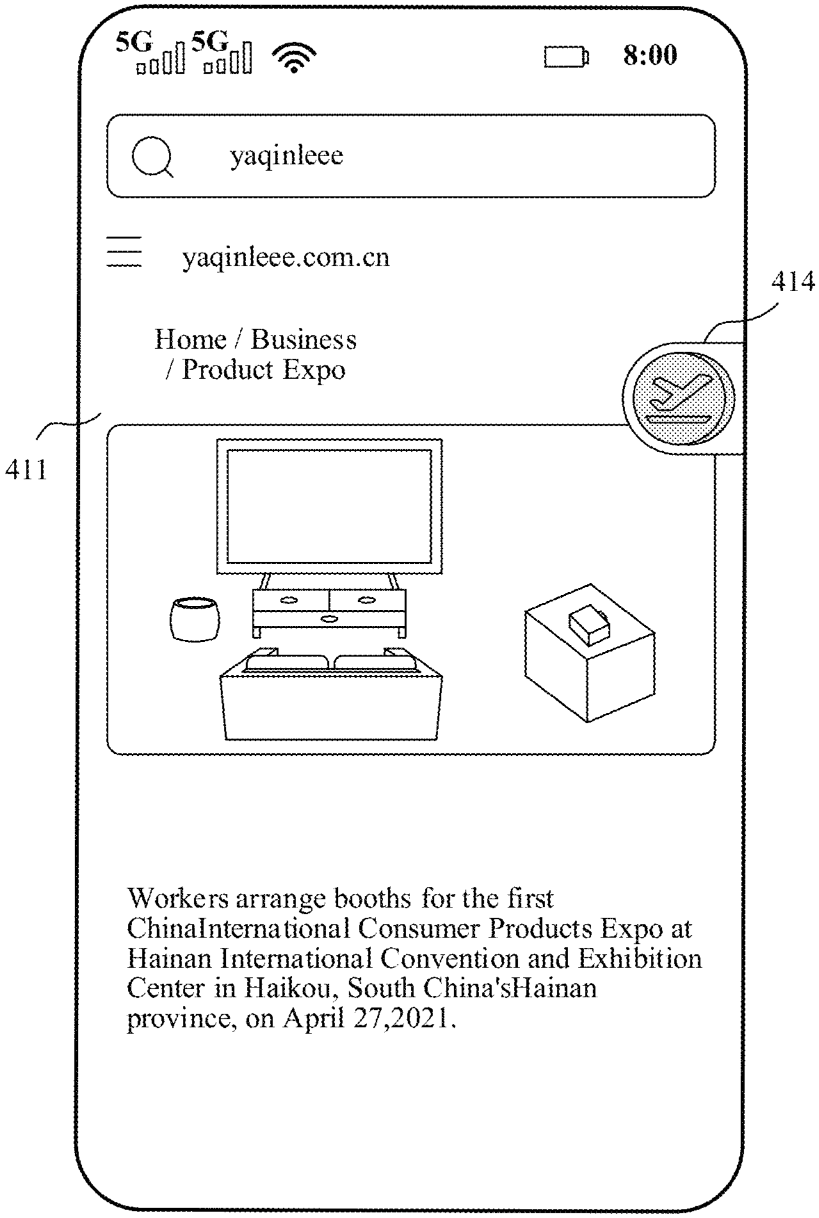
FIG. 5A to FIG. 5K show a group of user interfaces on which an electronic device displays a floating ball according to an embodiment of this application.

First, FIG. 5A shows an example of a user interface on which the first electronic device displays an English page. As shown in FIG. 5A, in this case, the window 411 may display a news report expressed in English. Above the layer displaying the news report, an aggregated floating ball 414 is further displayed in the window 411. In this case, the floating ball 414 may be the same as the floating ball 414 in FIG. 4G, and the floating ball 414 may be aggregated with a flight floating ball and a subway floating ball. Specifically, for the floating ball 414 in FIG. 5A, reference may be made to the introduction of the floating ball 414 in FIG. 4G, and details are not described herein again.

In the scenario shown in FIG. 5A, the first electronic device may detect user operations on the Chinese and English text in the window 411 by the user. The operations are, for example, a long press operation and a box selection operation. For example, referring to FIG. 5B, the first electronic device may detect a user operation on "Hainan International Convention and Exhibition Center". In response to the operation, the first electronic device may display a menu bar 511. The menu bar 511 may include a 'Copy' button. The "Copy" button can be configured to copy the text ("Hainan International Convention and Exhibition Center") selected by the user.

After detecting a user operation on the "Copy" button, the first electronic device may recognize the language used for the text selected by the user. Subsequently, the first electronic device may determine, by comparing the language used for the text selected by the user with the commonly used language set in the system, whether the user is browsing other content expressed in foreign languages such as foreign language articles. The foreign languages refer to other types of languages that are different from the commonly used language of the system. When the commonly used language of the system is set to Chinese, English shown in FIG. 5A may be referred to as a foreign language. Other languages, such as Japanese, German, and French, which are different from the commonly used language "Chinese" of the system may also be referred to as foreign languages.

When it is determined that the text selected by the user is inconsistent with the commonly used language of the system, the first electronic device may display a translation floating ball. The translation floating ball can provide the user with translation services.

Figure 5B:
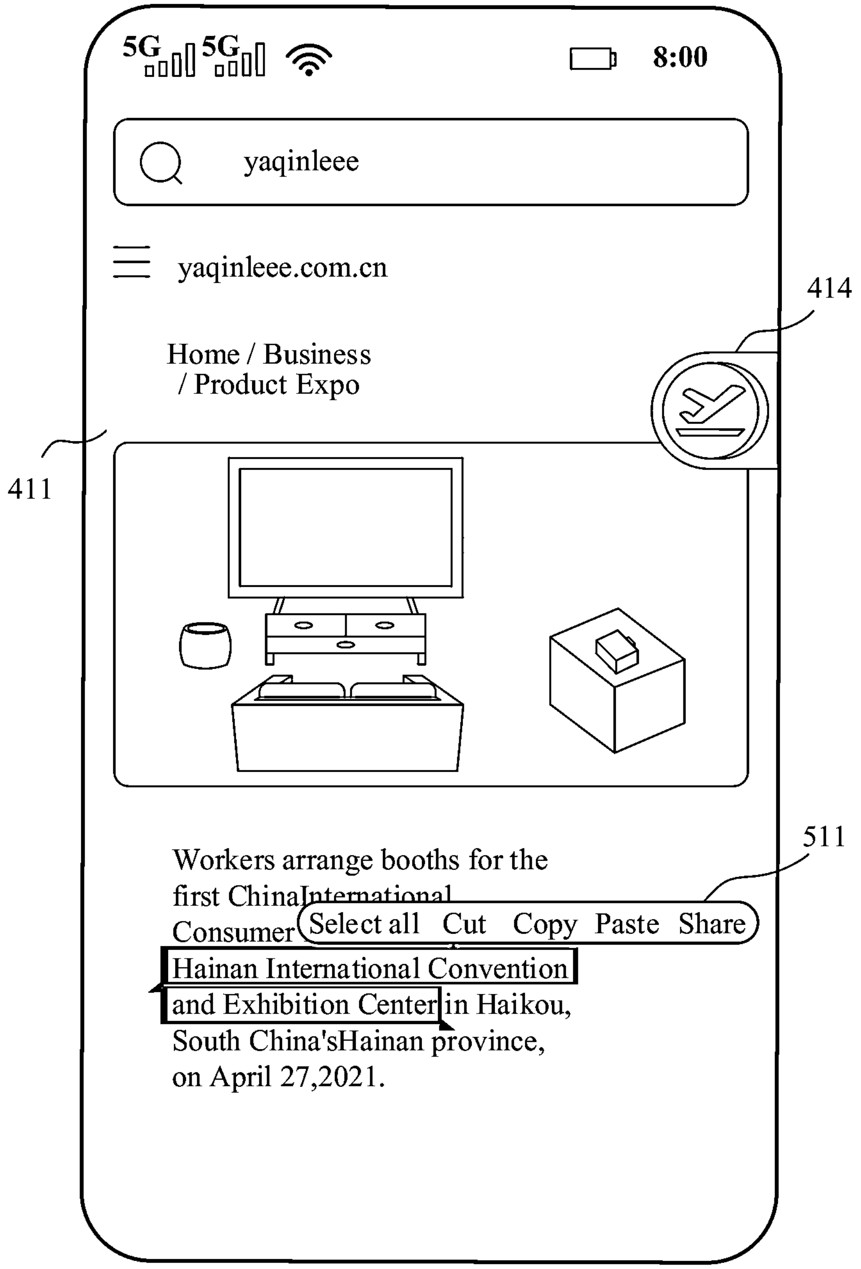
Figure 5C:
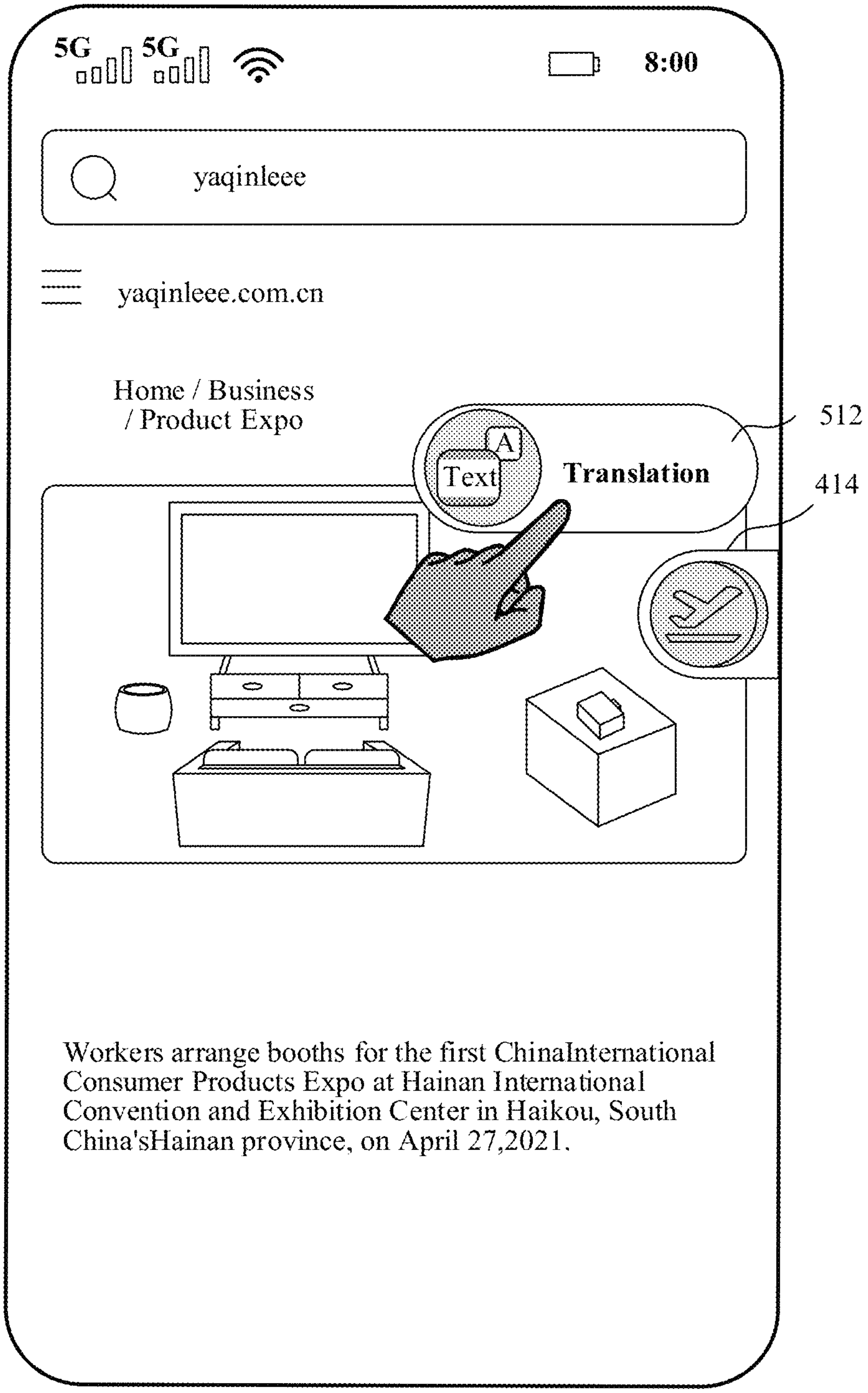

For example, referring to FIG. 5C, in a scenario in which the commonly used language of the system is set to Chinese, after detecting the copy operation, the first electronic device may determine that the language used for the copied text is not the commonly used language of the system. In this case, the first electronic device may display the translation floating ball, that is, a floating ball 512.

Figure 5D:

The first electronic device may detect a user operation on the floating ball 512. In response to the operation, the first electronic device may display the user interface shown in FIG. 5D. As shown in FIG. 5D, the user interface may include a control 521, a control 522, a text box 523, and a text box 524. The language used for the copied text recognized by the first electronic device may be displayed on the control 521. The commonly used language set in the first electronic device may be displayed on the control 522. The copied text ("Hainan International Convention and Exhibition Center") may be displayed in the text box 523. A translation result, that is, the expression ("Hainan International Convention and Exhibition Center") in the commonly used language of the system corresponding to the copied text in an uncommonly used language of the system, may be displayed in the text box 524.

Optionally, in response to the user operation on the floating ball 512, the first electronic device may also display a window in FIG. 5C. The translation result is displayed in the window. The window can automatically adjust its window size according to the display region required for the translation result. In this way, the first electronic device can quickly and directly display the translation result through the window; and can also minimize the blocking of the translation result to the content displayed in FIG. 5C.

In this way, by clicking the translation floating ball, the user can quickly and conveniently acquire the translation result of the copied text into the commonly used language of the system through the translation floating ball, thereby providing convenience for the user to browse foreign language web pages.

After detecting the copied text, the first electronic device may also recognize whether the text is an address. When it is confirmed that the text is an address, the first electronic device may also display a navigation floating ball. The navigation floating ball may be associated with a map application installed on the first electronic device, and acquire the positioning service, route planning service, and navigation service provided by the map application. The user can quickly and conveniently acquire a route between the current location and the foregoing address by using the navigation floating ball.

Figure 5E:
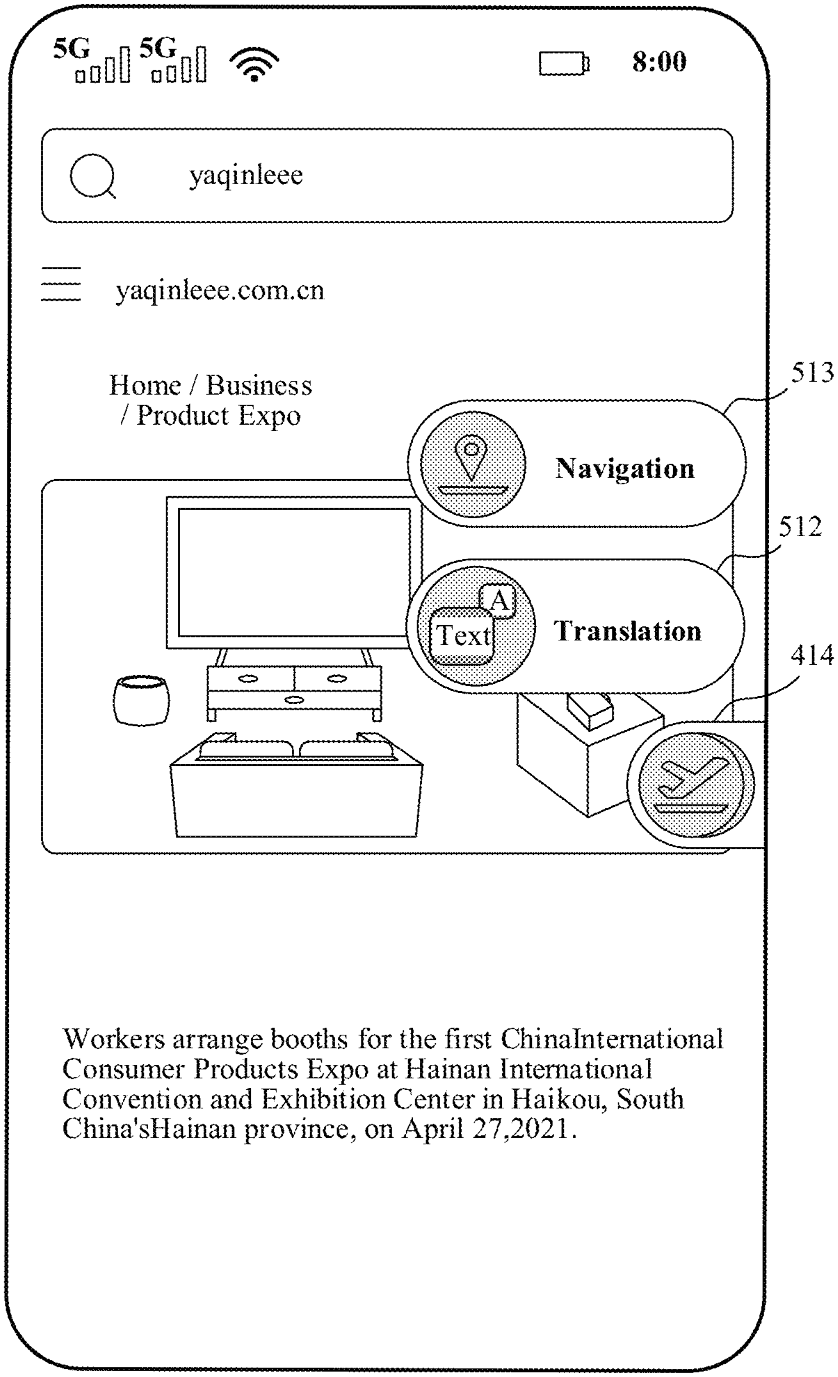

For example, in the scenario shown in FIG. 5B, after recognizing that the copied text is an address ("Hainan International Convention and Exhibition Center", that is, "Hainan International Convention and Exhibition Center"), the first electronic device may also display a navigation floating ball, referring to the floating ball 513 shown in FIG. 5E. In this embodiment of this application, the copied address may be expressed in a commonly used language of the system, or may be expressed in an uncommonly used language of the system. When the copied address is expressed in an uncommonly used language of the system, the first electronic device may translate the text expressed in the uncommonly used language of the system into a text expressed in the commonly used language of the system.

Figure 5F:
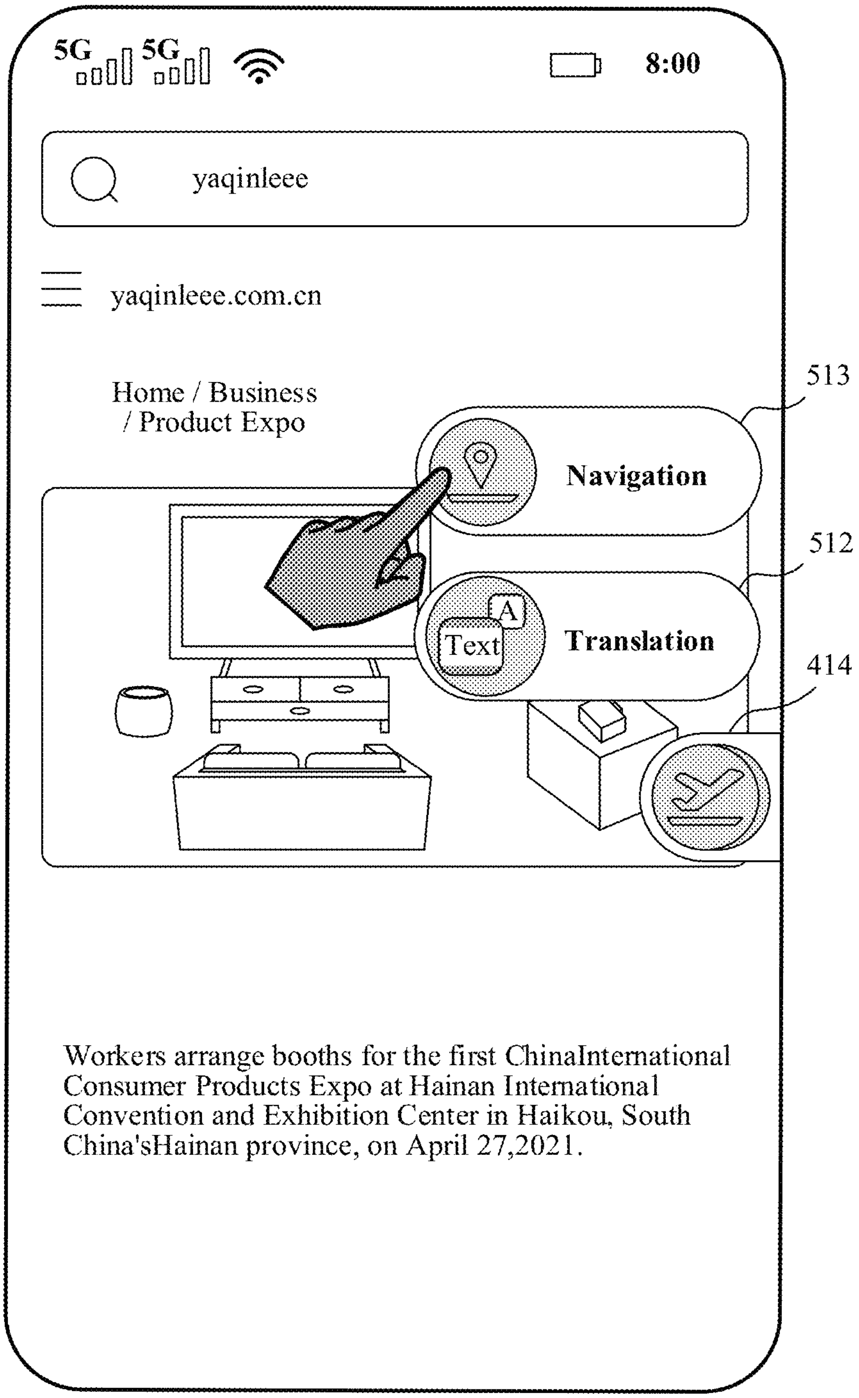

Subsequently, as shown in FIG. 5F, the first electronic device may detect a user operation on the floating ball 513. In response to the operation, the first electronic device may display the user interface shown in FIG. 5G. A route from the user's current location to the recognized address may be displayed on the user interface.

Figure 5G:
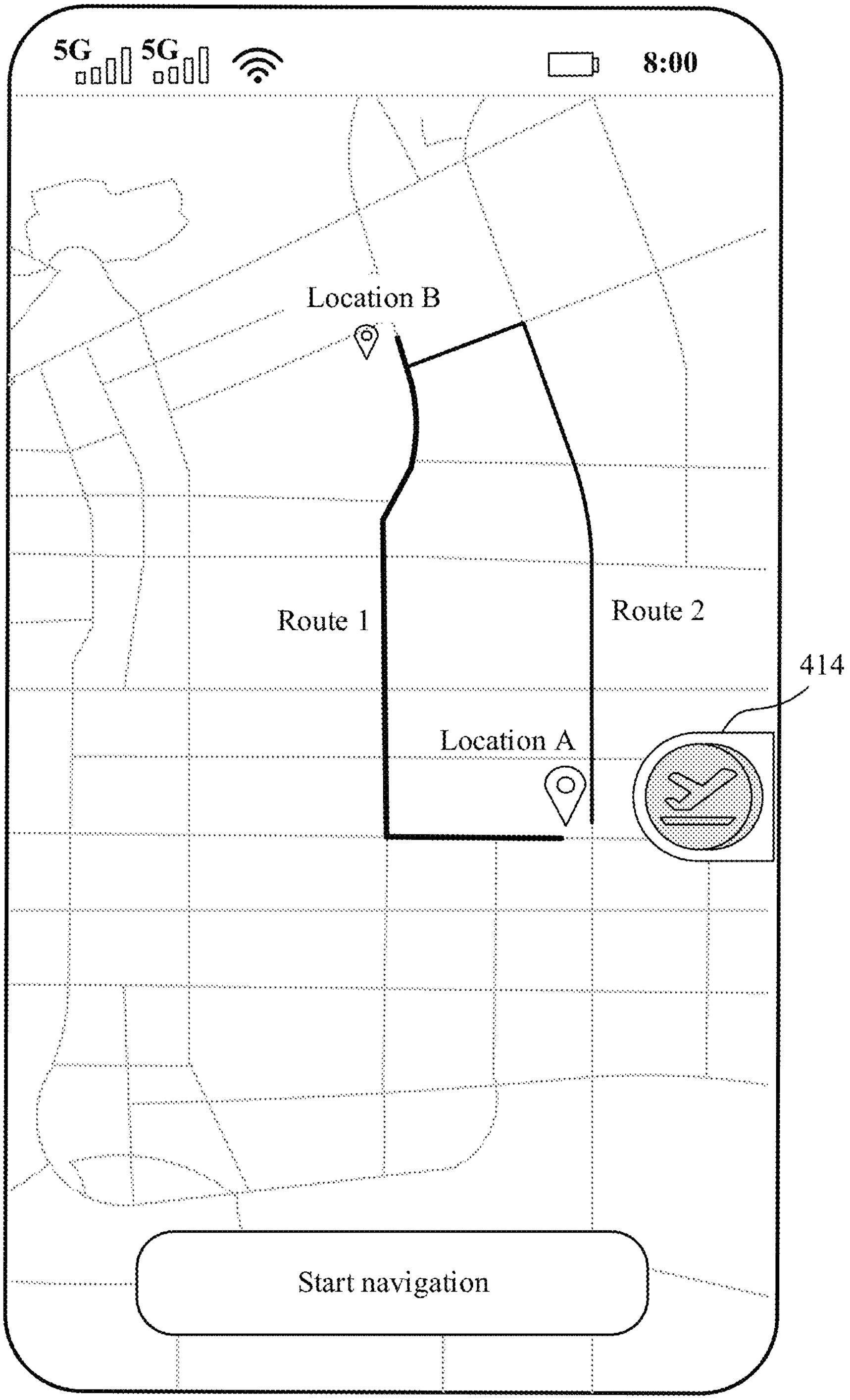

As shown in FIG. 5G, a location A and a location B may be displayed on the interface. The location A may be a location in which the first electronic device is currently located (current location); and the location B may be a location recognized by the first electronic device from the copied text, for example, the foregoing recognized "Hainan International Convention and Exhibition Center". FIG. 5G further shows two routes from the location A to the location B: a route 1 and a route 2.

In this way, after the user interface shown in FIG. 5G is displayed, the user can learn how to get from the location A to the location B through the locations and routes displayed on the user interface.

Optionally, an aggregated floating ball 414 may also be displayed on the user interface shown in FIG. 5G, and no transient floating ball 512 for recommending a translation service is displayed.

After detecting the copied text, the first electronic device may also recognize whether the text is a phone number. When recognizing that the text is a phone number, the first electronic device may also display a calling floating ball. The calling floating ball may be associated with a calling application installed on the first electronic device. When a user operation on the calling floating ball is detected, the first electronic device may call the foregoing copied phone number, thereby providing a quick dial service for the user.

The first electronic device may further detect a user operation of frequently switching between two or more applications by the user. In response to the operation, the first electronic device displays a split-screen floating ball. The split-screen floating ball can provide the user with a quick split-screen service. When a user operation on the split-screen floating ball is detected, the first electronic device may divide the mobile phone screen into a plurality of windows. A view provided by one of the foregoing two or more applications is displayed in one window.

The first electronic device may further recognize another specific operation, and display a floating ball matching the specific operation. Examples are not exhausted herein.

By implementing the foregoing method, after recognizing that the user performs a preset specific operation, the first electronic device may determine needs strongly related to the specific operation. Subsequently, the first electronic device may display a floating ball meeting the user' needs.

For example: after recognizing a user operation of copying text in an uncommonly used language of the system, the first electronic device may determine that the user has a need to translate the text in the uncommonly used language of the system. Therefore, the first electronic device may display the translation floating ball, so that the user can quickly and conveniently acquire a translation result through the translation floating ball, thereby providing convenience for the user to browse foreign language text.

In this embodiment of this application, the navigation floating ball may be a transient floating ball.

After displaying the translation floating ball (floating ball 512) and the navigation floating ball (floating ball 513), the first electronic device may detect whether there is a user operation on the floating balls within a preset time. After the preset time comes to an end, the first electronic device may gradually hide the foregoing floating balls. Referring to the user interface shown in FIG. 5H, the floating ball 512 and the floating ball 513 gradually move to the right and the display region of the prompt information is gradually folded or reduced, that is, the floating balls enter a hidden state.

When adjusting a floating ball in an unfolded state that is a non-transient floating ball to a thumbnail state for display, the first electronic device may detect whether there is a floating ball in a thumbnail state on the current screen. When a floating ball in a thumbnail state is detected, the first electronic device may aggregate the non-transient floating ball and the floating ball in the thumbnail state, and display one floating ball in a thumbnail state. The one floating ball in the thumbnail state includes all the foregoing floating balls in the thumbnail state.

The translation floating ball (floating ball 512) is used as an example. When no user operation on the floating ball 512 is detected within a preset time, the first electronic device may adjust the floating ball 512 to a thumbnail state, referring to the floating ball 512 shown in FIG. 5H. In this case, there is a floating ball in a thumbnail state (floating ball 414) on the screen. In this case, the first electronic device may aggregate the floating ball 512 with the floating ball 414 in the thumbnail state to obtain a new floating ball in a thumbnail state, referring to the floating ball 514 shown in FIG. 5I. In this case, the application icon displayed in the floating ball 514 may be an application icon of the last floating ball 512 that enters the thumbnail state.

In this way, if an operation of copying text in a non-system language by the user is not intended to translate the text, the first electronic device may hide the translation floating ball in time, to avoid affecting the user's experience for browsing the page.

Subsequently, if the user intends to view the translation result, the user may click the floating ball 514 in the thumbnail state to instruct the first electronic device to re-display the hidden translation floating ball (floating ball 512), and then view the translation result through the translation floating ball.

In the scenario in which the first electronic device displays a foreign language web page, when no user operation on the translation floating ball is detected within a preset time, the translation floating ball may enter a thumbnail state. When the first electronic device no longer displays the foreign language web page, the first electronic device may end the displaying of the translation floating ball. In some embodiments, when the first electronic device no longer displays the foreign language web page, the first electronic device may alternatively wait for a period of time, and then end the displaying of the translation floating ball. The period of time is, for example, 3 minutes. This is not shown in this embodiment of this application.

By implementing the foregoing method, when the shortcut service provided by the floating ball displayed by the first electronic device according to a specific operation of the user is not currently needed by the user, the first electronic device may shrink the foregoing floating ball timely to avoid blocking, thereby improving the user experience. When the user needs the shortcut service provided by the floating ball, the first electronic device may re-display the floating ball, and then provide the user with the shortcut service needed by the user.

For example, for the translation floating ball displayed by the first electronic device according to an operation of copying text expressed in an uncommonly used language of the system, when the user does not need a translation service, the first electronic device may hide the translation floating ball. When the user needs the floating ball, the first electronic device may re-display the floating ball, and then provide the user with the translation service urgently needed by the user currently.

When adjusting a floating ball in an unfolded state that is a transient floating ball to a thumbnail state for display, the first electronic device may start to end timing, and display a countdown ring on the floating ball. When the timing ends, the first electronic device may end the displaying of the foregoing floating ball.

Figure 5H:
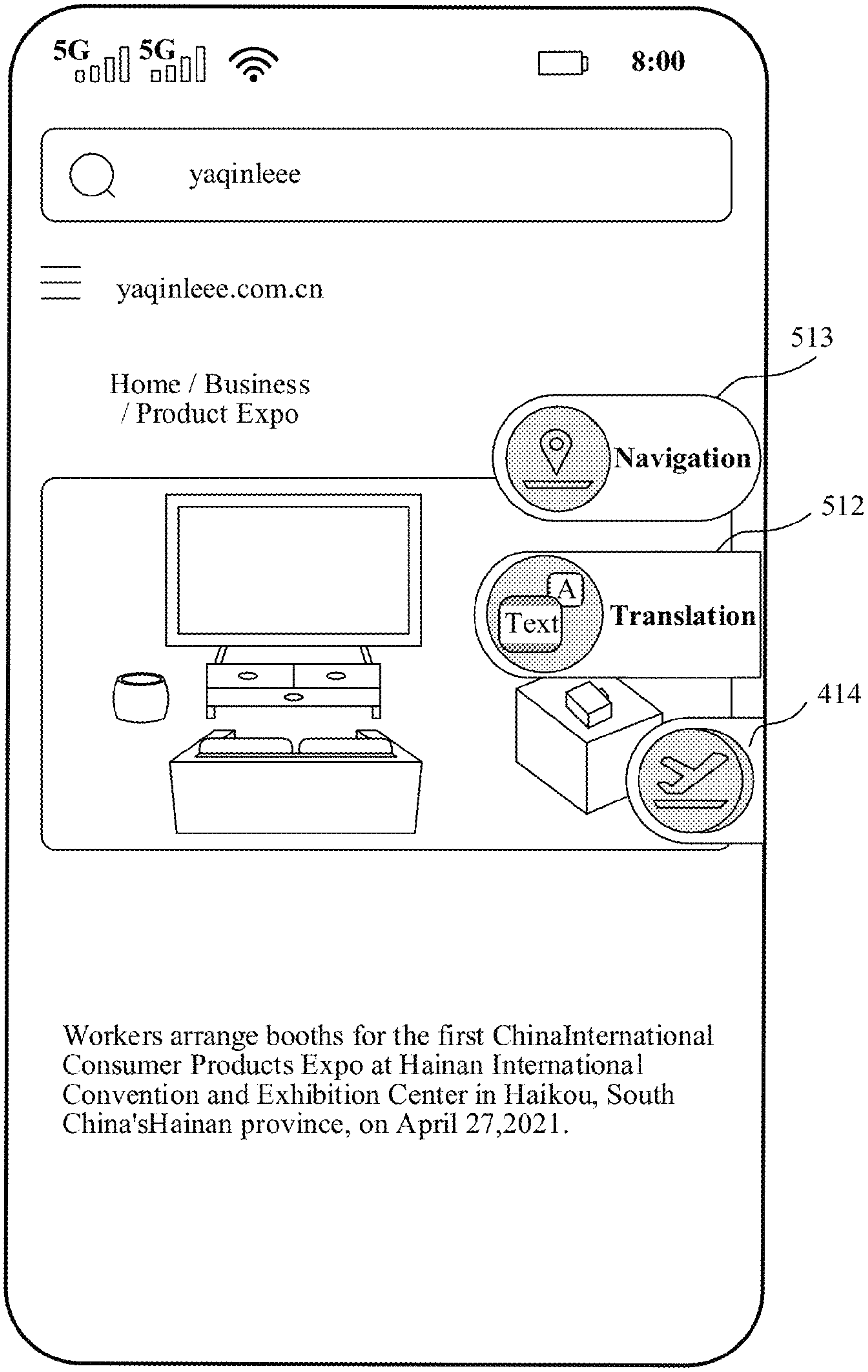

As shown in FIG. 5H, after displaying the navigation floating ball (floating ball 513), if no user operation on the floating ball 513 is detected within a preset time, the first electronic device may adjust the floating ball 513 to a thumbnail state, to reduce the display area.

Figure 5I:
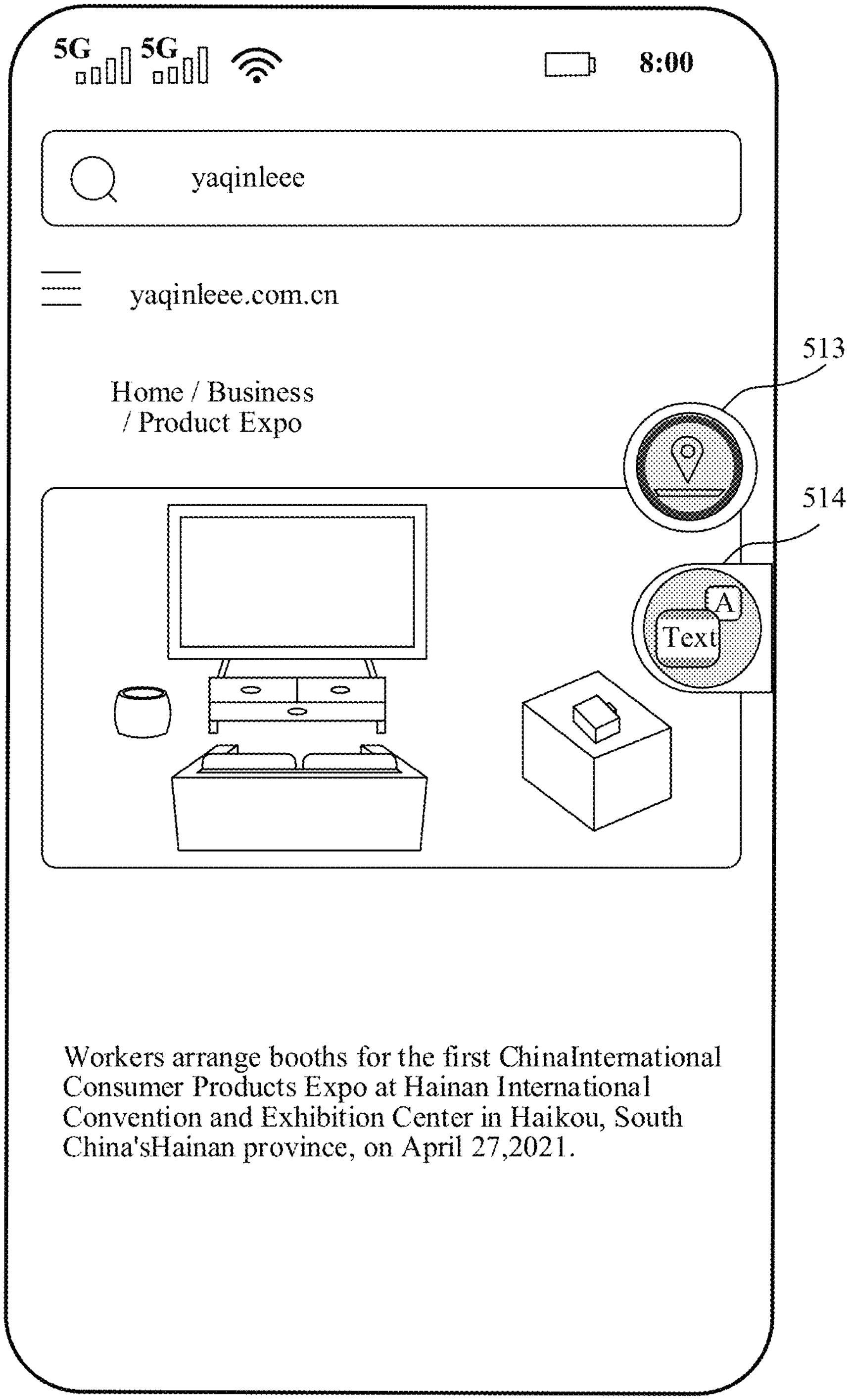
Figure 5J:
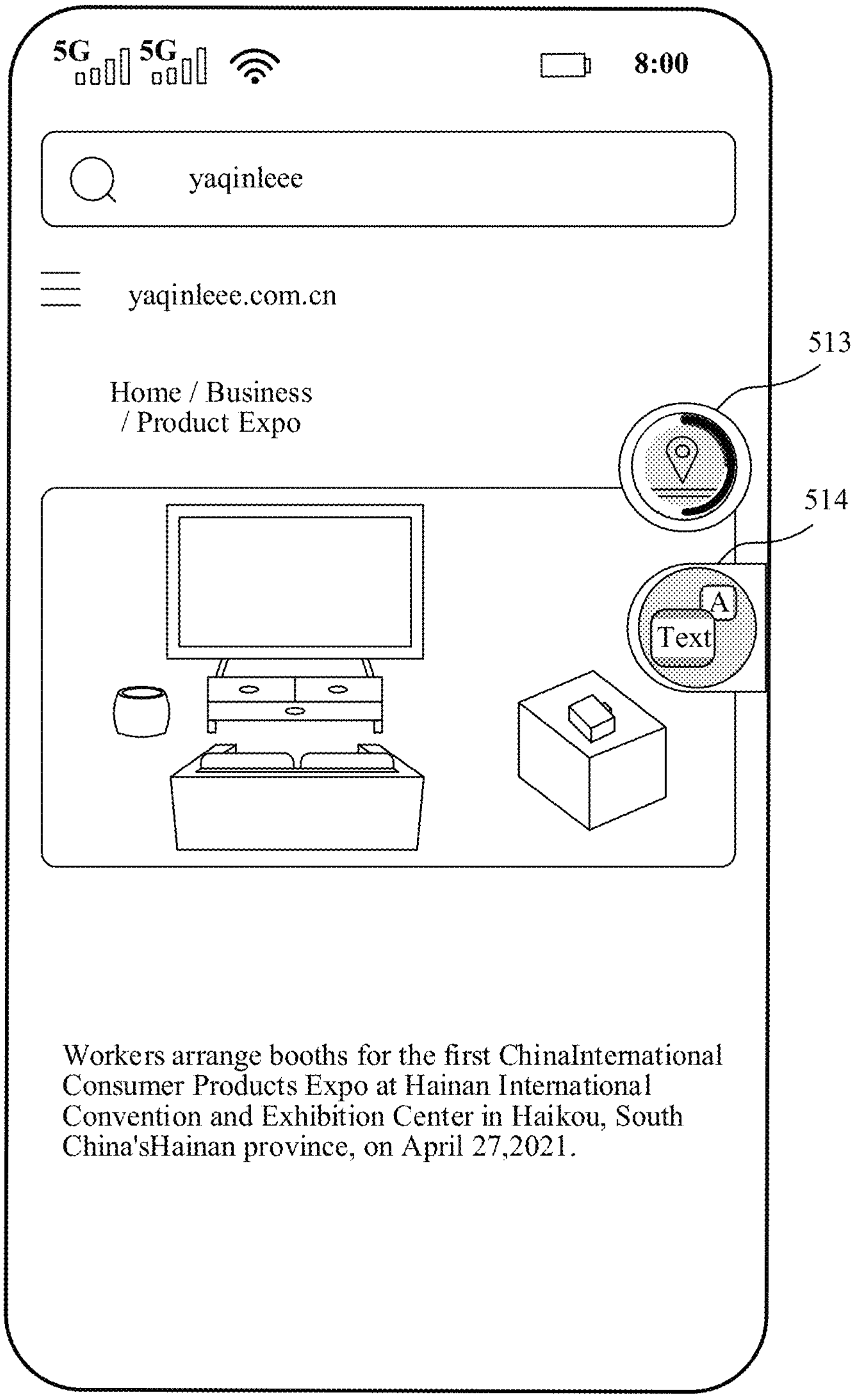

As shown in FIG. 5I, after entering the thumbnail state, the floating ball 513 may display a countdown ring. The timing duration of the countdown ring is, for example, 5 seconds. As shown in FIG. 5J, the countdown ring may gradually decrease counterclockwise from the 12 o'clock position. The user may know the remaining time for the first electronic device to display the floating ball through the countdown ring, so as to remind the user to click the floating ball before the floating ball disappears, to acquire the shortcut service provided by the floating ball.

Figure 5K:
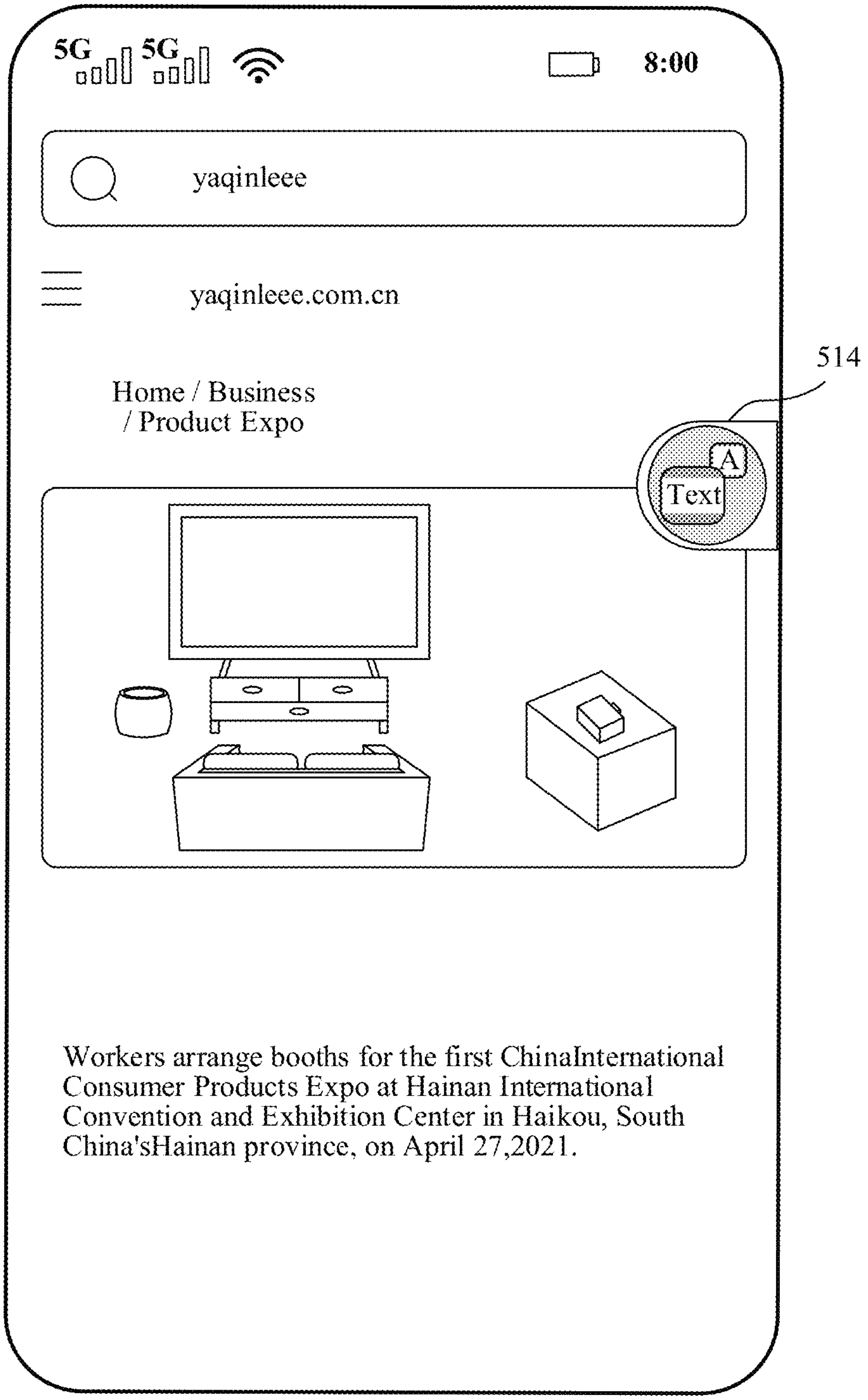

As shown in FIG. 5J, at any time point before the timing of the countdown ring ends, if a user operation of clicking the floating ball 513 is detected, the first electronic device may display the user interface shown in FIG. 5G. After the timing of the countdown ring ends, if no user operation of clicking the floating ball 513 is detected, the first electronic device may end the floating ball 513, that is, no longer display the floating ball 513. Referring to the user interface shown in FIG. 5K, after the timing of the countdown ring ends, the floating ball 513 is no longer displayed on the screen. The first electronic device also does not aggregate the floating ball 513 into the floating ball 514 in the thumbnail state.

Optionally, after a user operation of clicking the floating ball 513 is detected, the map application corresponding to the floating ball 513 can plan a route for the user. Subsequently, the floating ball 513 may be changed to a non-transient floating ball. The user can enter a navigation page through the non-transient floating ball at any time, to acquire a navigation service.

By implementing the foregoing method, when the shortcut service provided by the floating ball displayed by the first electronic device according to a specific operation of the user is not currently needed by the user, and the first electronic device cannot determine that the user will need the shortcut service for some time to come, then the first electronic device may end the floating ball in time to avoid blocking, thereby improving the user experience.

Referring to the user interfaces shown in FIG. 6A to FIG. 6I, the first electronic device further supports changing the position of the floating ball.

Figure 6A:
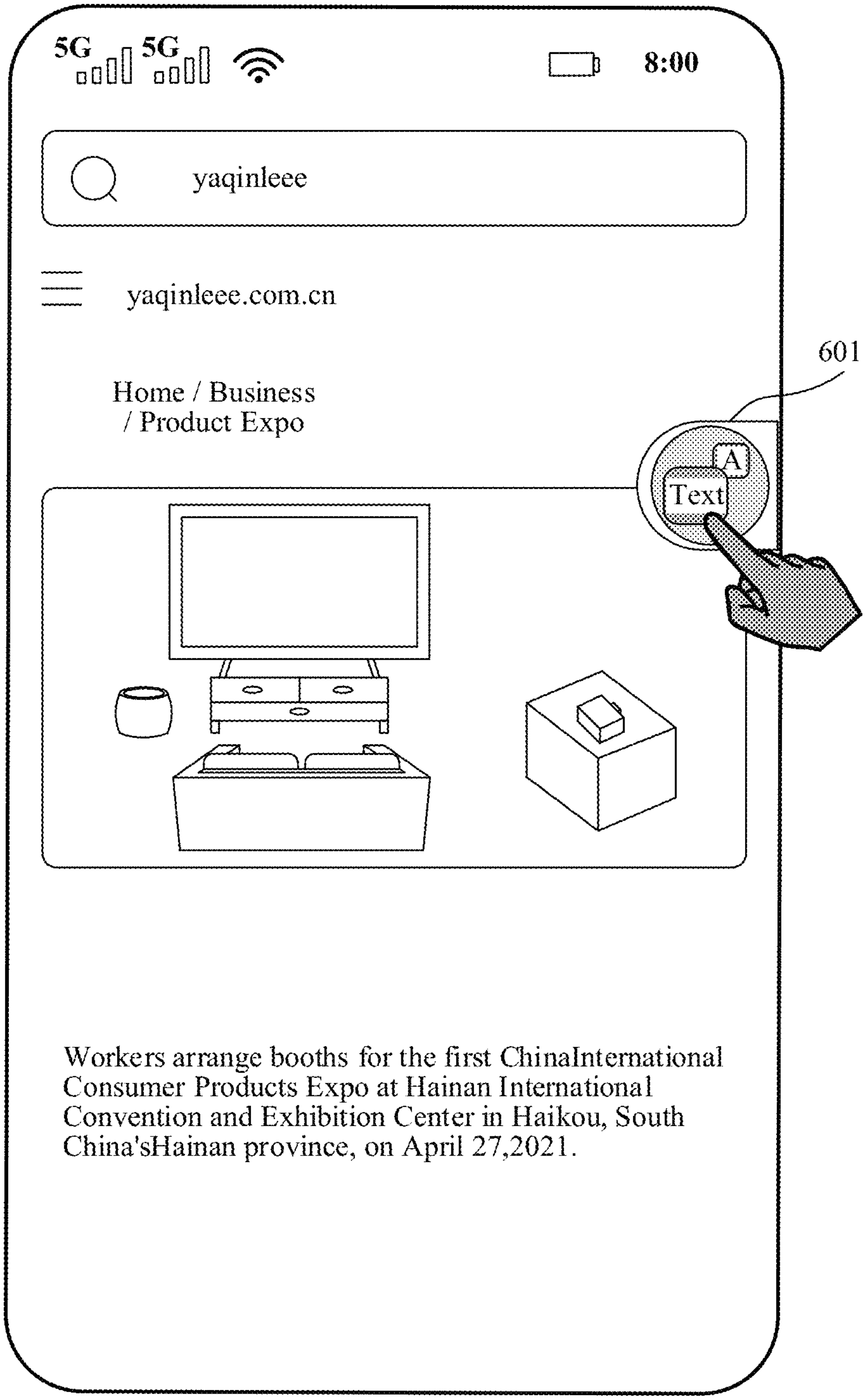
FIG. 6A to FIG. 6O show a group of user interfaces on which an electronic device displays a floating ball according to an embodiment of this application.
Figure 6B:
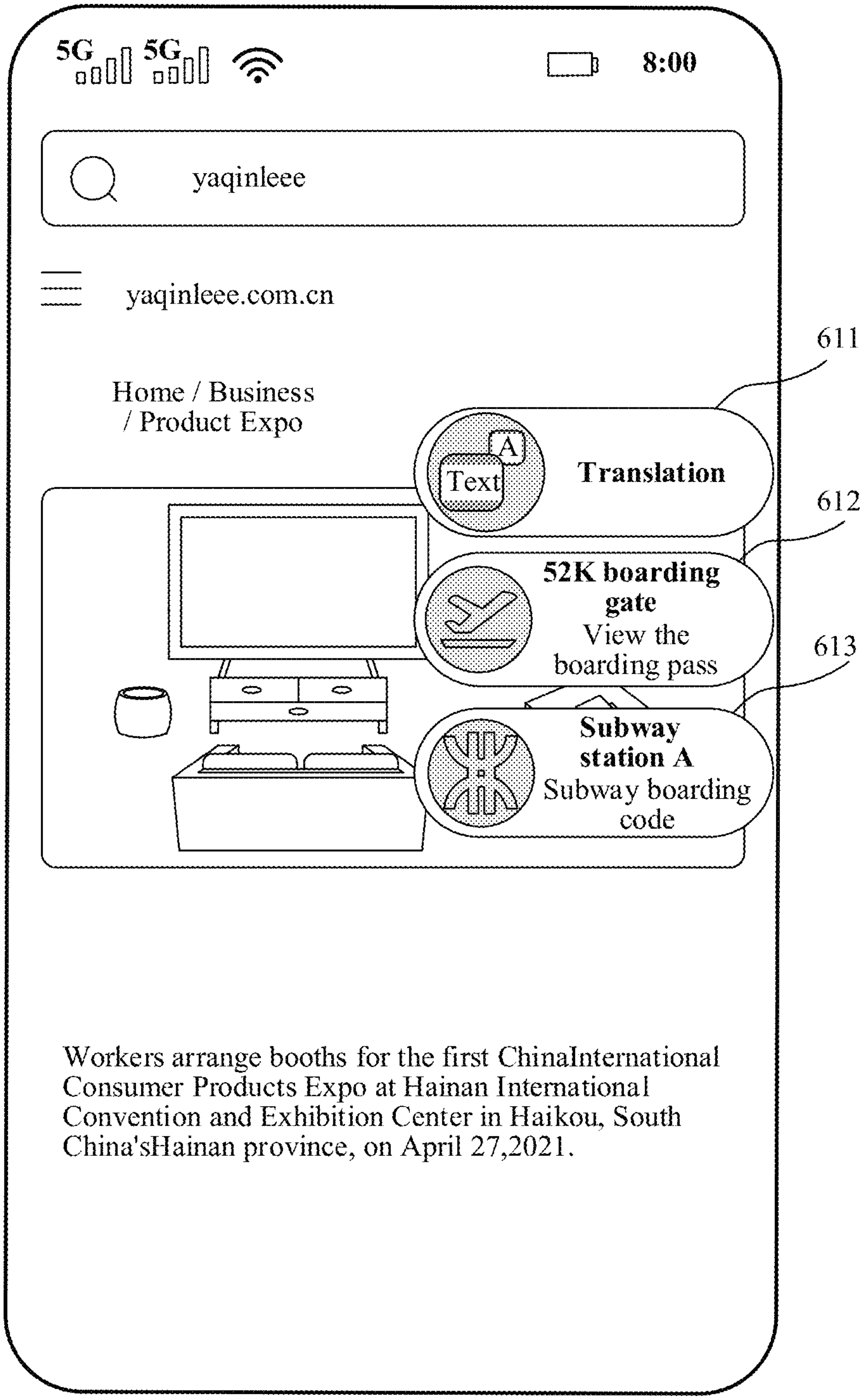

Referring to FIG. 6A, an aggregated floating ball 601 is displayed on the user interface shown in FIG. 6A. The first electronic device may detect a user operation on the floating ball 601. In response to the foregoing operation, the first electronic device may display all the floating balls included in the floating ball 601, referring to FIG. 6B, including a translation floating ball 611, a flight floating ball 612, and a subway floating ball 613.

In this case, the first electronic device may detect a user operation on any one of the plurality of floating balls, and in response to the operation, the first electronic device may provide the user with a shortcut service corresponding to the floating ball. Referring to the user interfaces shown in FIG. 4E, FIG. 4H, and FIG. 5D, details are not described herein again.

Figure 6C:
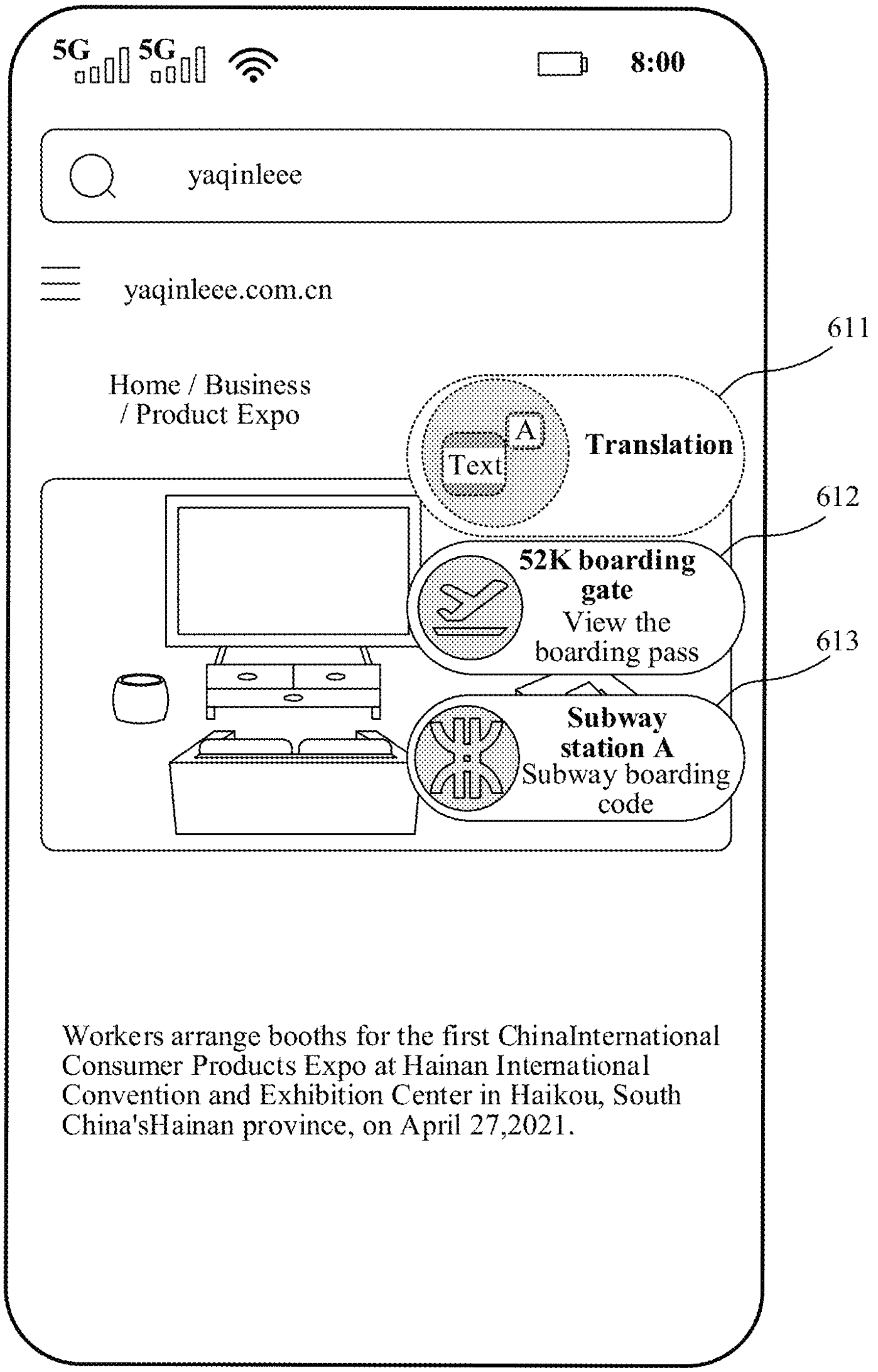
Figure 6D:
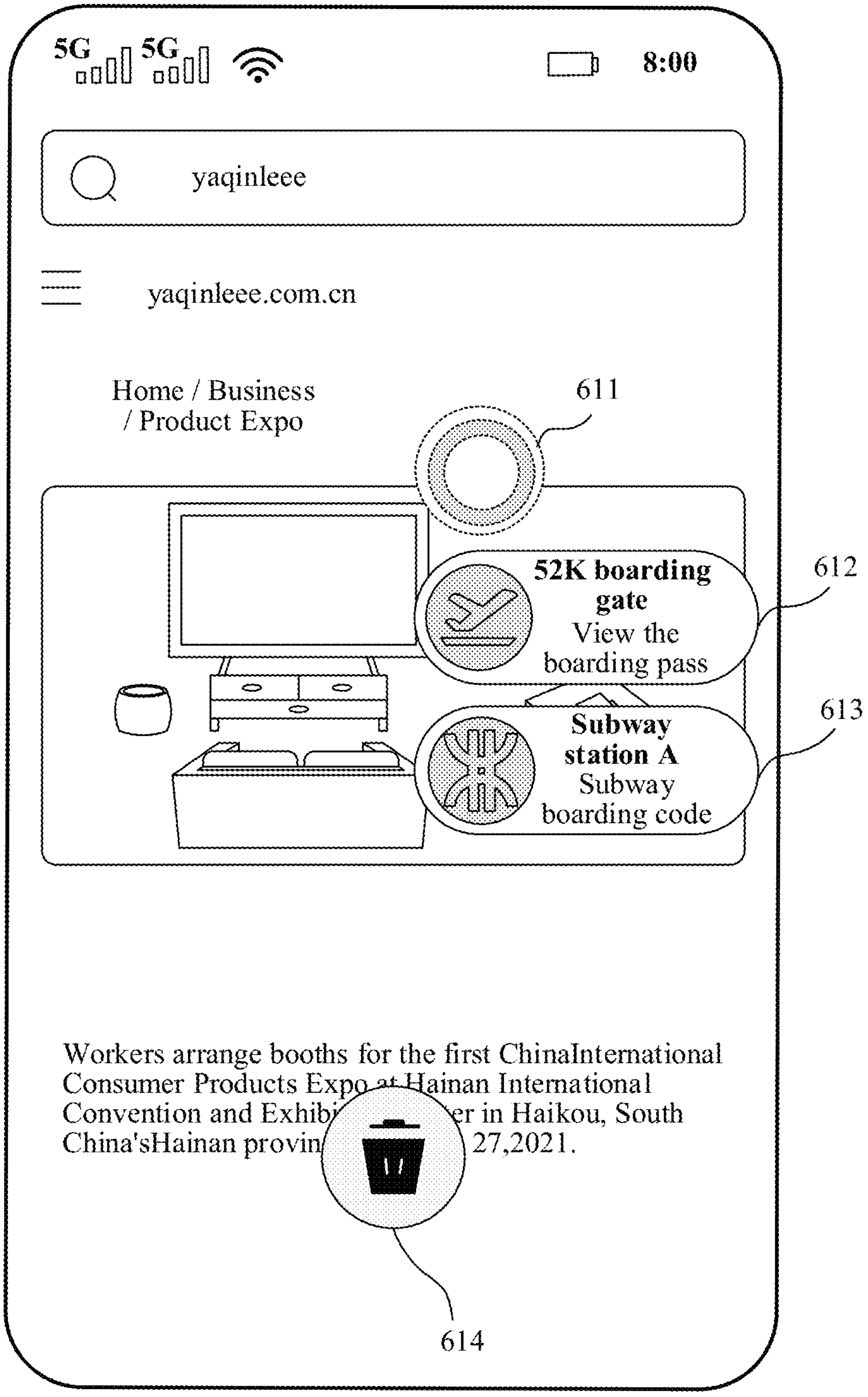

As shown in FIG. 6C, the first electronic device may detect a user operation of long pressing the translation floating ball 611. The foregoing operation may alternatively be a double-click operation, which is not limited in this embodiment of this application. In response to the foregoing operation, the first electronic device may shrink the translation floating ball 611, referring to the translation floating ball 611 in FIG. 6D. Subsequently, the first electronic device may change the display position of the floating ball according to a dragging operation of the user. In addition, the first electronic device may also display a delete control 614.

Figure 6E:
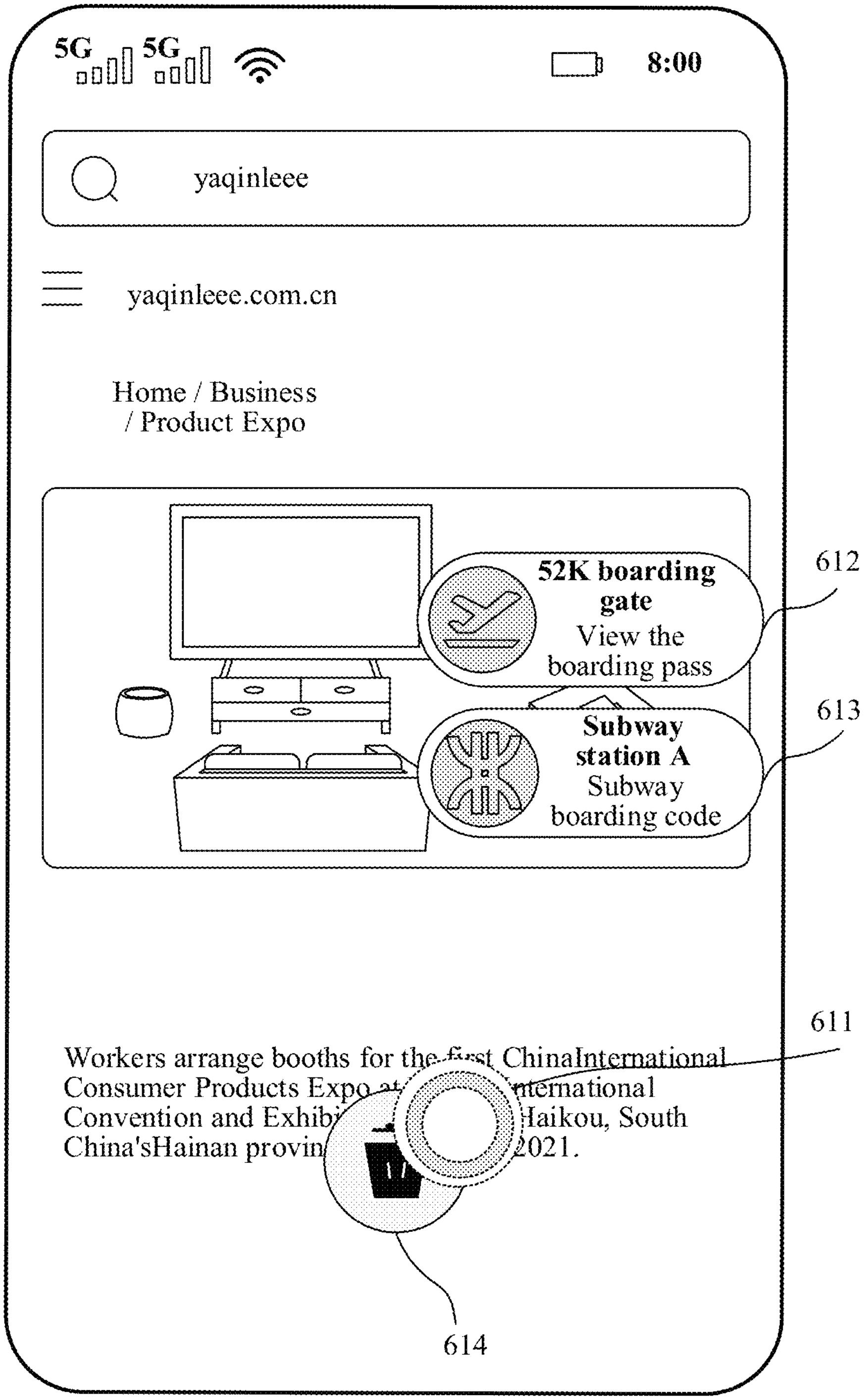

As shown in FIG. 6E, the first electronic device may detect a user operation of moving the translation floating ball 611 to the delete control 614, and in response to the operation, the first electronic device may delete the translation floating ball 611, that is, end the displaying of the translation floating ball 611. The first electronic device may aggregate the remaining flight floating ball 612 and the remaining subway floating ball 613 into a new floating ball in a thumbnail state. The floating ball in the thumbnail state no longer includes the translation floating ball 611.

Figure 6F:
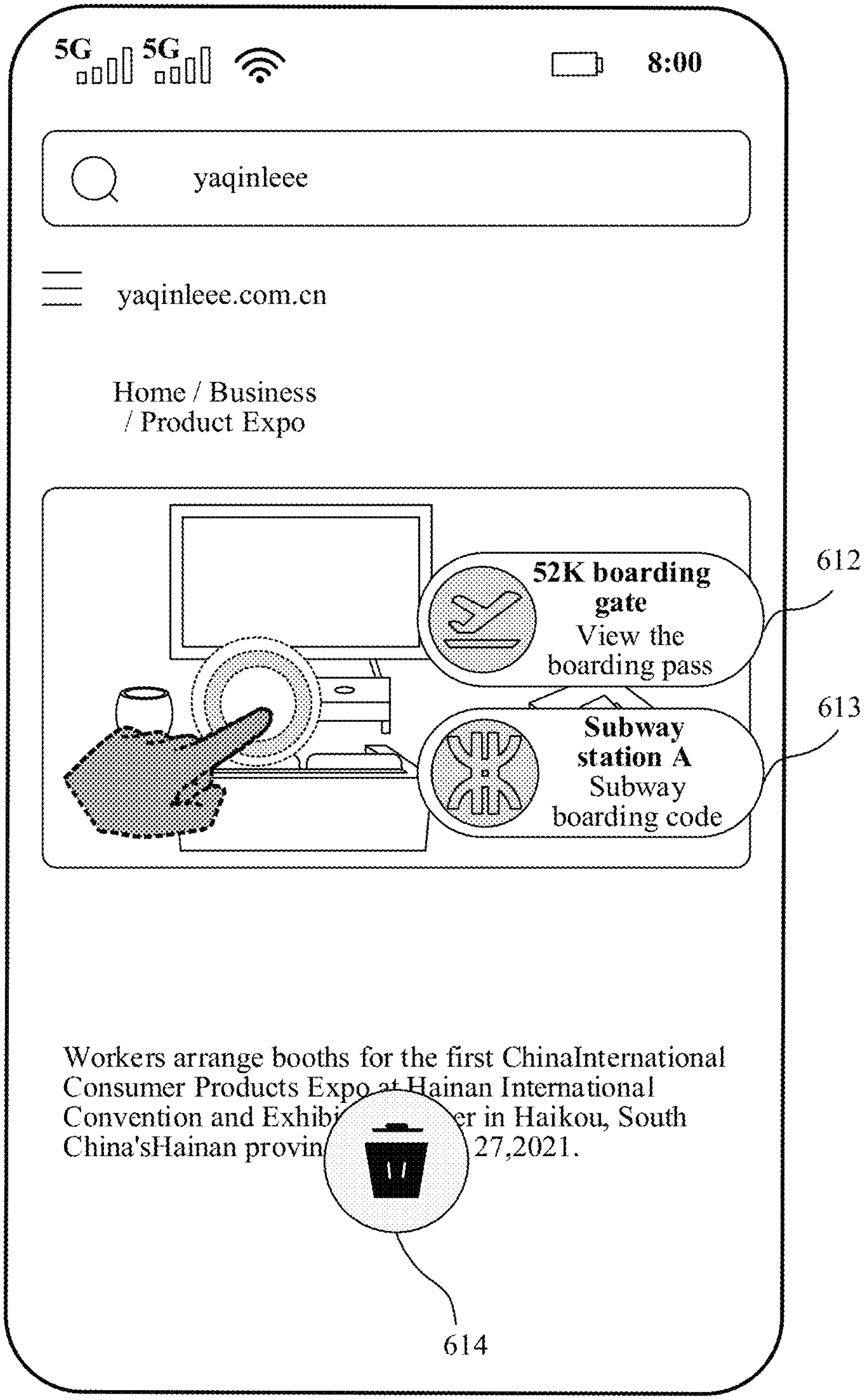
Figure 6G:
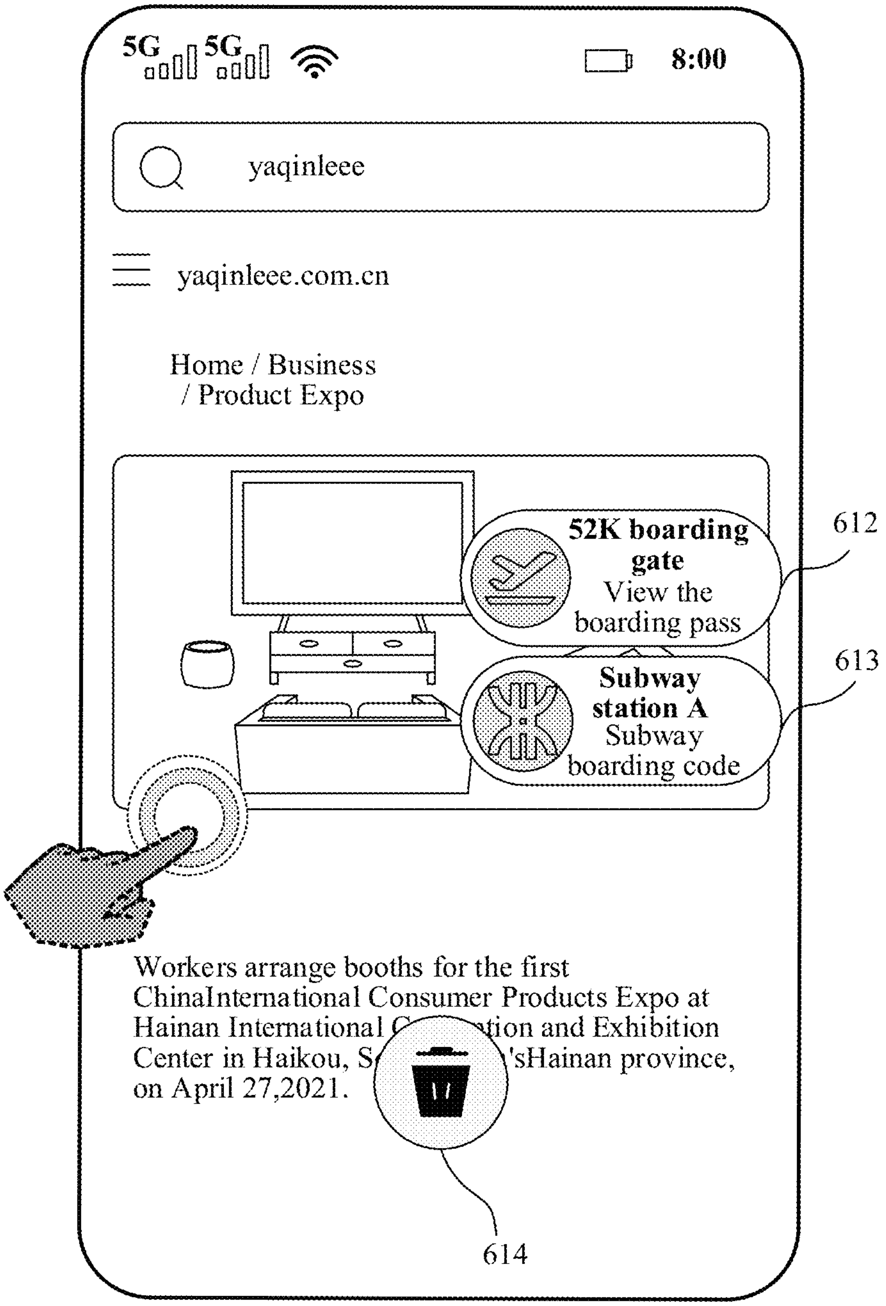

As shown in FIG. 6F and FIG. 6G, the first electronic device may also detect a user operation of dragging the translation floating ball 611 to the lower left of the screen. After the movement ends, the first electronic device may display the user interface shown in FIG. 6H. In this case, the translation floating ball 611, the flight floating ball 612, and the subway floating ball 613 originally displayed in the direction of the upper right corner of the screen are all moved to the lower left of the screen.

Figure 6H:
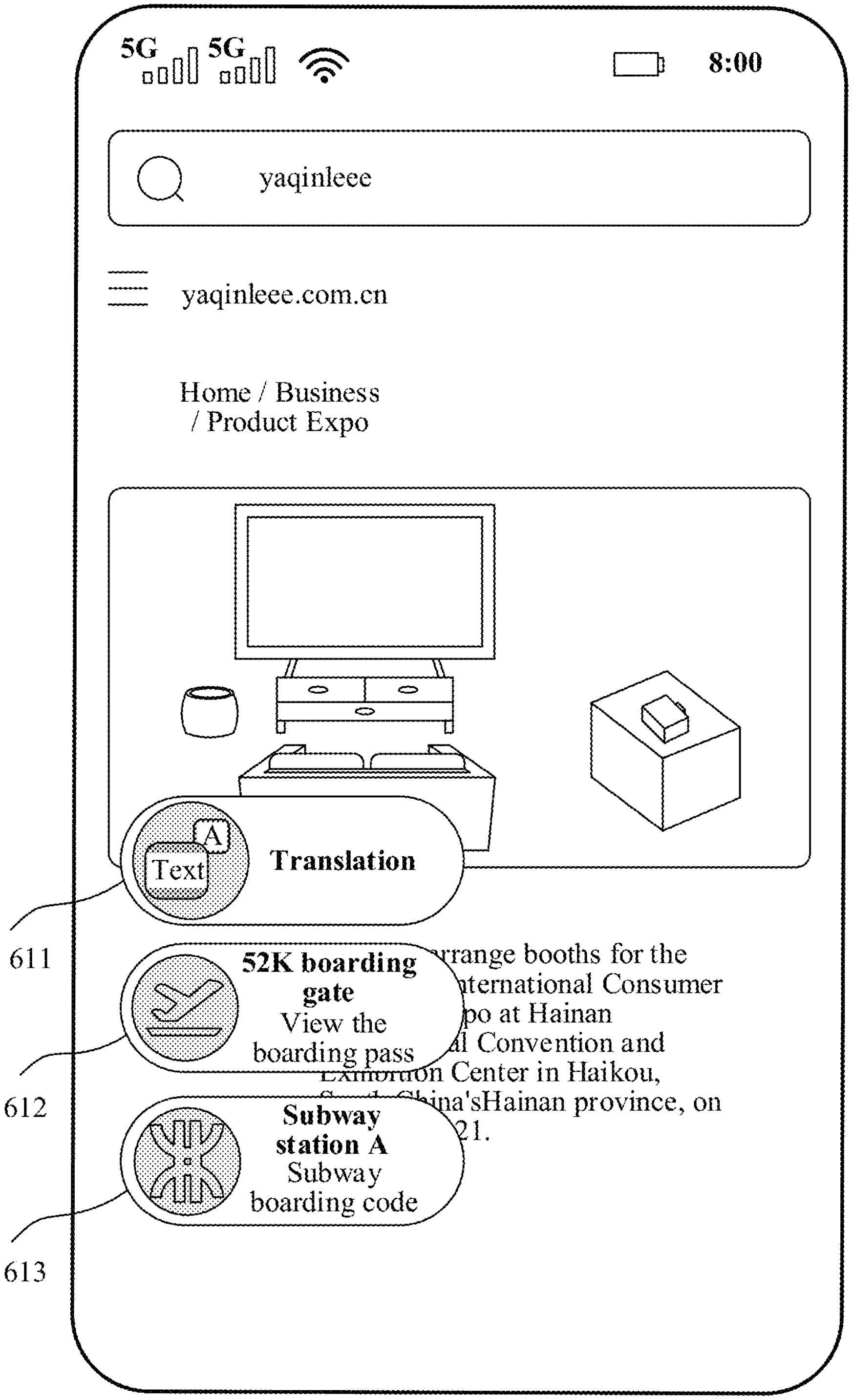
Figure 6I:
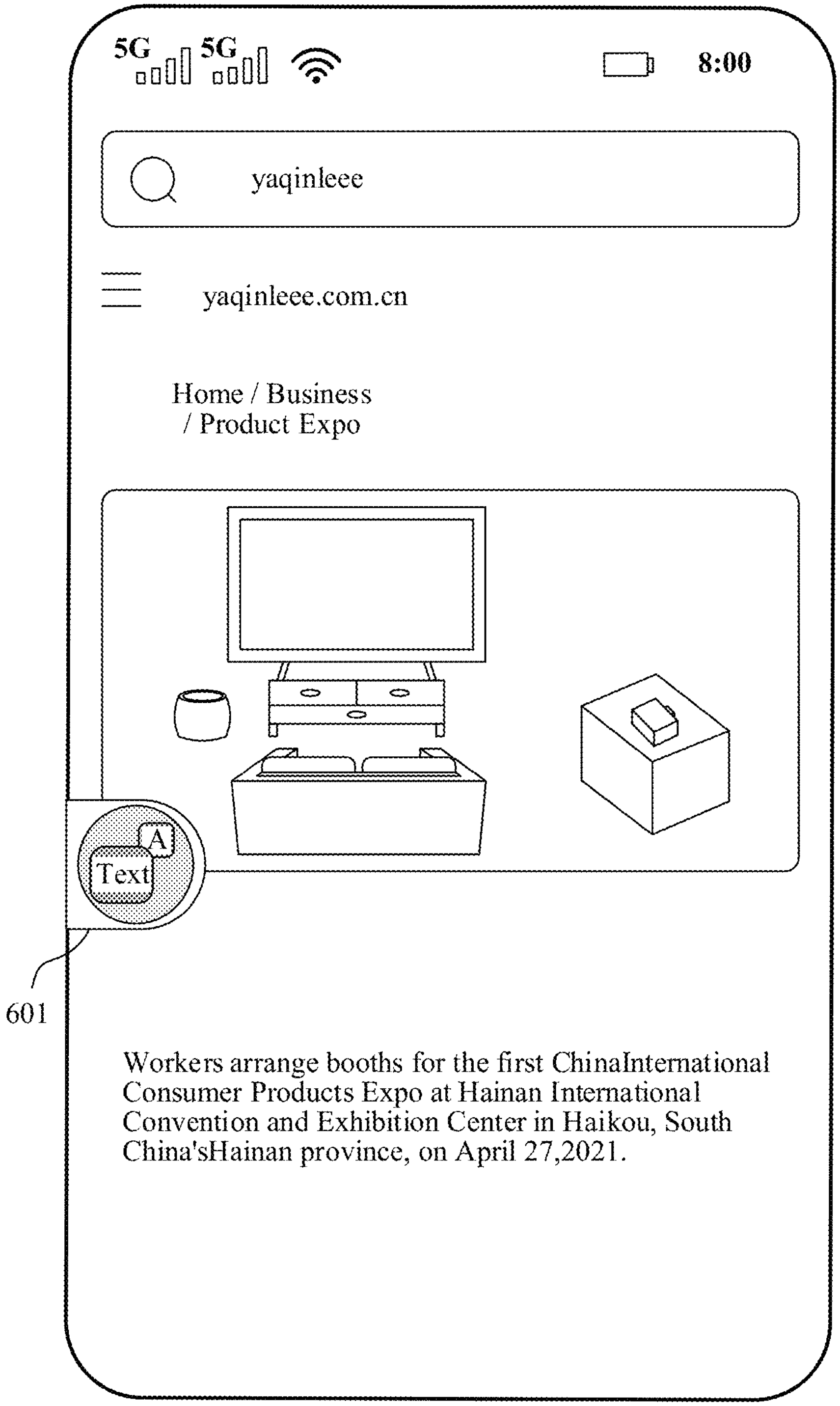

After displaying the user interface shown in FIG. 6H, if a user operation on any one of the foregoing floating balls is detected within a preset time, the first electronic device may aggregate the foregoing three floating balls into a floating ball in a thumbnail state again, referring to FIG. 6I.

Figure 6J:
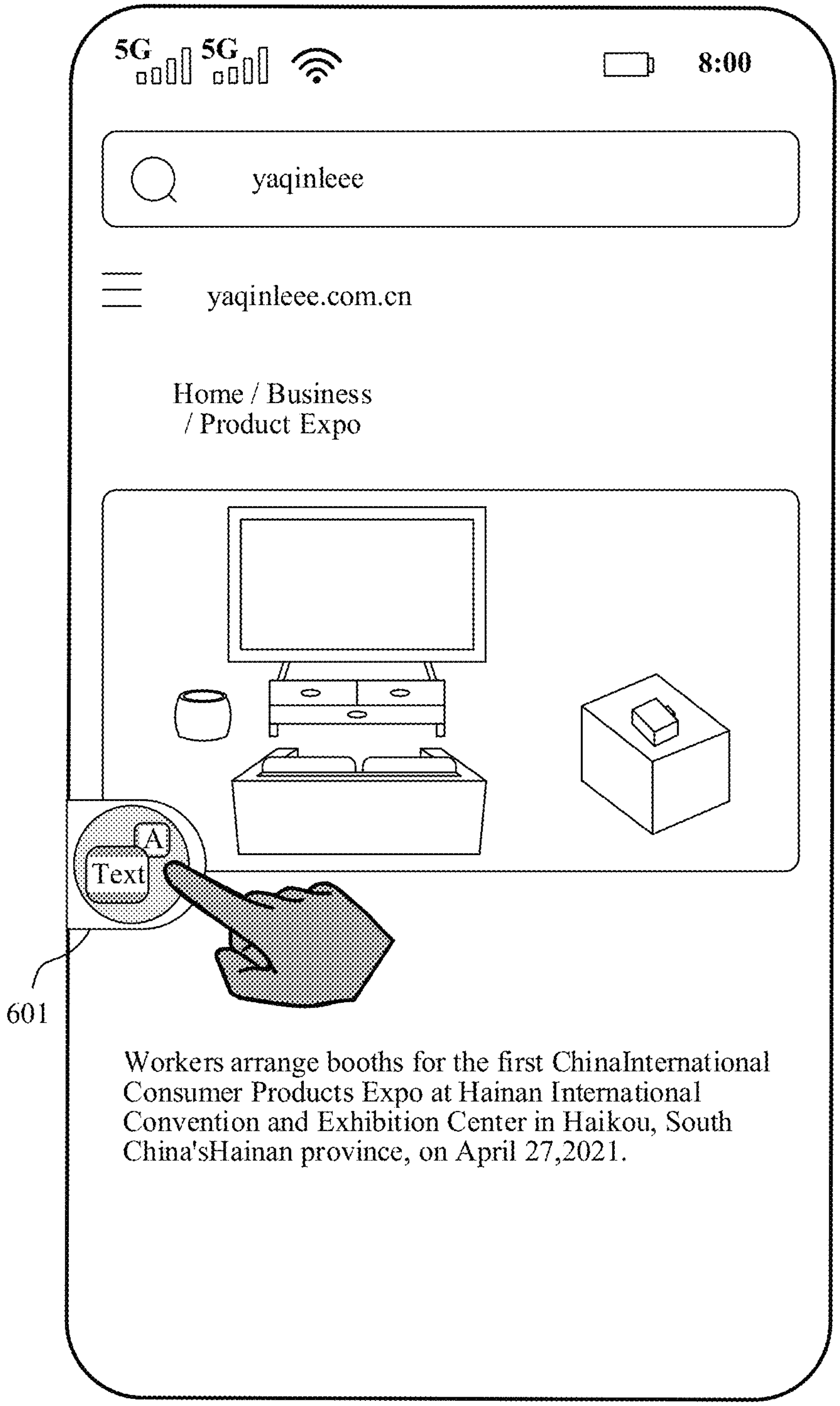
Figure 6K:
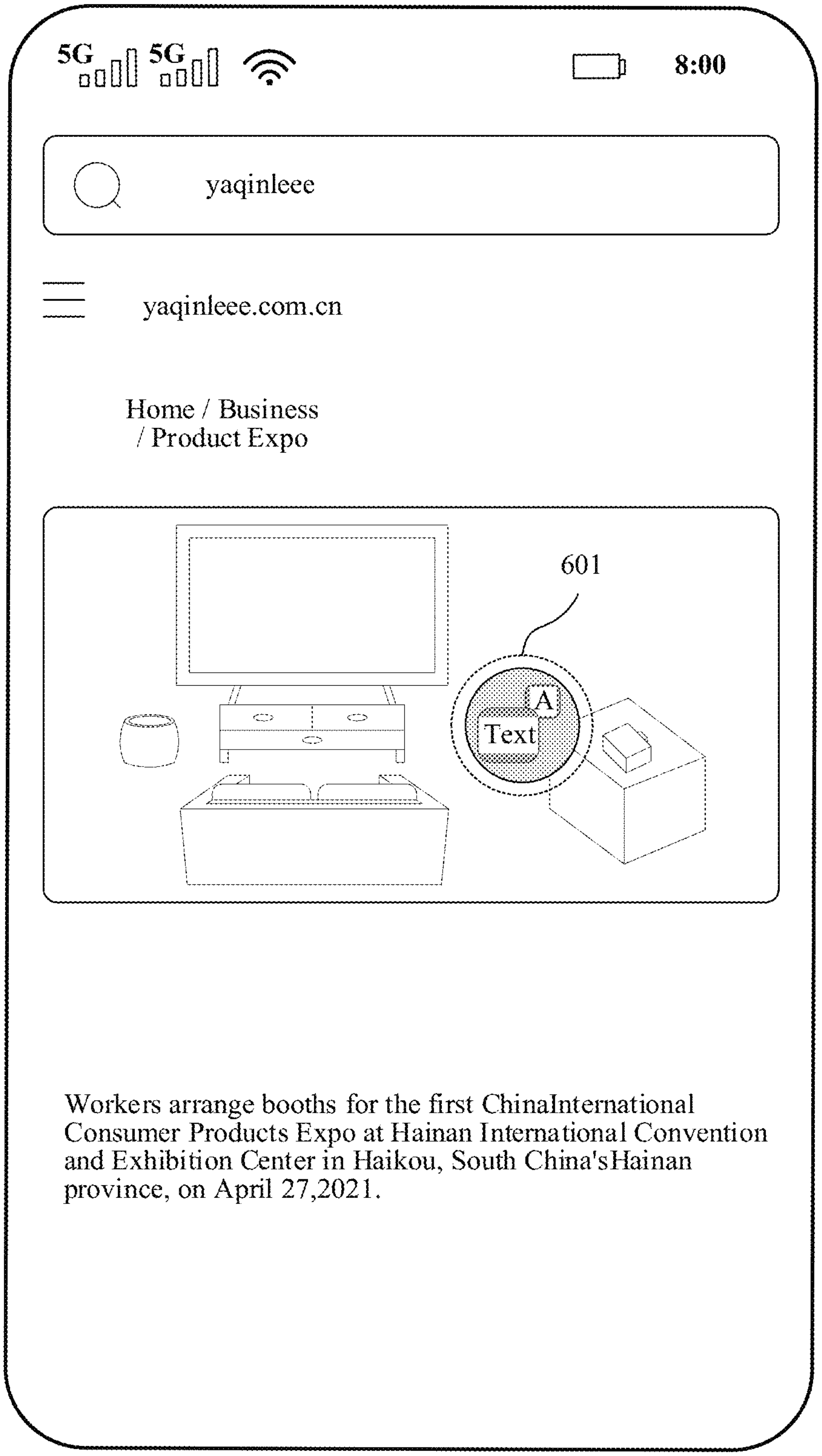
Figure 6L:
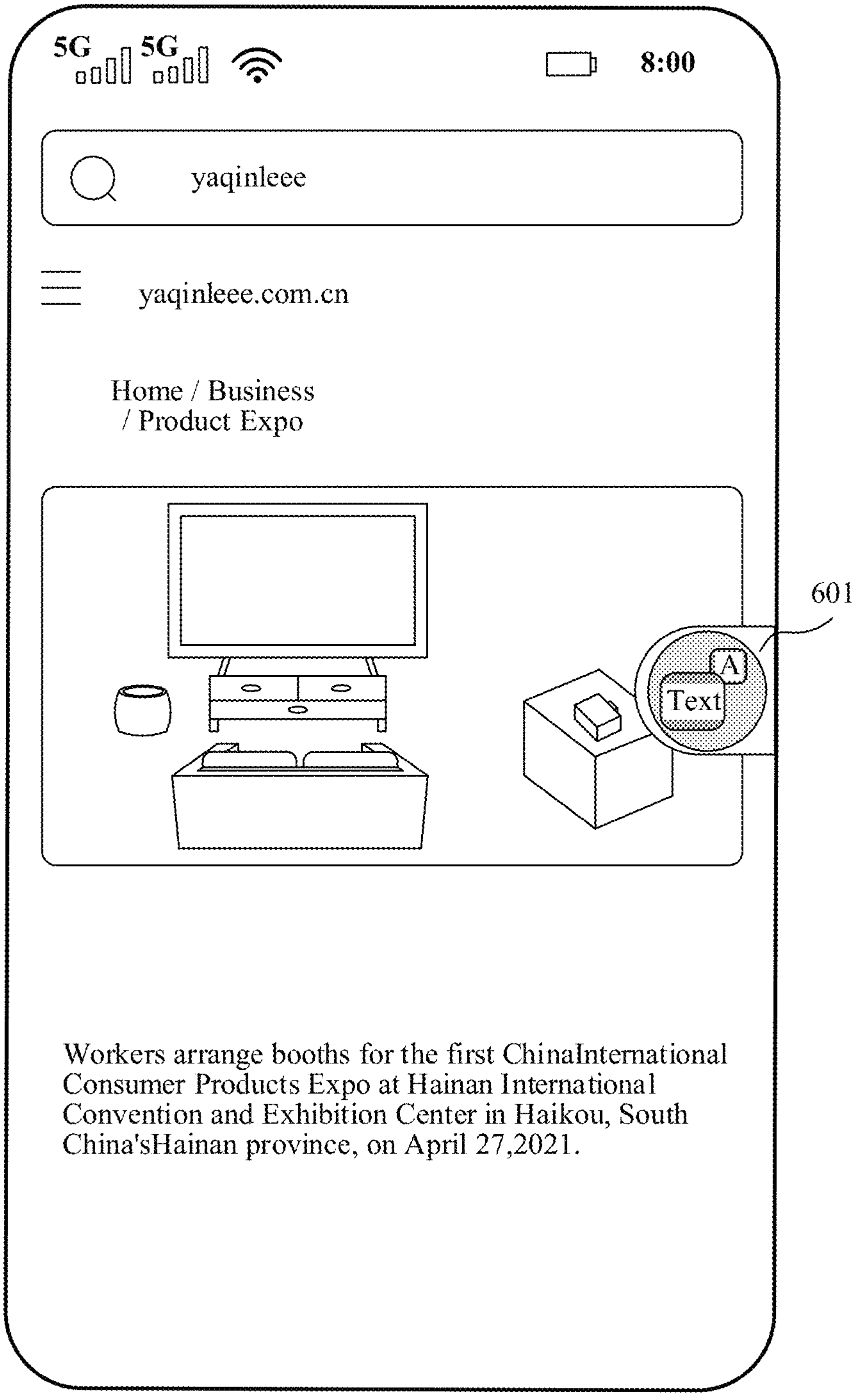

Optionally, as shown in FIG. 6J and FIG. 6K, the first electronic device may also detect a user operation of dragging the floating ball 601. After the movement is completed, the first electronic device may display the aggregated floating ball 601 at a position after movement, referring to FIG. 6L.

By implementing the foregoing method, the user can adjust the position of the currently displayed floating ball at will, so as to minimize the blocking of the floating ball to the currently displayed user interface, thereby improving the user experience.

Figure 6M:
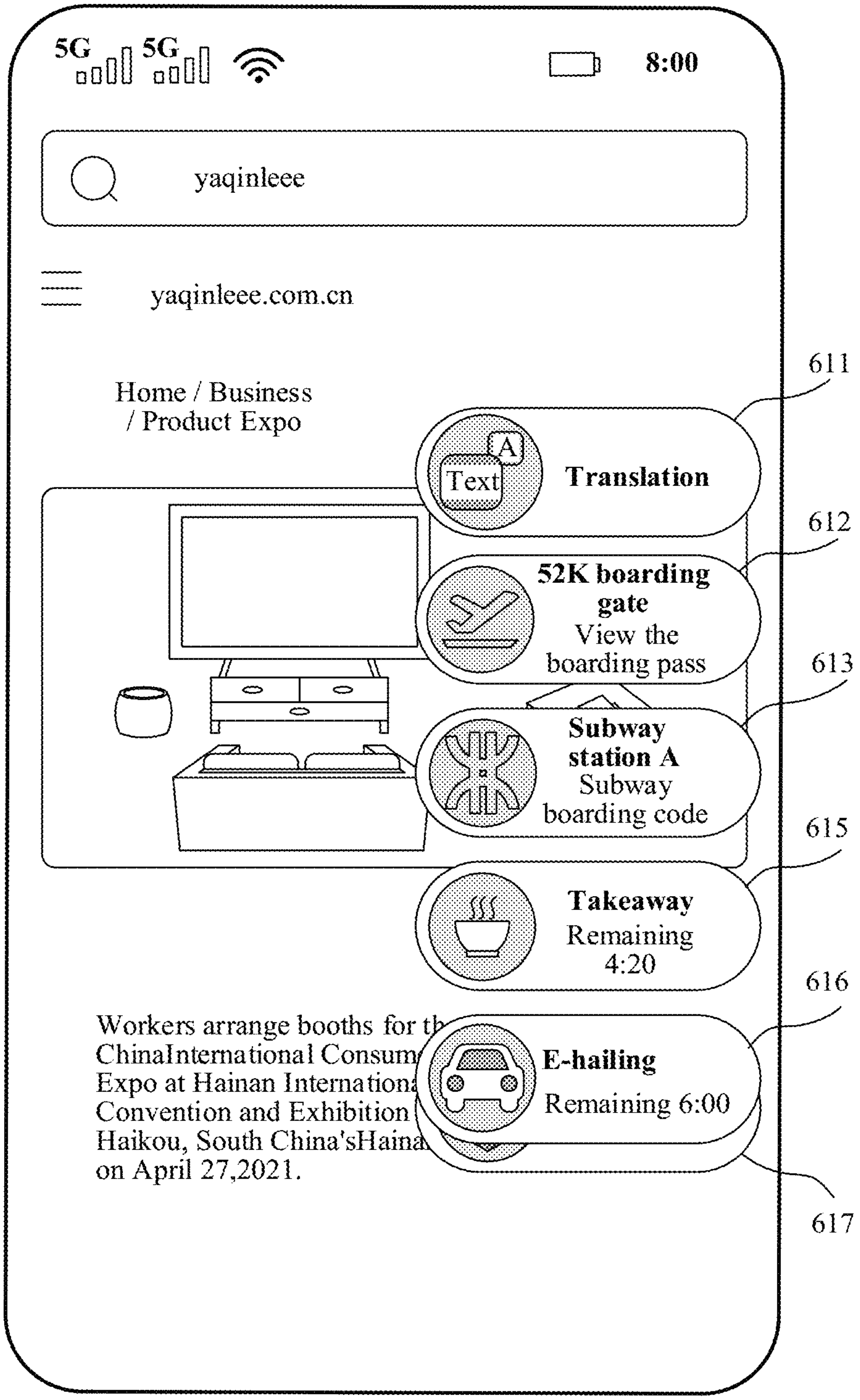

The first electronic device can support displaying a plurality of floating balls. The first electronic device does not limit the quantity of floating balls that the first electronic device supports displaying. As shown in FIG. 6M, the first electronic device may display 6 floating balls: in addition to the translation floating ball 611, the flight floating ball 612, and the subway floating ball 613 described above, a takeaway floating ball 615, a travel floating ball 616, and an express floating ball 617 are further included.

The takeaway floating ball 615 is a floating ball that is generated after it is detected that the user uses a takeaway application to order food, and is used to prompt the progress of the takeaway ordering. The user may acquire the progress of food ordering through the foregoing floating ball. For example, the user may know that the takeaway will be delivered in about 4 minutes and 20 seconds through the "remaining 4:20" displayed in the floating ball 615. The travel floating ball 616 is a floating ball that is generated after it is detected that the user uses a travel application to book a taxi, and is used to prompt the car-hailing progress. For example, the user may know that the booked taxi will arrive at the departure place in 6 minutes through the "remaining 6:00" displayed in the floating ball 615. The express floating ball 617 may be configured to remind the user of delivered expresses.

As shown in FIG. 6M, the first electronic device may completely display five floating balls in an unfolded state in a non-overlap manner. The first electronic device may fold the remaining floating balls behind the fifth floating ball. For example, the first electronic device may fold and display the floating ball 617 behind the fifth floating ball (the floating ball 616), that is, display part of the floating ball 617 (the floating ball 617 is partially covered by the floating ball 616). The first electronic device may detect a sliding operation on the floating ball region. In response to the operation, the first electronic device may display the covered floating ball.

Figure 6N:
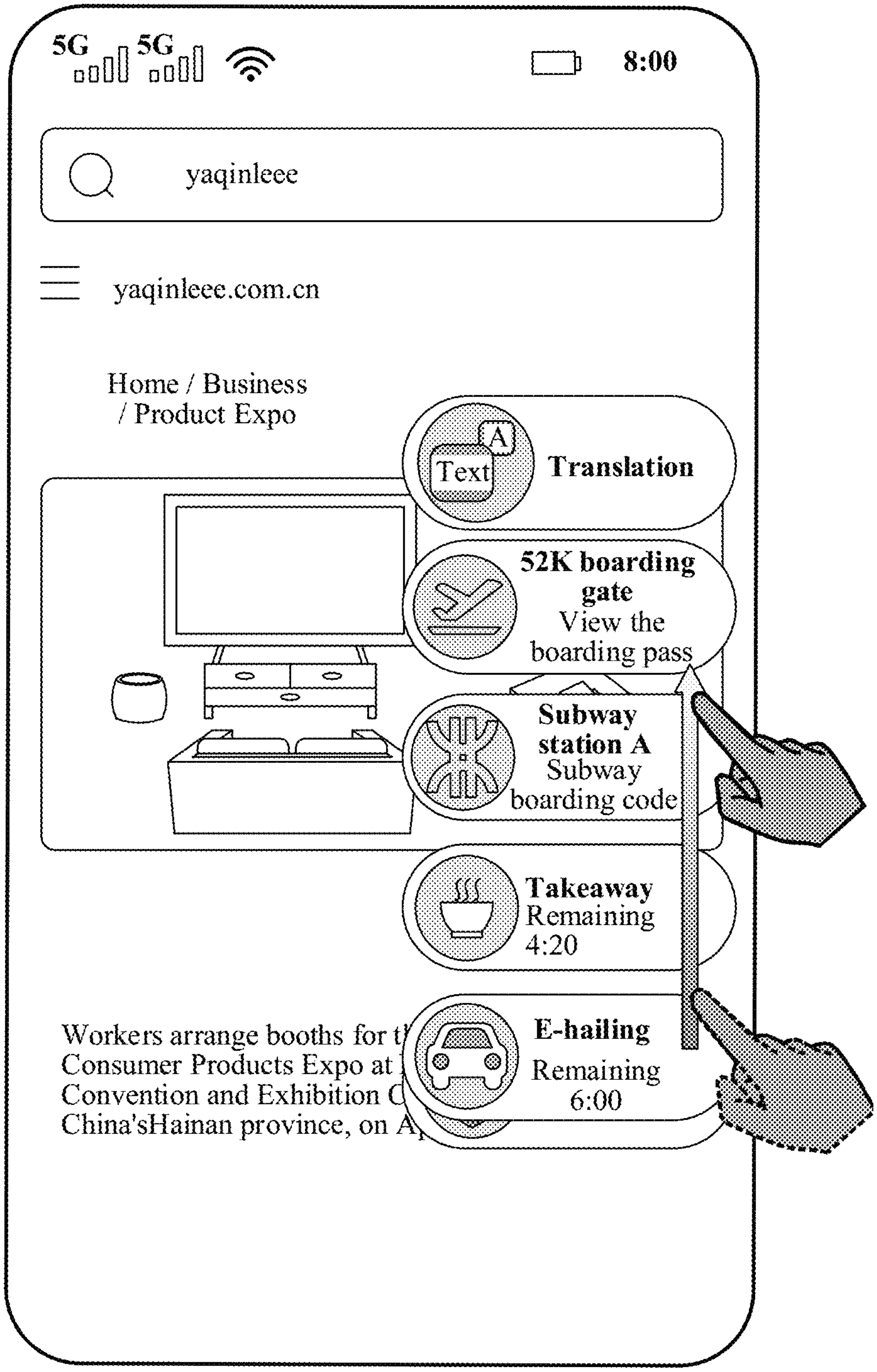
Figure 6O:
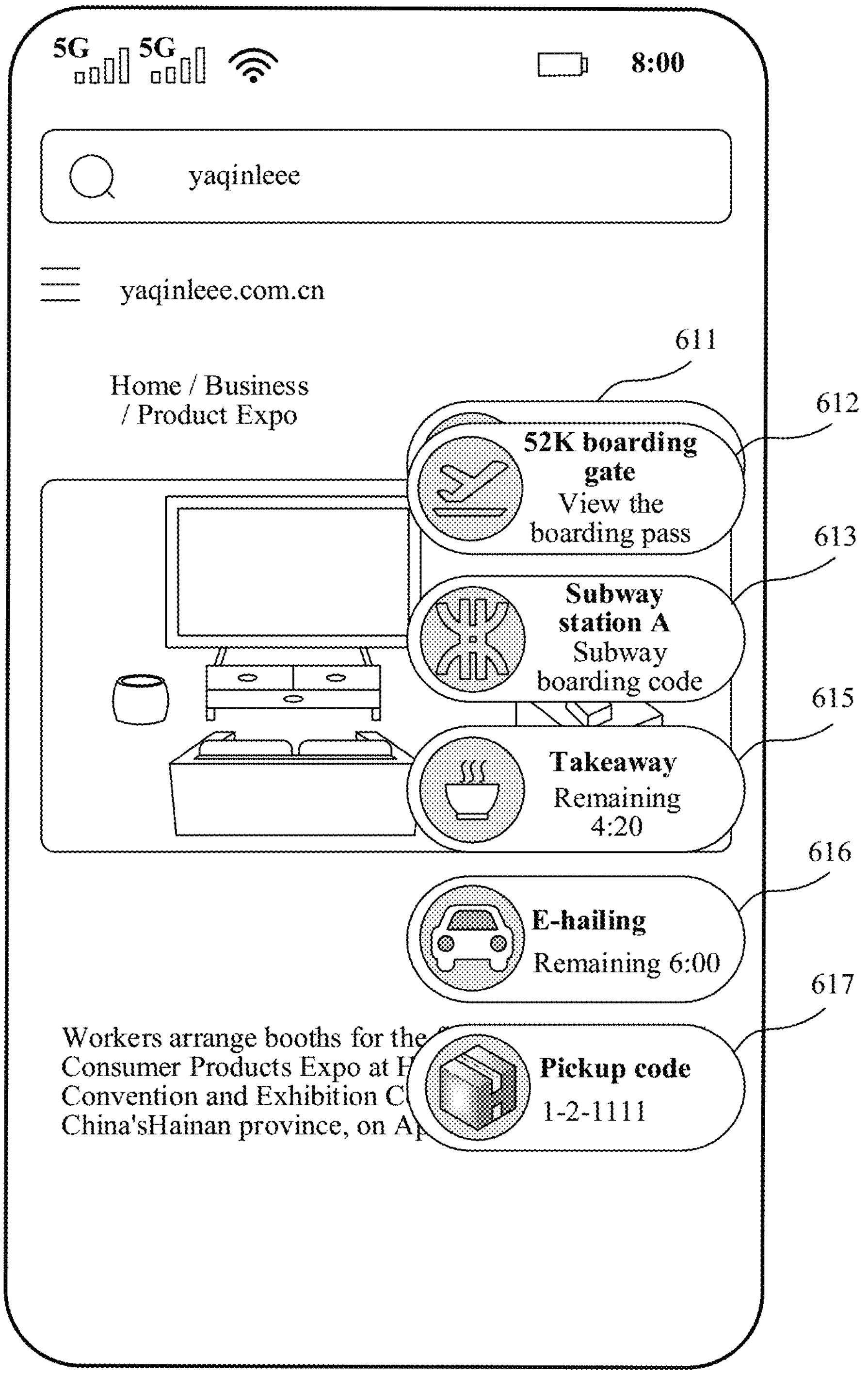

For example, referring to FIG. 6N, the first electronic device may detect a user operation of sliding upward on the floating ball region. In response to the foregoing user operation, the first electronic device may display the folded express floating ball 617 shown in FIG. 6O. In addition, the first electronic device may fold the translation floating ball 611 that exceeds the complete display quantity.

When the user cannot acquire the desired floating ball, the user needs to exit the currently displayed interface and open a new application, page, and the like. This adds a large quantity of user operations, increases the complexity of the interaction, and degrades the user experience. By implementing the foregoing method, the first electronic device can display a plurality of floating balls, thereby avoiding the problem that the user cannot acquire the desired floating ball at any time due to the limitation of the quantity of floating balls, and then acquire the shortcut operation provided by the floating ball.

In this embodiment of this application, on the user interface shown in FIG. 4C, a subway floating ball 412 may be referred to as a first floating ball, and a flight floating ball 413 may be referred to as a second floating ball. An icon of a subway application displayed in the subway floating ball 412 may be referred to as an identifier of a first application. Subway station information and a subway boarding code indication displayed in the subway floating ball 412 may be referred to as first information. An icon of a flight application displayed in the flight floating ball 413 may be referred to as an identifier of a second application. Boarding gate information and electronic boarding pass indication information displayed in the flight floating ball 413 may be referred to as second information.

On the user interface shown in FIG. 4C and FIG. 4K, when no user operation of clicking the subway floating ball 412 is detected within a period of time for which the subway floating ball 412 has been displayed, the subway floating ball 412 may be changed to a thumbnail state. The period of time may be referred to as a first duration. When no user operation of clicking the flight floating ball 413 is detected within a period of time for which the flight floating ball 413 has been displayed, the flight floating ball 413 may be changed to a thumbnail state. The period of time may be referred to as a second duration. The first duration and the second duration may be equal, for example, 5 seconds, or may not be equal.

Referring to FIG. 4L, the floating ball 414 obtained by aggregating the subway floating ball 412 and the flight floating ball 413 may be referred to as a third floating ball. An icon in an overlapping style displayed in the floating ball 414 may indicate that the floating ball is an aggregated floating ball. The icon in the overlapping style may be referred to as third floating ball including indication information.

Referring to FIG. 4M, a user operation on the floating ball 414 detected by the electronic device may be referred to as a first user operation.

Referring to FIG. 4G, a user operation on the subway floating ball 412 detected by the electronic device may be referred to as a second user operation. The page shown in FIG. 4H may be referred to as a first page. The information displayed on the page shown in FIG. 4H may be referred to as third information.

On the user interface shown in FIG. 6M, the subway floating ball 412 and the flight floating ball 413 are respectively the first floating ball and the second floating ball. The floating ball 616 may be referred to as a fourth floating ball, and the floating ball 617 may be referred to as a fifth floating ball. The sliding up operation shown in FIG. 6N may be referred to as a third user operation. After the foregoing operation is performed, the floating ball 617 is no longer covered by the floating ball 616.

On the user interface shown in FIG. 5E, the translation floating ball 513 may also be referred to as a first floating ball. The time from the display of the translation floating ball 513 in FIG. 5E to the ending of the translation floating ball 513 in FIG. 5K may be referred to as a third duration. The time from displaying the translation floating ball 513 in the unfolded state in FIG. 5E to displaying the translation floating ball 513 in the thumbnail state with a countdown in FIG. 5I may be referred to as a fourth duration.

Referring to FIG. 6C, FIG. 6D, and FIG. 6F to FIG. 6H, the floating ball 616 may be referred to as a first floating ball or a second floating ball, and an operation of dragging the floating ball 616 by the user may be referred to as a fourth user operation. The position at which the user stops dragging shown in FIG. 6G may be referred to as a first position.

Figure 7:
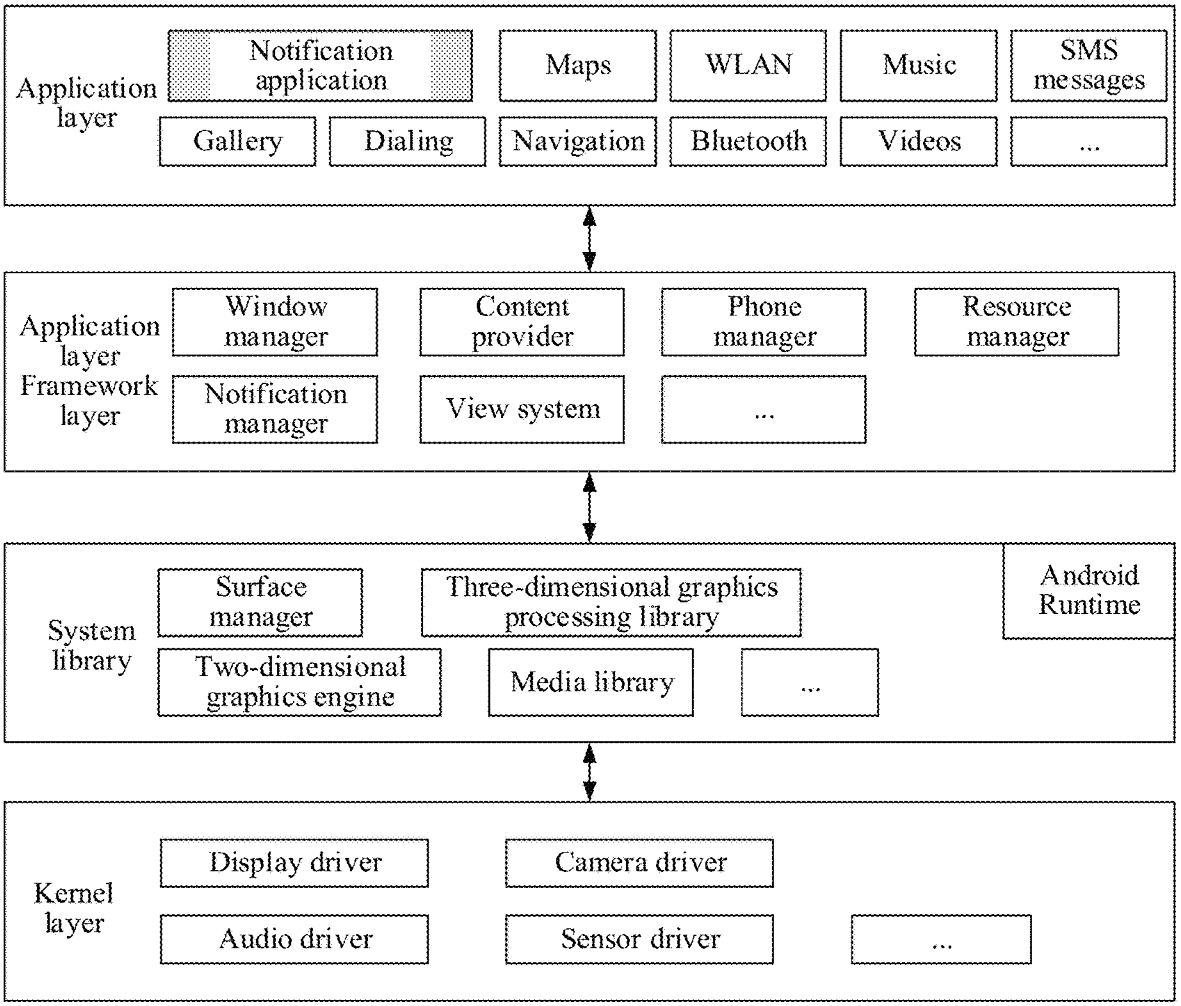
FIG. 7 is a structural block diagram of software of a floating ball processing method in a multitasking scenario according to an embodiment of this application.

A software system of the first electronic device may use a layered architecture, an event-driven architecture, a micro core architecture, a micro service architecture, or a cloud architecture. In this embodiment of the present invention, an Android system with a layered architecture is used as an example to illustrate a software structure of the first electronic device. FIG. 7 shows an example of a structural block diagram of software of a first electronic device performing a floating ball processing method in a multitasking scenario according to an embodiment of this application.

In the layered architecture, the software is divided into several layers, and each layer has a clear role and task. The layers communicate with each other by using a software interface. In some embodiments, the Android system is divided into four layers that are respectively an application layer, an application framework layer, an Android runtime (Android Runtime) and system library; and a kernel layer from top to bottom.

The application layer may include a series of application packages. As shown in FIG. 7, the application packages may include applications such as a notification application, gallery, dialing, maps, navigation, WLAN, Bluetooth, music, videos, and SMS messages.

In this embodiment of this application, the notification application may acquire data reflecting the current state or environment of the first electronic device, and determine, based on the data, whether to display a floating ball matching the state or environment, so as to provide a timely and convenient floating ball notification service for the user.

With reference to the user interfaces shown in FIG. 4A to FIG. 4N, FIG. 5A to FIG. 5K, and FIG. 6A to FIG. 6O, the notification application may acquire data reflecting the current state or environment of the first electronic device, and determine whether the first electronic device is within a subway station geographic range or an airport geographic range, or recognize whether the first electronic device is performing an operation of copying text in an uncommonly used language of the system or not, or the like. When it is detected that the geographic range is meets or a preset specific operation is performed, the notification application may invoke the window manager to display the flight floating ball, the subway floating ball, the translation floating ball, the navigation floating ball, or the like that matches the geographic range being met or a preset specific operation being performed.

The application framework layer provides an application programming interface (application programming interface, API) and a programming framework for applications at the application layer. The application framework layer includes some predefined functions.

As shown in FIG. 7, the application framework layer may include a window manager, a content provider, a view system, a phone manager, a resource manager, a notification manager, and the like.

The window manager is configured to manage a window application. The window manager may acquire a size of a display screen, determine whether there is a status bar, lock a screen, capture a screen, and the like. In this embodiment of this application, displaying the user interfaces shown in FIG. 4A to FIG. 4N, FIG. 5A to FIG. 5K, and FIG. 6A to FIG. 6O is dependent on the window manager. The window manager may manage the foreground application or the desktop, display positions and regions of floating balls, and the like.

The content provider is configured to store and acquire data and make the data accessible to an application. The data may include a video, an image, an audio, calls made and answered, a browsing history and bookmarks, an address book, and the like.

The view system includes a visual control such as a control for text display or a control for picture display. The view system may be configured to construct an application. A display interface may include one or more views. For example, a display interface including an SMS notification icon may include a view for displaying text and a view for displaying a picture. In this embodiment of this application, displaying the user interfaces shown in FIG. 4A to FIG. 4N, FIG. 5A to FIG. 5K, and FIG. 6A to FIG. 6O also depends on the view system. The view system may manage a text control in a displayed user interface, a control for displaying a picture, and the like, such as a floating ball and prompt information in a floating ball.

The phone manager is configured to provide a communication function of the first electronic device, for example, call state management (including getting through, hang-up, and the like). In this embodiment of this application, after an operation of copying a phone number is recognized, the function of the notification application to display a calling floating ball and use the calling floating ball to dial depends on a calling state management service provided by the phone manager.

The resource manager provides various resources such as a localized character string, an icon, a picture, a layout file, and a video file for an application. In this embodiment of this application, the first electronic device may acquire, through resources provided by the resource manager, data reflecting the current state or environment of the first electronic device, such as current location, a system time, and clipboard data.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in the form of a graph or a scroll bar text, for example, a notification of an application running on the background, or may be a notification that appears on the screen in the form of a dialog window. For example, text information is prompted on a status bar, a prompt tone is made, the electronic device vibrates, or an indicator light flashes.

In this embodiment of this application, the floating ball may be a form of displaying notification content for the notification manager. In addition, the notification manager may alternatively display the notification content in the form of a card, a banner, a notification menu when the screen is locked, or the like. Examples are not exhausted herein.

The Android Runtime includes a core library and a virtual machine. The Android Runtime is responsible for scheduling and management of the Android system.

The core library includes two parts: one part is a performance function that the Java language needs to invoke, and the other part is a core library of Android. The application layer and the application framework layer are run in the virtual machine. The virtual machine executes java files of the application layer and the application framework layer as binary files. The virtual machine is configured to execute functions such as object lifecycle management, stack management, thread management, security and exception management, and garbage collection.

The system library may include a plurality of function modules, such as a surface manager (surface manager), a media library (Media Libraries), a three-dimensional graphics processing library (for example, OpenGL ES), and a two-dimensional (2D) graphics engine (for example, SGL).

The surface manager is configured to manage a display subsystem and provide fusion of 2D and 3D layers for a plurality of applications. The 2D graphics engine is a drawing engine for 2D graphics. The three-dimensional graphics processing library is configured to implement three-dimensional graphics drawing, image rendering, synthesis, layer processing, and the like. The window manager and the view system can realize the function of displaying the user interfaces shown in FIG. 4A to FIG. 4N, FIG. 5A to FIG. 5K, and FIG. 6A to FIG. 6O through the image drawing and display capacities provided by the surface manager, the 2D graphics engine, and the three-dimensional graphics processing library:

The media library supports playback and recording in a plurality of commonly used audio and video formats, static image files, and the like. The media library may support a plurality of audio and video encoding formats.

The kernel layer is a layer between hardware and software. The kernel layer includes at least a display driver, a camera driver, an audio driver, and a sensor driver. The display driver may control a display screen on the first electronic device to perform displaying according to a preset user interface, for example, display the user interfaces shown in FIG. 4A to FIG. 4N, FIG. 5A to FIG. 5K, and FIG. 6A to FIG. 6O.

Figure 8:
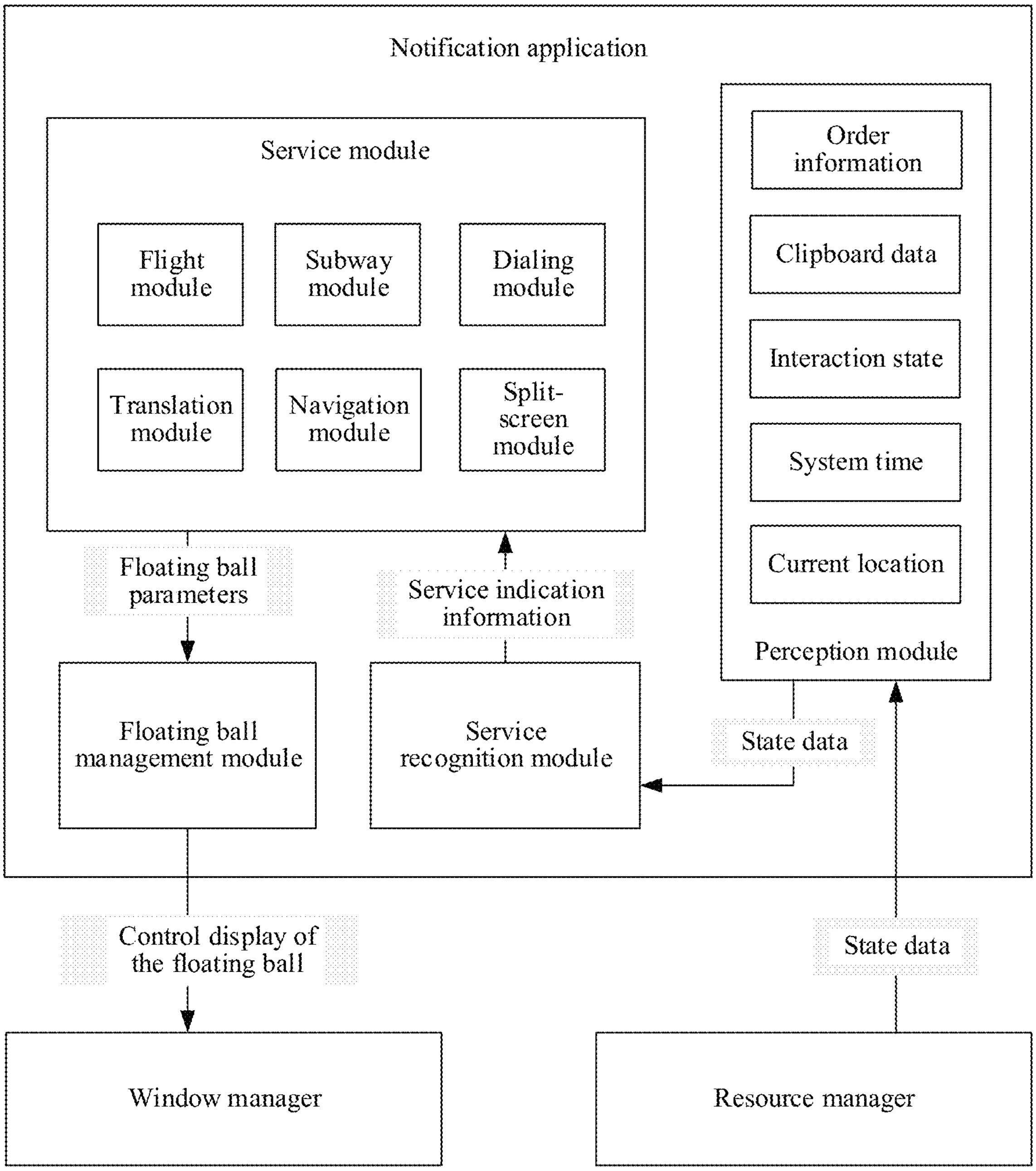
FIG. 8 is a structural diagram of software of a notification application according to an embodiment of this application.

Further, FIG. 8 shows and example of a specific structure of the notification application. A description is provided below with reference to the various software modules of the notification application shown in FIG. 8 and the services provided by the foregoing modules in the process of implementing the floating ball processing method in a multitasking scenario.

As shown in FIG. 8, the notification application may include a perception module, a service recognition module, a service module, and a floating ball management module.

The perception module may be configured to acquire, in a real-time manner, preset data for determining the service scenario in which the first electronic device is currently located. The service recognition module may determine, according to the data acquired by the perception module, whether to trigger the display of a floating ball or not and the type of the floating ball to be displayed. The service module may acquire, according to the type of the floating ball determined by the service recognition module, corresponding information to be displayed from the application corresponding to the floating ball. The floating ball management module may display the corresponding floating ball according to the data determined when the service module executes the floating ball service.

The perception module may acquire, in a real-time manner, preset data for determining the service scenario in which the first electronic device is currently located. The preset data for determining the service scenario in which the first electronic device is currently located includes, but not limited to: data indicating a working state of the electronic device, order information, and a notification message.

The data indicating the working state of the electronic device includes: positioning data indicating a location in which the first electronic device is currently located (current location), a current system time of the first electronic device (current time), an interaction state reflecting whether the first electronic device interacts with the user, and clipboard data indicating whether the user performs a copy operation or not and copied content.

The first electronic device may acquire, from an installed application, the information of the order completed by the user using the application. The foregoing order is, for example, a flight order, a car-hailing order, a takeaway order, or an express order.

The first electronic device may also acquire the foregoing order information by recognizing a notification of the foregoing application. For example, when a departure time of a flight booked by the user is approaching, the application installed on the first electronic device for the user to book the flight may receive a flight itinerary notification sent by a server. The server refers to a server that corresponds to the flight application installed on the first electronic device and provides services such as flight inquiry and flight booking. Based on the foregoing notification, the first electronic device may acquire information about the flight booked by the user, such as a flight number, a departure place, and a departure time. Further, the first electronic device may recognize current states or actions of the user such as being at the airport, checking in, or waiting for the flight.

Not limited to the current location, the system time, the interaction state, the clipboard data, and the notification of the application listed above, the perception module may also perceive other data reflecting the state of the first electronic device. This is not limited in this embodiment of this application.

The service recognition module may determine whether to trigger a floating ball service or not according to the data acquired by the perception module.

First, specific types of floating balls and a display condition of each floating ball may be recorded in the service recognition module. Table 1 shows the types of floating balls and the display condition of each floating ball recorded in the service recognition module. The service recognition module may determine, according to Table 1, whether the current state or environment of the first electronic device triggers a certain type of floating ball or not.

TABLE 1

| Service type | Action | Current location | Current time | Interaction state | Clipboard data |
|---|---|---|---|---|---|
| Flight | Display | Airport geographic range | Wait for the flight | \ | \ |
| | Hide | \ | \ | No operation within a timing period | \ |
| | End | Non-airport geographic range | Taken off | | |
| Subway | Display | Subway station geographic range | \ | \ | \ |
| | Hide | \ | \ | No operation within a timing period | \ |
| | End | Non-subway station geographic range | \ | \ | \ |
| Translation | Display | \ | \ | Copy | Uncommonly used language of the system |
| | Hide | \ | \ | No operation within a timing period | \ |
| | End | \ | \ | Close the page | \ |
| Navigation | Display | \ | \ | Copy | Address |
| | Hide | \ | \ | No operation within a timing period | \ |
| | End | \ | \ | No operation within a timing period | |
| Dialing | Display | \ | \ | Copy | Phone number |
| | Hide | \ | \ | No operation within a timing period | \ |
| | End | \ | \ | No operation | \ |

TABLE 1-continued

| Service type | Action | Current location | Current time | Interaction state | Clipboard data |
|---|---|---|---|---|---|
| | | | | within a timing period | |
| Split-screen | Display | \ | \ | Switch back and forth | \ |
| | Hide | \ | \ | No operation within a timing period | \ |
| | End | \ | \ | No operation within a timing period | \ |
| Flight Subway Translation | Unfold | \ | \ | Click the floating ball | \ |

"Service type" includes: flight, subway, translation, navigation, dialing, and split-screen. The flight, subway, translation, navigation, dialing, and split-screen respectively correspond to the flight service, subway service, translation service, navigation service, dialing service, and split-screen service in the foregoing introduction of the user interfaces.

"Action" includes: display, hide, end, and unfold. The action of displaying the floating ball 412 shown in FIG. 4B may be referred to as a display action. The action of adjusting the floating ball to a thumbnail state (including aggregation) shown in FIG. 4K and FIG. 4L may be referred to as a hiding action. The action of no longer displaying the floating ball 513 shown in FIG. 5K may be referred to as an ending action. The action of unfolding the floating ball 414 in the thumbnail state shown in FIG. 4M and FIG. 4N may be referred to as an unfolding action.

"Current location" includes: airport geographic range, non-airport geographic range, subway station geographic range and non-subway station geographic range. The "airport geographic range" means that the current location of the first electronic device is within the geographic range of a preset airport; on the contrary, the "non-airport geographic range" means that the current location of the first electronic device is not within the geographic range of the preset airport. Similarly, the "subway station geographic range" means that the current location of the first electronic device is within the geographic range of a subway station; and the "non-subway station geographic range" means that the current location of the first electronic device is not within the geographic range of the preset subway station.

The state at the "current time" includes: waiting for the flight and taken off. The state at the current time being waiting for the flight means that the current time is within a period of time before the departure of the flight booked by the user. The period of time is, for example, 4 hours before the departure. This is not limited in this embodiment of this application. The state at the current time being taken off means that the current time of the first electronic device is after the departure of the flight booked by the user (including departure).

The "interaction state" includes actions such as: no operation within a timing period, copy, close the page, switch back and forth, and click the floating ball. No operation within the timing period means that the first electronic device has not detected any user operation on the floating ball. Copy refers to a user operation of copying images and text detected by the first electronic device. Close the page refers to a user operation detected by the first electronic device for closing the currently displayed page or the page on which the copy operation is performed. Switch back and forth refers to a user operation of frequently switching between two or more applications detected by the first electronic device, for example, an operation of switching from an application A to an application B and then switching to the application A, which frequently changes the foreground application. Click the floating ball refers to a click operation on a floating ball in a thumbnail state on the screen detected by the first electronic device.

"Clipboard data" includes: uncommonly used language of the system, address, and phone number. When the "interaction state" is copy, the language used for the data written in the "clipboard data" being an uncommonly used language of the system can indicate an action of copying the foreign language text by the user; the data written in the "clipboard data" being an address can indicate an action of copying the address by the user; and the data written in the "clipboard data" being a phone number can indicate an action of copying the phone number by the user.

The foregoing "\" indicates the type of data that the service recognition module does not need to consider when determining whether to trigger a service or not. The value of the data marked as "\" in the row will not affect the service recognition module in determining whether to trigger the service in the row or not. For example, when the service recognition module recognizes whether to trigger the display of the flight floating ball or not, the service recognition module does not need to pay attention to the data in the "interaction state" and "clipboard data". Any values of "interaction state" and "clipboard data" will not affect the service recognition module in recognizing whether to trigger the display of the flight floating ball or not.

In the flight service: first, the first electronic device may acquire the user's flight order from the flight application, or acquire the user's flight order by monitoring notifications of the flight application, and then determine the user's flight information (departure time, departure place, and the like). When it is detected that the current location is within the airport geographic range and the state at the current time is waiting for the flight, the service recognition module may determine to trigger the display of the flight floating ball. The prompts in the flight floating ball may be information such as a check-in counter, a boarding gate, and a seat number. Further, the flight floating ball may broadcast the foregoing information in rotation.

Optionally, the service recognition module may further distinguish the specific stage at the current time in the process of waiting for the flight, such as a check-in stage, a security check stage, and a wait-for-boarding stage. Further, the flight floating ball may display the foregoing information according to the different stages. If the current location is within the airport geographic range, the current time is after the departure time, and a flight delay notification is received (or a delay is detected in the flight order acquired from the flight application), the prompt information displayed in the flight floating ball may also include a delay prompt.

If the first electronic device has displayed the flight floating ball in an unfolded state for a period of time, and the first electronic device has not detected any user operation on the flight floating ball (interaction state: no operation within the timing period), the service recognition module may determine to hide the flight floating ball. If the current location is not within the airport geographic range, and the current time is after the departure time of the booked flight (the departure time has been reached and the user is not within the airport range), the service recognition module may determine to end the flight floating ball.

In the subway service: when the current location is within the subway station geographic range, the service recognition module may determine to trigger the subway service. In this case, the notification application may determine to display the subway floating ball. When the current location is not within the subway station geographic range, the service recognition module may determine to end the subway floating ball. Similarly, if no user operation on the subway floating ball is detected within the timing period, the service recognition module may determine to hide the subway floating ball, and adjust the subway floating ball from the unfolded state to a thumbnail state.

In the translation service: when the "interaction state" is copy, and the language used for the copied data is an uncommonly used language of the system, the service recognition module may determine to display the translation floating ball. After the translation floating ball is displayed and when the "interaction state" is close the page, the service recognition module may determine to end the translation floating ball. Similarly, if no user operation on the translation floating ball is detected within the timing period, the service recognition module may determine to adjust the translation floating ball from an unfolded state to a thumbnail state.

In the navigation service: when the "interaction state" is copy and the copied data is an address, the service recognition module may determine to display the navigation floating ball. If no user operation on the subway floating ball is detected within the timing period, the service recognition module may determine to adjust the navigation floating ball form an unfolded state to a thumbnail state. After entering the thumbnail state, the navigation floating ball may start a new round of timing. After the new round of timing ends and no user operation on the navigation floating ball is detected, the service recognition module may determine to end the navigation floating ball.

In the dialing service: when the "interaction state" is copy and the copied data is a phone number, the service recognition module may determine to display the dialing floating ball. If no user operation on the subway floating ball is detected within the timing period, the service recognition module may determine to adjust the dialing floating ball from an unfolded state to a thumbnail state. After entering the thumbnail state, the dialing floating ball may start a new round of timing. After the new round of timing ends and no user operation on the dialing floating ball is detected, the service recognition module may determine to end the dialing floating ball.

In the split-screen service: when the "interaction state" is switch back and forth, the service recognition module may determine to display the split-screen floating ball. If no user operation on the subway floating ball is detected within the timing period, the service recognition module may determine to adjust the split-screen floating ball from an unfolded state to a thumbnail state. After entering the thumbnail state, the split-screen floating ball may start a new round of timing. After the new round of timing ends and no user operation on the split-screen floating ball is detected, the service recognition module may determine to end the split-screen floating ball.

Further, for the flight floating ball, the subway floating ball, and the translation floating ball, when the floating balls are changed to a thumbnail state, the plurality of floating balls in the thumbnail state may also be aggregated into one floating ball.

When a user operation on a floating ball in a thumbnail state, for example, a user operation of clicking the floating ball, is detected, the service recognition module may determine to unfold the hidden floating ball. Further, if the floating ball in the thumbnail state is an aggregated floating ball, the service recognition module may determine to unfold the aggregated floating ball.

In addition, the service type further includes an express service, a takeaway service, and a car-hailing service (taxi-hailing travel). The first electronic device may acquire order information of the user from an application that executes the foregoing service, and then display the corresponding floating ball.

For example, the first electronic device may acquire an express order of the user from an express application. When there is an order is to be confirmed for receiving, the first electronic device may confirm to the user that a preset express service in the notification application is satisfied. Therefore, the first electronic device may display the express floating ball shown in FIG. 3A. The user may acquire a to-be-executed express task through the express floating ball. When the express task has been completed, for example, when a to-be-receipted express has been receipted, the express floating ball may be ended.

For the takeaway service and the car-hailing service, reference may be made to the express service, and details are not described herein again.

According to the service type, service modules may be divided into subdivision modules such as a flight module, a subway module, a translation module, a navigation module, a dialing module, and a split-screen module. Each subdivision module records the service logic of each subdivision service. The subdivision module may determine, according to service indication information issued by the service recognition module, a state (displayed, hided, ended, unfolded) of a floating ball and information to be displayed by the floating ball.

Determining display of the flight floating ball is used as an example. The flight module may receive service indication information for displaying the flight floating ball. In response to the service indication information, the flight module may first determine flight information of the user. The flight module may acquire order information of the user from an order information module in the perception module. The order information includes flight information of the booked flight, such as a flight number, a date, a departure place, and a departure time. Based on the flight information, the flight module may determine prompt information in the flight floating ball to be displayed, for example, flight information such as a check-in counter, a boarding gate, and a seat number. In addition, the flight module may determine a page link. The page link is a link to a page displaying the user's flight order in the flight application. The flight module may use the page link to acquire and display the page displaying the user's flight order in the flight application.

The floating ball management module may construct a floating ball according to the data sent by the service module. The data sent by the service module (or referred to as invoking parameters for the service module to invoke the floating ball management module to construct a floating ball) may include: state, floating ball number (ID), displayed content, and callback interface.

The state is the state of the floating ball introduced in Table 1, including displayed, hided, ended, and unfolded. The floating ball management module may determine to display, hide, end, or unfold the floating ball according to the state. Correspondingly, the floating ball management module may determine an animation display effect corresponding to the displaying, hiding, ending, or unfolding action.

The floating ball ID may be used for marking each floating ball. Subsequently, when the state of the floating ball needs to be changed, the floating ball management module may determine the changed floating ball according to the floating ball ID. The displayed content refers to content directly displayed by the floating ball in the unfolded state, including an application icon and a prompt. The displayed content can provide the user with the most intuitive notification prompt. The application icons and the prompts that need to be displayed in the floating balls corresponding to different services are different. For details, reference may be made to the introduction in FIG. 3A, and details are not described herein again.

The callback interface may be configured to transmit a control command back to the service module. The control command may instruct the service module to perform a subsequent operation, for example, display a jump page. The flight floating ball is used as an example. After detecting a user operation on the flight floating ball in an unfolded state by the user, the floating ball management module may transmit a control command indicating a click operation back to the flight module. In response to the control command, the flight module may invoke the window manager to display a flight details page. The flight details page is acquired by the flight module from the flight application. The flight details page is, for example, the boarding pass page shown in FIG. 4E. Alternatively, the control command may trigger the running of the flight application. In this way, the user may acquire flight information of the booked flight on the user interface provided by the flight application.

For the window manager and the resource manager, reference may be made to the introduction in FIG. 7, and details are not described herein again.

Optionally, in addition to the notification service provided by the floating ball, the first electronic device may also include other types of notification services, such as a card notification and a banner notification. In this case, in addition to the floating ball notification, services provided by the notification application shall also include other types of notification services such as a card notification and a banner notification. In this case, the notification application may further include a notification management module, referring to the structural diagram of software shown in FIG. 9.

The notification management module may include a floating ball module, a card module, and a banner module. After receiving service indication information sent by the service recognition module, the notification management module may also determine the form of the notification. For example, when the service indication information indicates a flight service, the notification management module may determine to display a flight floating ball, a flight card, and a flight banner. In this case, the service indication information sent by the notification management module to the flight service further includes notification form indication information. The flight service may determine, according to the notification form indication information, which form of notification to generate, that is, a floating ball notification, a card notification, or a banner notification.

Correspondingly, according to the notification form indicated by the notification form indication information, the flight service may respectively send notification content (parameters) to the management module corresponding to each notification form. For example, the notification forms of the flight service indicated by the notification form indication information include a floating ball notification, a card notification, and a banner notification. In this case, the flight service may send the notification content to the floating ball management module, a card management module, and a banner management module respectively. The floating ball management module, the card management module, and the banner management module may generate, according to the notification content, a floating ball, a card, and a banner displaying the notification content.

Figure 9:
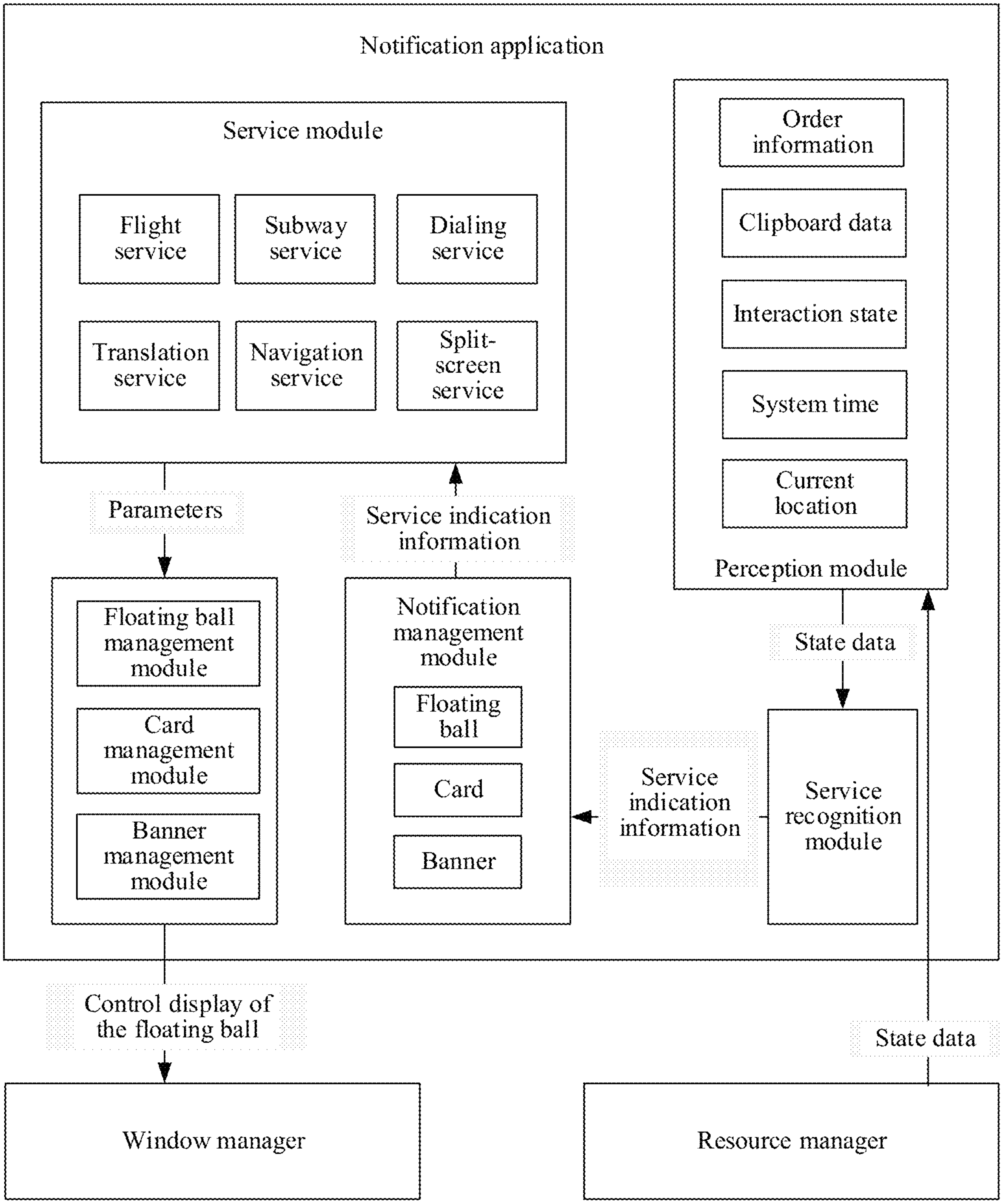
FIG. 9 is another structural diagram of software of a notification application according to an embodiment of this application.
Figure 10:
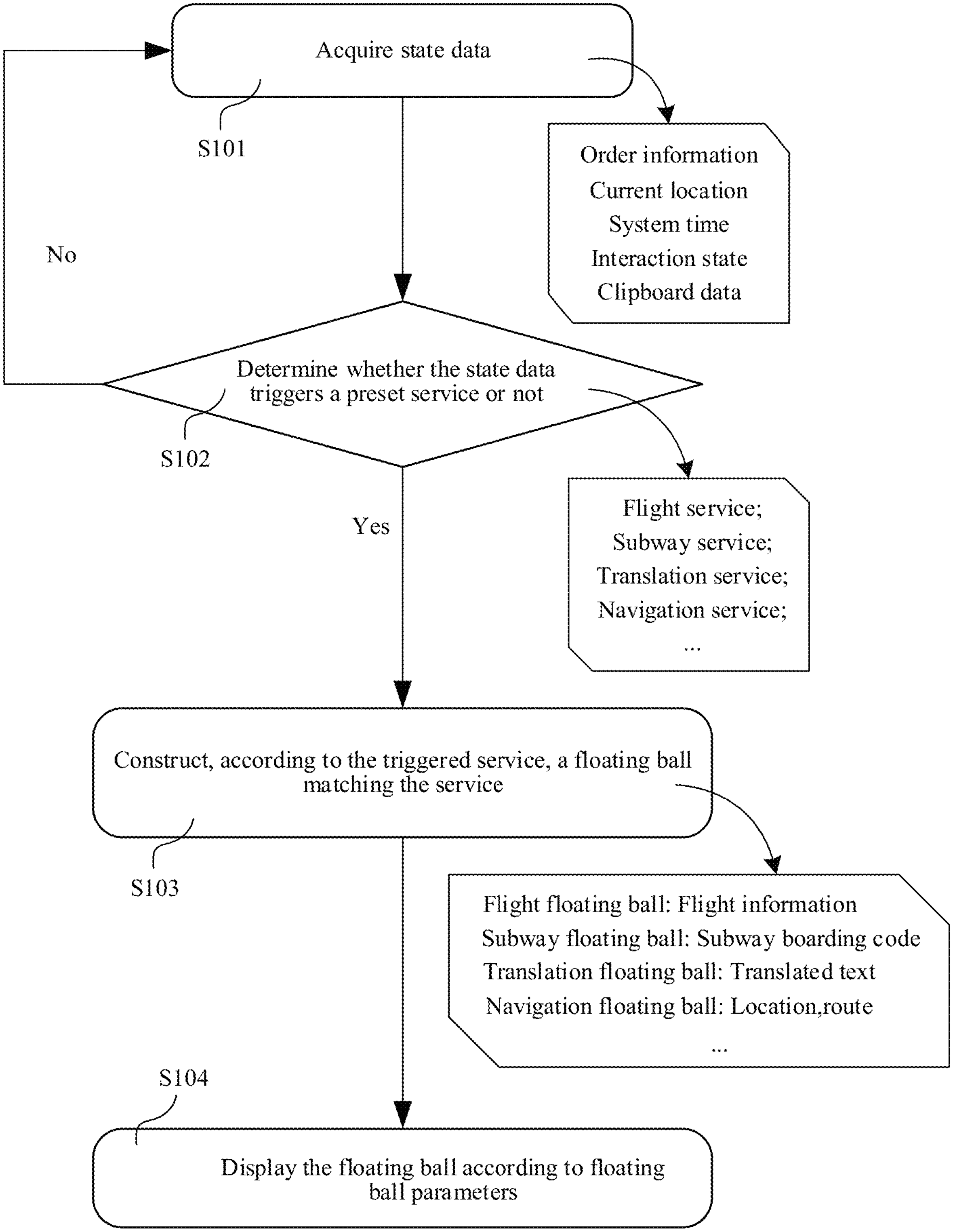
FIG. 10 is a flowchart of a floating ball processing method in a multitasking scenario according to an embodiment of this application.

The software structures shown in FIG. 8 and FIG. 9 are merely examples, and shall not constitute a limitation on this embodiment of this application.

With reference to the user interfaces shown in FIG. 4A to FIG. 4N and FIG. 5A to FIG. 5K, FIG. 10 is a flowchart of implementing a floating ball processing method in a multi-tasking scenario by the first electronic device.

S101: Acquire state data.

The first electronic device may acquire, in a real-time manner, preset data for determining a service scenario in which the first electronic device is currently located. Specifically, referring to FIG. 8, the perception module in the notification application may complete the action of data acquisition. The data includes, but not limited to, order information, a current location, a system time, an interaction state, clipboard data, and the like. For the order information, the current location, the system time, the interaction state, and the clipboard data, reference may be made to the introduction in FIG. 8, and details are not described herein again.

For example, state data acquired by the perception module at a time point T may be shown in the following table (Table 2):

TABLE 2

| | |
|---|---|
| Order information | Flight order A |
| Current location | Location S |
| System time | Time point T |
| Interaction state | Copy |
| Clipboard data | Hainan International Convention and Exhibition Center |

The flight order A may represent order information of a booked air ticket of the user acquired by the first electronic device from the flight application shown in FIG. 4E. The first electronic device may acquire flight information of the user from the flight order.

The location S may indicate that a geographic location in which the first electronic device is currently located is the location S. The location S may be longitude and latitude data indicating the position. A map application installed on the first electronic device may convert the longitude and latitude data into a location that is easy for the user to understand, such as a location A shown in FIG. 5G. Alternatively, the location S may alternatively be directly a converted location, such as the location A.

T The time point T refers to the current time of the first electronic device. The time point T may also represent the time at which the first electronic device acquires the current location, the interaction state, and the clipboard data.

The first electronic device may detect an interaction operation of the user with the first electronic device. The "copy" may indicate that at the time point T, the first electronic device detects a copy operation on the content displayed on the first electronic device. In addition, the first electronic device may alternatively detect a click operation, a long press operation, a double-click operation, application switching, or the like on a control displayed on the user interface, and examples are not exhausted herein.

After a "copy" operation is detected, the copied data selected by the user may be written into the clipboard of the first electronic device. The data includes, but not limited to, text. Languages use for the text include, but not limited to, Chinese, English, Japanese, German, French, and the like. For example, referring to the user interface shown in FIG. 5B, after the copy operation is detected, the copied text "Hainan International Convention and Exhibition Center" may be written into the clipboard of the first electronic device.

S102: Determine whether the state data triggers a preset service or not.

There are a plurality of scenarios in which the first electronic device uses a floating ball to provide a notification service to the user, for example, the service scenario of displaying the flight floating ball to provide the user with a quick view to the flight information, the service scenario of displaying the subway floating ball to provide the user with quick access to the subway two-dimensional code, and the service scenario of displaying the translation floating ball to provide the user with an instant translation service described above.

According to the characteristics of each service scenario, trigger conditions for various services, that is, display conditions for displaying corresponding floating balls, may be set in the first electronic device. By performing S101, the first electronic device may acquire state data reflecting its own state, and then the first electronic device may determine whether the state data meets a display condition for displaying a certain type of floating ball or not. When the display condition is met, the first electronic device may determine to display a corresponding floating ball.

Referring to the introduction of FIG. 8, service types and corresponding trigger conditions (Table 1) may be preset in the service recognition module. After receiving the state data sent by the perception module, the service recognition module queries for a service matching the state data. After a service matching the state data is found, the service recognition module may send service indication information to the service module.

For example, after receiving the state data shown in Table 2, the first electronic device may query Table 1 for a service matching the state data. It is assumed that a location S is within a geographic range of an airport S1. The airport S1 is an airport at which the flight booked by the user departs. The airport S1 further includes an airport subway station. In addition, the location S is also within the geographic range of the airport subway station. A time point T is within a check-in time range of the flight booked by the user. In this case, the service recognition module may confirm display of the flight floating ball. In addition, the service recognition module may also confirm display of the subway floating ball; and according to the interaction state "copy" in Table 2 and English text in the clipboard data, the service recognition module may also confirm triggering of display of the translation floating ball.

S103: Construct, according to the triggered service, a floating ball matching the service.

After determining the triggered service, the service recognition module may send service indication information to the service module. In this case, the service indication information may include flight floating ball display indication information, subway floating ball display indication information, and translation floating ball display indication information. The flight module, the subway module, and the translation module in the service modules may respectively receive the flight floating ball display indication information, the subway floating ball display indication information, and the translation floating ball display indication information.

After each service module receives the service indication information, each of the service modules may display, hide, end, or unfold a floating ball of a corresponding service according to the service indication information and preset service logic.

For example, the flight module may determine order information of the user in response to the received flight floating ball display indication information. The order information includes flight information of the booked flight, such as a flight number, a date, a departure place, and a departure time. Based on the flight information, the flight module may determine prompt information in the flight floating ball to be displayed, for example, flight information such as a check-in counter, a boarding gate, and a seat number. In addition, the flight module may determine a page link. The page link is a link to a page displaying the user's flight order in the flight application. The flight module may use the page link to acquire and display the page displaying the user's flight order in the flight application.

After the user's flight information is determined, the flight module may send floating ball parameters to the floating ball management module. The floating ball parameters include, but not limited to, a state, a service number (ID), displayed content, and a callback interface. For the floating ball parameters, reference may be made to the introduction in FIG. 8, and details are not described herein again.

In this case, the flight module may send the floating ball parameters shown in the following table (Table 3) to the floating ball management module:

TABLE 3

| | | |
|---|---|---|
| State | | Display |
| Floating ball ID | | 0001 |
| Displayed content | Application icon | Icon of the flight application |
| | Prompt content | Check-in counter, boarding gate, and seat number |
| Callback interface | | A |

S104: Display the floating ball according to floating ball parameters.

After receiving the floating ball parameters issued by the service module, the floating ball management module may display, hide, end, or unfold the floating ball according to the floating ball parameters.

For example, after receiving the floating ball parameters shown in Table 3, the floating ball management module may construct a floating ball X, for example, the flight floating ball 413 shown in FIG. 4C, and control the window manager to display the floating ball X.

A number of the floating ball X may be a floating ball ID (0001), or may be another number associated with the floating ball ID. The floating ball management module locates the floating ball X through the floating ball number or floating ball ID.

Subsequently, the floating ball management module may determine that an application icon displayed in the floating ball X is an icon of a flight application. In addition, prompt information displayed in the floating ball X is "check-in counter, boarding gate, or seat number" shown in the user interface in FIG. 4C. Alternatively, the check-in counter, the boarding gate, and the seat number are broadcast in rotation as the prompt information displayed in the floating ball X.

The floating ball X further includes a callback interface A. After detecting a user operation on the floating ball X, the floating ball X may send an indication signal to the corresponding service module through the callback interface A. For example, in the scenario shown in FIG. 4C, after detecting a user operation on the floating ball 413, the floating ball 413 may send an indication signal to the flight module through the callback interface A. The indication signal may trigger the flight module to display the user interface shown in FIG. 4E, or instruct to run the flight application, then display a flight order of the user, and the like.

Figure 11:
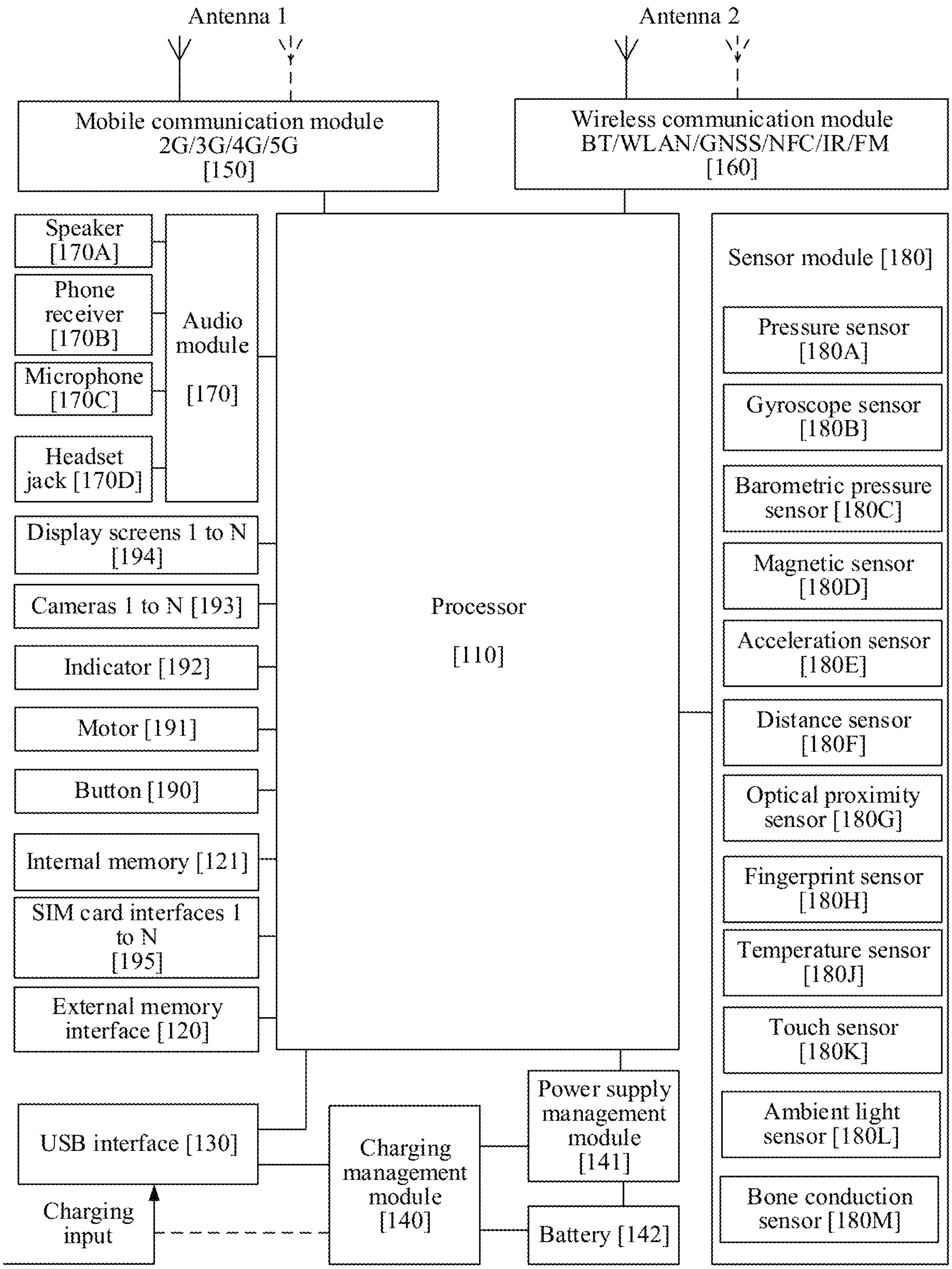
FIG. 11 is a schematic diagram of a hardware structure of an electronic device according to an embodiment of this application.

In this way, the first electronic device detects the current state. When a plurality of types of services are triggered, the first electronic device may display a plurality of floating balls. In this way, the user can simultaneously acquire prompt information of a plurality of floating balls. FIG. 11 is a schematic diagram of a hardware structure of a first electronic device.

The first electronic device may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of the present invention does not constitute a specific limitation on the first electronic device. In some other embodiments of this application, the first electronic device may include more or fewer components than those shown in the figure, or some components may be combined, or some components may be split, or a different component deployment may be used. The components in the portrait may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be separate devices, or may be integrated into one or more processors.

The controller may generate an operation control signal according to instruction operation code and a time-sequence signal, and control obtaining and executing of instructions.

A memory may also be disposed in the processor 110, configured to store instructions and data. In some embodiments, the memory in the processor 110 is a cache. The memory may store an instruction or data that has just been used or cyclically used by the processor 110. If the processor 110 needs to use the instruction or the data again, the processor may directly invoke the instruction or the data from the memory, to avoid repeated access and reduce a waiting time of the processor 110, thereby improving system efficiency.

The charging management module 140 is configured to receive charging input from the charger. The power management module 141 is configured to be connected to the battery 142, the charging management module 140, and the processor 110.

A wireless communication function of the first electronic device may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna of the first electronic device may be configured to cover one or more communication frequency bands. Different antennas may be multiplexed to improve antenna utilization. For example, the antenna 1 may be multiplexed into a diversity antenna of a wireless local area network. In some other embodiments, the antennas may be used with a tuning switch.

The mobile communication module 150 may provide a solution to wireless communication such as 2G/3G/4G/5G applied to the first electronic device. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in the same device.

The modem processor may include a modulator and a demodulator. The modulator is configured to modulate a to-be-sent low-frequency baseband signal into a middle/high-frequency signal. The demodulator is configured to demodulate the received electromagnetic wave signal into a low frequency baseband signal. Then the demodulator transfers the low-frequency baseband signal obtained through demodulation to the baseband processor for processing. The low-frequency baseband signal is processed by the baseband processor and is then transferred to the application processor. The application processor outputs a sound signal through an audio device (which is not limited to the speaker 170A, the phone receiver 170B, and the like), or displays an image or a video through the display screen 194. In some embodiments, the modem processor may be an independent device. In some other embodiments, the modem processor may be independent of the processor 110, and is disposed in a same device as the mobile communication module 150 or another function module.

The wireless communication module 160 may provide a solution to wireless communication applied to the first electronic device, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more devices that integrate at least one communication processing module. The wireless communication module 160 receives an electromagnetic wave by using the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave by using the antenna 2 for radiation.

In this embodiment of this application, based on the communication services provided by the mobile communication module 150 and/or the wireless communication module 160, the first electronic device may acquire a flight order in a flight application, display a subway boarding code, browse a foreign language web page, and the like.

In some embodiments, the antenna 1 and the mobile communication module 150 of the first electronic device are coupled, and the antenna 2 and the wireless communication module 160 of the first electronic device are coupled, so that the first electronic device can communicate with a network and another device by using a wireless communication technology. The wireless communication technology may specifically include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

In this embodiment of this application, the first electronic device may realize real-time positioning based on the wireless communication technology, so as to acquire positioning data indicating the current geographic location of the user.

The first electronic device implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs that execute a program instruction to generate or change display information.

The display screen 194 is configured to display an image, a video, and the like. The display screen 194 includes a display panel. The display screen 194 includes a display panel. A liquid crystal display (liquid crystal display, LCD) may be used as the display panel. The display panel may alternatively be an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the electronic device may include one or N display screens 194. N is a positive integer greater than 1.

In this embodiment of this application, displaying the user interfaces shown in FIG. 4A to FIG. 4N, FIG. 5A to FIG. 5K, and FIG. 6A to FIG. 6O by the first electronic device relies on the display capabilities provided by the GPU, the display screen 194, and the application processor.

The first electronic device can implement a photographing function by using the ISP, the camera 193, the video codec, the GPU, the display screen 194, the application processor, and the like.

The internal memory 121 may include one or more random access memories (random access memories, RAMs) and one or more non-volatile memories (non-volatile memories, NVMs).

The random access memories may include a static-random access memory (static-random access memory, SRAM), a dynamic random access memory (dynamic random access memory, DRAM), a synchronous dynamic random access memory (synchronous dynamic random access memory, SDRAM), double data rate synchronous dynamic random access memory (double data rate synchronous dynamic random access memory, DDR SDRAM, for example, a fifth generation DDR SDRAM is generally referred to as DDR5 SDRAM), and the like. The non-volatile memories may include a magnetic disk storage device and a flash memory.

The random access memory may be directly read and written by the processor 110, may be configured to store executable programs (for example, machine instructions) of an operating system or other running programs, or may be configured to store data of users and applications. The non-volatile memory may also store the executable programs, the data of the users and the applications, and the like, and may be loaded into the random access memory in advance for the processor 110 to perform direct reading and writing.

In this embodiment of this application, the code of the notification application may be stored in the non-volatile memory. When running the notification application, the first electronic device may load the code of the notification application into the random access memory, and then execute the notification application, thereby implementing the floating ball processing method in a multitasking scenario provided by the notification application.

The external memory interface 120 may be configured to connect to an external non-volatile memory, to expand a storage capability of the first electronic device. The external non-volatile memory communicates with the processor 110 by using the external memory interface 120, to implement a data storage function, for example The first electronic device may implement an audio function such as music play back, recording, and the like by using the audio module 170, the speaker 170A, the phone receiver 170B, the microphone 170C, the headset jack 170D, the application processor, and the like. The audio function is, for example, music play back and sound recording.

The pressure sensor 180A is configured to sense a pressure signal, and can convert the pressure signal into an electrical signal. The gyroscope sensor 180B may be configured to determine a motion attitude of the first electronic device. The barometric pressure sensor 180C is configured to measure barometric pressure. The magnetic sensor 180D includes a Hall sensor. The first electronic device may use the magnetic sensor 180D to implement functions such as magnetic attachment. The acceleration sensor 180E may detect an acceleration value of the first electronic device in each direction (generally in three axes). When the first electronic device is stationary, a magnitude and a direction of gravity may be detected. The acceleration sensor 180E may further be configured to recognize a posture of the electronic device. The distance sensor 180F is configured to measure a distance. The optical proximity sensor 180G may include, for example, a light-emitting diode (LED) and an optical detector such as a photodiode. The first electronic device may detect, by using the optical proximity sensor 180G, that a user holds the first electronic device close to an ear for a call, so that automatic screen-off is implemented. The optical proximity sensor 180G may be further configured to automatically unlock and lock the screen. The ambient light sensor 180L is configured to perceive ambient light brightness. The fingerprint sensor 180H is configured to collect a fingerprint. The temperature sensor 180J is configured to detect a temperature.

The touch sensor 180K is also referred to as a "touch device". The touch sensor 180K may be disposed in the display screen 194, and the touch sensor 180K and the display screen 194 constitute a "touchscreen". The touch sensor 180K is configured to detect a touch operation on or near the touch sensor 180K. The touch sensor may transfer the detected touch operation to the application processor to determine a type of the touch event. Visual output related to the touch operation may be provided by using the display screen 194. In some other embodiments, the touch sensor 180K may be alternatively disposed on a surface of the first electronic device, and is located on a position different from that of the display screen 194.

In this embodiment of this application, that the first electronic device detects whether there is a user operation on a control on the user interface shown in FIG. 4A to FIG. 4H, FIG. 5A to FIG. 5I, or FIG. 6A to FIG. 6I or not relies on the touch detection capability provided by the touch sensor 180K.

The bone conduction sensor 180M may collect a vibration signal. The key 190 includes a start key, a volume key, and the like. The key 190 may be a mechanical key, or a touch-type key. The first electronic device may receive a key input, and generate a key signal input related to user setting and function control of the first electronic device. The motor 191 may generate a vibration prompt. When the first electronic device displays a floating ball, the first electronic device may also simultaneously use the motor 191 to strengthen the prompt. The indicator 192 may be an indicator light that may be configured to indicate a charging state and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to come into contact with or be separated from the first electronic device. The first electronic device may support one or N SIM card interfaces. N is a positive integer greater than 1.

The term "user interface (user interface, UI)" in the specification, claims, and accompanying drawings of this application is a medium interface for interaction and information exchange between an application or operating system and a user, and implements the conversion between an internal form of information and a form of the information acceptable to the user. The user interface of the application is source code written in a specific computer language such as java and the extensible markup language (extensible markup language, XML). The interface source code is parsed and rendered on a terminal device, and is finally presented as content that can be recognized by the user, such as a picture, a text, a button and other controls. A control (control), also referred to as a widget (widget), is a basic element of the user interface. Typical controls include a toolbar (toolbar), a menu bar (menu bar), a text box (text box), a button (button), a scrollbar (scrollbar), a picture, and a text. The attributes and content of the controls in the interface are defined by tags or nodes. For example, XML specifies the controls included in the interface through nodes such as <Textview>, <ImgView>, and <VideoView>. One node corresponds to one control or attribute in the interface, and the node is parsed and rendered, and is then presented as user-visible content. In addition, interfaces of many applications, such as hybrid applications (hybrid application), usually further include web pages. A web page, also referred to as a page, may be understood as a special control embedded in an application interface. The web page is source code written in a specific computer language, such as the HyperText Markup Language (HyperText Markup Language, HTML), cascading style sheets (cascading style sheets, CSS), and java scripts (JavaScript, JS). The source code of the web page may be loaded and displayed by a browser or a web page display component with similar functions to the browser as content that can be recognized by the user. The specific content included in the web page is also defined by tags or nodes in the source code of the web page. For example, GTML defines elements and attributes of the web page through <p>, <img>, <video>, and <canvas>.

The commonly used form of user interfaces is a graphic user interface (graphic user interface, GUI), which refers to a user interface related to computer operations and displayed in a graphical manner. It may be an icon, a window; a control, or another interface element displayed on the display screen of the electronic device. The control may include visual interface elements such as an icon, a button, a menu, a tab, a text box, a dialog box, a status bar, a navigation bar, and a widget.

As used in this specification and the claims of this application, a singular expression form, "one", "a", "said", "foregoing", "the", or "this", is intended to also include a plural expression form, unless clearly indicated to the contrary in the context. It should be further understood that the term "and/or" used in this application indicates and includes any or all possible combinations of one or more listed items. As used in the foregoing embodiments, based on the context, the term "when" may be interpreted as a meaning of "is", "after", "in response to determining . . . ", or "in response to detecting . . . ". Similarly, based on the context, the phrase "when determining" or "if detecting (a stated condition or event)" may be interpreted as a meaning of "if determining . . . ", "in response to determining . . . ", "when detecting (a stated condition or event)", or "in response to detecting . . . (a stated condition or event)".

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a computer, all or some of the processes or functions according to the embodiments of this application are produced. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, an SSD), or the like.

A person of ordinary skill in the art may understand that all or some of the procedures in the methods in the embodiments may be implemented by using a computer program instructing relevant hardware. The program may be stored in a computer-readable storage medium. When the program runs, the procedures in the foregoing method embodiments may be performed. The foregoing storage medium includes: any medium that can store program code, such as a ROM, a random access memory RAM, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention Therefore, the protection scope of the present invention shall be subject to the protection scope of the claims.

What is claimed is:

1. A multitasking interaction method, applicable to an electronic device, the method comprising:

detecting that the electronic device meets a first preset condition, and displaying a first floating ball, wherein an identifier of a first application and first information are displayed in the first floating ball;

detecting that the electronic device meets a second preset condition in response to that the first floating ball is displayed on an interface of the electronic device, and displaying a second floating ball while displaying the first floating ball on the interface of the electronic device, wherein an identifier of a second application and second information are displayed in the second floating ball;

determining that no user operation on the first floating ball is detected within a third duration after the first floating ball is displayed; and ending displaying of the first floating ball, wherein the determining that no user operation on the first floating ball is detected within the third duration after the first floating ball is displayed; and ending displaying of the first floating ball comprises:

determining that no user operation on the first floating ball is detected within a fourth duration after the first floating ball is displayed, and displaying the first floating ball in a thumbnail state, wherein the first floating ball in the thumbnail state comprises the identifier of the first application, and does not comprise the first information; the first floating ball in the thumbnail state further comprises a countdown identifier, wherein the countdown identifier is used for indicating a remaining display time of the first floating ball in the thumbnail state; and the third duration is equal to a sum of the fourth duration and a countdown duration indicated by the countdown identifier; and ending displaying of the first floating ball in response to that the countdown identifier indicates that timing is over.

2. The method according to claim 1, wherein the second floating ball is displayed above the first floating ball.

3. The method according to claim 1, further comprising:

determining that no user operation on the first floating ball is detected within a first duration after the first floating ball is displayed, and displaying the first floating ball in a thumbnail state, wherein the first floating ball in the thumbnail state comprises the identifier of the first application, and does not comprise the first information.

4. The method according to claim 3, further comprising:

determining that no user operation on the second floating ball is detected within a second duration after the second floating ball is displayed, and displaying the second floating ball in a thumbnail state, wherein the second floating ball in the thumbnail state comprises the identifier of the second application, and does not comprise the second information.

5. The method according to claim 4, wherein the first duration is equal to the second duration.

6. The method according to claim 4, wherein the displaying the second floating ball in a thumbnail state comprises:

determining that another floating ball in a thumbnail state is displayed on the interface of the electronic device, and aggregating the second floating ball in the thumbnail state and the another floating ball in the thumbnail state into a third floating ball, wherein the identifier of the second application is displayed in the third floating ball.

7. The method according to claim 6, wherein the third floating ball comprises indication information, wherein the indication information is used for indicating that the third floating ball is an aggregated floating ball comprising a plurality of floating balls.

8. The method according to claim 7, further comprising:

detecting a first user operation on the third floating ball; and displaying the plurality of floating balls in response to the first user operation.

9. The method according to claim 1, wherein the first information is a check-in prompt for a flight booked by a user, and the first preset condition comprises that: a notification of the flight is acquired, and a current time of the electronic device is within a check-in time range of the flight; or the first information is a boarding prompt for a flight booked by a user, and the first preset condition comprises that: a notification of the flight is acquired, a current time of the electronic device is within a waiting time range of the flight, and a current location of the electronic device is within a geographic range of a departure airport of the flight; or the first information is a subway boarding prompt, and the first preset condition comprises that: a current location of the electronic device is within a geographic range of a subway station; or the first information is a translation prompt, and the first preset condition comprises that: a copy operation is detected, and a language used for copied content is a language uncommonly used by a system.

10. The method according to claim 1, wherein the first information is a navigation prompt, and the first preset condition comprises that: a copy operation is detected, and copied content indicates a first location on a map; or the first information is a dialing prompt, and the first preset condition comprises that: a copy operation is detected, and copied content comprises a first phone number.

11. The method according to claim 1, further comprising:

detecting a second user operation on the first floating ball; and displaying a first page in response to the second user operation, wherein third information is displayed on the first page, and the third information comprises the first information, or the third information is associated with the first information.

12. The method according to claim 11, wherein the first page further comprises the second floating ball, or further comprises the second floating ball in a thumbnail state, wherein the second floating ball in the thumbnail state comprises the identifier of the second application, and does not comprise the second information.

13. The method according to claim 12, wherein in response to that a graphic code is displayed on the first page, the graphic code does not overlap with the second floating ball; and the graphic code comprises a two-dimensional code and a bar code.

14. The method according to claim 1, wherein a fourth floating ball and a fifth floating ball are further displayed on the interface of the electronic device, the fourth floating ball covers the fifth floating ball, and the method further comprises:

detecting a third user operation on the interface of the electronic device; and displaying the fourth floating ball and the fifth floating ball in response to the third user operation, wherein the fifth floating ball is not covered by the fourth floating ball.

15. The method according to claim 1, further comprising:

detecting a fourth user operation on the first floating ball or the second floating ball; and displaying the first floating ball and the second floating ball at a first position on the interface of the electronic device in response to the fourth user operation, wherein the first position is a position at which the fourth user operation ends.

16. An electronic device, comprising:

one or more processors and one or more memories, wherein the one or more memories are coupled to the one or more processors, the one or more memories are configured to store computer program code, the computer program code comprises computer instructions, which when executed by the one or more processors, cause the processor to:

detect that the electronic device meets a first preset condition, and display a first floating ball, wherein an identifier of a first application and first information are displayed in the first floating ball;

detect that the electronic device meets a second preset condition in response to that the first floating ball is displayed on an interface of the electronic device, and display a second floating ball while displaying the first floating ball on the interface of the electronic device, wherein an identifier of a second application and second information are displayed in the second floating ball;

determine that no user operation on the first floating ball is detected within a third duration after the first floating ball is displayed; and end displaying of the first floating ball, wherein, to determine that no user operation on the first floating ball is detected within the third duration after the first floating ball is displayed and end displaying of the first floating ball, the computer instructions, when executed by the one or more processors, cause the processor to:

determine that no user operation on the first floating ball is detected within a fourth duration after the first floating ball is displayed, and displaying the first floating ball in a thumbnail state, wherein the first floating ball in the thumbnail state comprises the identifier of the first application, and does not comprise the first information; the first floating ball in the thumbnail state further comprises a countdown identifier, wherein the countdown identifier is used for indicating a remaining display time of the first floating ball in the thumbnail state; and the third duration is equal to a sum of the fourth duration and a countdown duration indicated by the countdown identifier; and end displaying of the first floating ball in response to that the countdown identifier indicates that timing is over.

17. The electronic device according to claim 16, wherein the second floating ball is displayed above the first floating ball.

18. A non-transitory computer-readable storage medium, comprising instructions, the instructions, when run on an electronic device, causing the electronic device to:

detect that the electronic device meets a first preset condition, and display a first floating ball, wherein an identifier of a first application and first information are displayed in the first floating ball;

detect that the electronic device meets a second preset condition in response to that the first floating ball is displayed on an interface of the electronic device, and display a second floating ball while displaying the first floating ball on the interface of the electronic device, wherein an identifier of a second application and second information are displayed in the second floating ball;

determine that no user operation on the first floating ball is detected within a third duration after the first floating ball is displayed; and end displaying of the first floating ball, wherein, to determine that no user operation on the first floating ball is detected within the third duration after the first floating ball is displayed; and end displaying of the first floating ball, the instructions, when run on the electronic device, causing the electronic device to:

determine that no user operation on the first floating ball is detected within a fourth duration after the first floating ball is displayed, and displaying the first floating ball in a thumbnail state, wherein the first floating ball in the thumbnail state comprises the identifier of the first application, and does not comprise the first information; the first floating ball in the thumbnail state further comprises a countdown identifier, wherein the countdown identifier is used for indicating a remaining display time of the first floating ball in the thumbnail state; and the third duration is equal to a sum of the fourth duration and a countdown duration indicated by the countdown identifier; and end displaying of the first floating ball in response to that the countdown identifier indicates that timing is over.

* * * * *